US008271631B1

(12) United States Patent
Horvitz et al.

(10) Patent No.: US 8,271,631 B1
(45) Date of Patent: Sep. 18, 2012

(54) METHODS, TOOLS, AND INTERFACES FOR THE DYNAMIC ASSIGNMENT OF PEOPLE TO GROUPS TO ENABLE ENHANCED COMMUNICATION AND COLLABORATION

(75) Inventors: Eric J. Horvitz, Kirkland, WA (US); Carl M. Kadie, Bellevue, WA (US); Sean Blagsvedt, Seattle, WA (US)

(73) Assignee: Microsoft Corporation, Redmond, CA (US)

( * ) Notice: Subject to any disclaimer, the term of this patent is extended or adjusted under 35 U.S.C. 154(b) by 1273 days.

(21) Appl. No.: 11/047,130

(22) Filed: Jan. 31, 2005

Related U.S. Application Data

(62) Division of application No. 10/036,566, filed on Dec. 21, 2001, now Pat. No. 7,644,144.

(51) Int. Cl.
*G06F 15/173* (2006.01)
(52) U.S. Cl. ........ 709/223; 709/203; 709/204; 709/220; 709/228
(58) Field of Classification Search .................. 709/223, 709/203–204, 220, 228; 705/300–301; 707/608; 715/751
See application file for complete search history.

(56) References Cited

U.S. PATENT DOCUMENTS 4,672,632 A    6/1987  Andersen
(Continued)

FOREIGN PATENT DOCUMENTS

EP    1594070 A2    9/2005
WO    9800787       1/1998

OTHER PUBLICATIONS

T. Joachims, Text categorization with support vector machines: learning with many relevant features, Machine Learning, European Conference on Machine Learning, Apr. 21, 1998, pp. 137-142.
International Search Report dated Sep. 29, 2003 for PCT Application Serial No. 00/20685, 3 Pages.

(Continued)

*Primary Examiner* — Alina N. Boutah

(57) ABSTRACT

A system for optimizing the value of communications between communicating parties is provided. The system includes a communication group manager that facilitates specifying policies, preferences and/or automated analysis of ideal communication channels, routing and/or scheduling in terms of communicating party groups that can be pre-populated clusters of communicating parties, assembled based on relationships (e.g., organizational), and/or assembled based on satisfying inclusion criteria (e.g., age, location, competence, communication history, meeting history). The communication group manager maps communicating parties into predefined and/or dynamically created groups that facilitate specifying and/or automatically computing ideal communication actions like selecting a channel, displaying lists of potential channels sorted by communicating party preferences, and (re)scheduling communications to different channels and/or times. Ideal communication actions can be identified by maximizing a measure of expected communication utility, where groups provide simplifying abstractions to facilitate assessment of outcome utilities. The method can employ representations of preferences of the contactor and contactee that allow for group-specific preference considerations that weight differentially contactor and/or contactee preference considerations in communication action optimization. The system includes a group wise communication coordinator that identifies optimal group communication sets. The method facilitates a recipient communicating with a group member where the communication utility is optimized based on a preference, and a context associated with the group to which the member belongs.

16 Claims, 23 Drawing Sheets

U.S. PATENT DOCUMENTS

| | | | |
|---|---|---|---|
| 4,791,561 A | 12/1988 | Huber | |
| 5,493,692 A | 2/1996 | Theimer et al. | |
| 5,513,126 A | 4/1996 | Harkins et al. | |
| 5,544,321 A | 8/1996 | Theimer et al. | |
| 5,555,376 A | 9/1996 | Theimer et al. | |
| 5,603,054 A | 2/1997 | Theimer et al. | |
| 5,611,050 A | 3/1997 | Theimer et al. | |
| 5,615,342 A | 3/1997 | Johnson | |
| 5,623,422 A | 4/1997 | Williams | |
| 5,649,105 A | 7/1997 | Aldred et al. | |
| 5,675,779 A | 10/1997 | Doktor | |
| 5,689,642 A | 11/1997 | Harkins et al. | |
| 5,790,801 A | 8/1998 | Funato | |
| 5,794,210 A | 8/1998 | Goldhaber et al. | |
| 5,809,251 A | 9/1998 | May et al. | |
| 5,812,865 A | 9/1998 | Theimer et al. | |
| 5,826,239 A * | 10/1998 | Du et al. | 705/7.26 |
| 5,841,854 A * | 11/1998 | Schumacher et al. | 379/265.11 |
| 5,859,979 A | 1/1999 | Tung et al. | |
| 5,893,075 A | 4/1999 | Plainfield et al. | |
| 5,931,913 A | 8/1999 | Meriwether et al. | |
| 5,960,423 A | 9/1999 | Chaudhuri et al. | |
| 5,963,910 A | 10/1999 | Ulwick | |
| 6,014,135 A | 1/2000 | Fernandes | |
| 6,014,669 A | 1/2000 | Slaughter et al. | |
| 6,029,195 A | 2/2000 | Herz | |
| 6,032,189 A | 2/2000 | Jizenji et al. | |
| 6,035,306 A | 3/2000 | Lowenthal et al. | |
| 6,044,486 A | 3/2000 | Underseth | |
| 6,073,142 A | 6/2000 | Geiger et al. | |
| 6,112,098 A | 8/2000 | Flint et al. | |
| 6,119,017 A * | 9/2000 | Cassidy et al. | 455/518 |
| 6,119,101 A | 9/2000 | Peckover | |
| 6,127,946 A | 10/2000 | Tzidon et al. | |
| 6,157,955 A | 12/2000 | Narad et al. | |
| 6,163,683 A | 12/2000 | Dunn et al. | |
| 6,167,253 A | 12/2000 | Farris et al. | |
| 6,167,445 A | 12/2000 | Gai et al. | |
| 6,167,450 A | 12/2000 | Angwin et al. | |
| 6,181,684 B1 | 1/2001 | Turcotte et al. | |
| 6,188,905 B1 | 2/2001 | Rudrapatna et al. | |
| 6,212,550 B1 | 4/2001 | Segur | |
| 6,216,111 B1 | 4/2001 | Walker et al. | |
| 6,243,398 B1 | 6/2001 | Kahane et al. | |
| 6,272,146 B1 | 8/2001 | Bowater et al. | |
| 6,279,112 B1 | 8/2001 | O'Toole et al. | |
| 6,285,987 B1 | 9/2001 | Roth et al. | |
| 6,292,480 B1 | 9/2001 | May | |
| 6,295,527 B1 * | 9/2001 | McCormack et al. | 1/1 |
| 6,332,126 B1 | 12/2001 | Peirce et al. | |
| 6,336,194 B1 | 1/2002 | Dahman et al. | |
| 6,353,398 B1 | 3/2002 | Amin et al. | |
| 6,385,454 B1 | 5/2002 | Bahl et al. | |
| 6,400,381 B1 * | 6/2002 | Barrett et al. | 715/758 |
| 6,421,655 B1 * | 7/2002 | Horvitz et al. | 706/61 |
| 6,421,730 B1 | 7/2002 | Narad et al. | |
| 6,438,217 B1 | 8/2002 | Huna | |
| 6,438,603 B1 | 8/2002 | Ogus | |
| 6,463,265 B1 | 10/2002 | Cohen et al. | |
| 6,466,232 B1 | 10/2002 | Newell et al. | |
| 6,480,885 B1 * | 11/2002 | Olivier | 709/207 |
| 6,493,685 B1 | 12/2002 | Ensel et al. | |
| 6,507,562 B1 | 1/2003 | Kadansky et al. | |
| 6,513,046 B1 | 1/2003 | Abbott, III et al. | |
| 6,549,915 B2 | 4/2003 | Abbott, III et al. | |
| 6,571,216 B1 | 5/2003 | Garg et al. | |
| 6,578,076 B1 | 6/2003 | Putzolu | |
| 6,587,876 B1 | 7/2003 | Mahon et al. | |
| 6,611,881 B1 | 8/2003 | Gottfurcht et al. | |
| 6,654,734 B1 | 11/2003 | Mani et al. | |
| 6,658,095 B1 | 12/2003 | Yoakum et al. | |
| 6,671,695 B2 * | 12/2003 | McFadden | 707/656 |
| 6,672,506 B2 | 1/2004 | Swartz et al. | |
| 6,681,247 B1 * | 1/2004 | Payton | 709/217 |
| 6,697,840 B1 | 2/2004 | Godefroid et al. | |
| 6,738,931 B1 | 5/2004 | Osborn et al. | |
| 6,741,188 B1 | 5/2004 | Miller et al. | |
| 6,747,675 B1 | 6/2004 | Abbott et al. | |
| 6,751,636 B1 | 6/2004 | Mende, Jr. et al. | |
| D494,584 S | 8/2004 | Schlieffers et al. | |
| 6,791,580 B1 | 9/2004 | Abbott et al. | |
| 6,796,505 B2 | 9/2004 | Pellaumail et al. | |
| 6,801,223 B1 | 10/2004 | Abbott et al. | |
| 6,812,937 B1 | 11/2004 | Abbott et al. | |
| 6,826,540 B1 | 11/2004 | Plantec et al. | |
| 6,837,436 B2 | 1/2005 | Swartz et al. | |
| 6,839,554 B2 | 1/2005 | McDowell et al. | |
| 6,839,850 B1 * | 1/2005 | Campbell et al. | 726/23 |
| 6,842,877 B2 | 1/2005 | Robarts et al. | |
| 6,944,619 B2 * | 9/2005 | Gruenwald | 1/1 |
| 6,952,828 B2 * | 10/2005 | Greene | 718/104 |
| 6,957,248 B2 | 10/2005 | Quine et al. | |
| 6,968,179 B1 * | 11/2005 | De Vries | 455/414.1 |
| 6,980,993 B2 * | 12/2005 | Horvitz et al. | 1/1 |
| 6,988,132 B2 * | 1/2006 | Horvitz | 709/220 |
| 7,000,194 B1 * | 2/2006 | Newbold | 715/789 |
| 7,010,501 B1 | 3/2006 | Roslak et al. | |
| 7,010,600 B1 | 3/2006 | Prasad et al. | |
| 7,035,923 B1 | 4/2006 | Yoakum et al. | |
| 7,040,541 B2 | 5/2006 | Swartz et al. | |
| 7,046,680 B1 | 5/2006 | McDysan et al. | |
| 7,063,263 B2 | 6/2006 | Swartz et al. | |
| 7,076,727 B1 * | 7/2006 | Flam et al. | 715/202 |
| 7,085,786 B2 | 8/2006 | Carlson et al. | |
| 7,092,952 B1 * | 8/2006 | Wilens | 1/1 |
| 7,103,651 B2 | 9/2006 | Bohannon et al. | |
| 7,103,806 B1 | 9/2006 | Horvitz | |
| 7,131,143 B1 * | 10/2006 | LaMacchia et al. | 726/30 |
| 7,149,795 B2 | 12/2006 | Sridhar et al. | |
| 7,171,378 B2 | 1/2007 | Petrovich et al. | |
| 7,185,073 B1 | 2/2007 | Gai et al. | |
| 7,195,157 B2 | 3/2007 | Swartz et al. | |
| 7,251,696 B1 | 7/2007 | Horvitz | |
| 7,330,895 B1 | 2/2008 | Horvitz | |
| 7,385,501 B2 | 6/2008 | Miller et al. | |
| 7,389,351 B2 * | 6/2008 | Horvitz | 709/227 |
| 7,644,144 B1 | 1/2010 | Horvitz et al. | |
| 7,747,719 B1 | 6/2010 | Horvitz et al. | |
| 7,908,663 B2 | 3/2011 | Horvitz et al. | |
| 2001/0014121 A1 * | 8/2001 | Kaye et al. | 375/240.03 |
| 2001/0025299 A1 | 9/2001 | Chang et al. | |
| 2001/0030664 A1 | 10/2001 | Shulman et al. | |
| 2001/0040590 A1 | 11/2001 | Abbott et al. | |
| 2001/0040591 A1 | 11/2001 | Abbott et al. | |
| 2001/0043231 A1 | 11/2001 | Abbott et al. | |
| 2001/0043232 A1 | 11/2001 | Abbott et al. | |
| 2001/0051876 A1 * | 12/2001 | Seigel et al. | 705/1 |
| 2002/0019827 A1 | 2/2002 | Shiman et al. | |
| 2002/0032689 A1 | 3/2002 | Abbott, III et al. | |
| 2002/0044152 A1 | 4/2002 | Abbott, III et al. | |
| 2002/0052930 A1 | 5/2002 | Abbott et al. | |
| 2002/0052963 A1 | 5/2002 | Abbott et al. | |
| 2002/0054130 A1 | 5/2002 | Abbott, III et al. | |
| 2002/0054174 A1 | 5/2002 | Abbott et al. | |
| 2002/0069406 A1 * | 6/2002 | Aaltonen et al. | 725/34 |
| 2002/0076025 A1 | 6/2002 | Liversidge et al. | |
| 2002/0078204 A1 | 6/2002 | Newell et al. | |
| 2002/0080155 A1 | 6/2002 | Abbott et al. | |
| 2002/0080156 A1 | 6/2002 | Abbott et al. | |
| 2002/0083025 A1 | 6/2002 | Robarts et al. | |
| 2002/0083158 A1 | 6/2002 | Abbott et al. | |
| 2002/0087525 A1 | 7/2002 | Abbott et al. | |
| 2002/0087580 A1 * | 7/2002 | LaCroix et al. | 707/104.1 |
| 2002/0087649 A1 * | 7/2002 | Horvitz | 709/207 |
| 2002/0090926 A1 * | 7/2002 | Pirkola et al. | 455/405 |
| 2002/0095524 A1 * | 7/2002 | Sanghvi et al. | 709/318 |
| 2002/0099702 A1 * | 7/2002 | Oddo | 707/6 |
| 2002/0099817 A1 | 7/2002 | Abbott et al. | |
| 2002/0107914 A1 * | 8/2002 | Charisius et al. | 709/203 |
| 2002/0112056 A1 | 8/2002 | Baldwin et al. | |
| 2002/0118772 A1 | 8/2002 | Lin | |
| 2002/0138572 A1 * | 9/2002 | Delany et al. | 709/204 |
| 2002/0156879 A1 * | 10/2002 | Delany et al. | 709/223 |
| 2002/0161611 A1 * | 10/2002 | Price et al. | 705/7 |
| 2002/0161862 A1 * | 10/2002 | Horvitz | 709/220 |
| 2002/0174199 A1 * | 11/2002 | Horvitz | 709/220 |
| 2002/0184211 A1 * | 12/2002 | Gruenwald | 707/6 |

| | | | |
|---|---|---|---|
| 2003/0004679 | A1 | 1/2003 | Tryon et al. |
| 2003/0014491 | A1* | 1/2003 | Horvitz et al. ............... 709/206 |
| 2003/0023711 | A1* | 1/2003 | Parmar et al. ................ 709/223 |
| 2003/0033421 | A1 | 2/2003 | Haeri et al. |
| 2003/0046401 | A1 | 3/2003 | Abbott et al. |
| 2003/0046421 | A1* | 3/2003 | Horvitz et al. ............... 709/238 |
| 2003/0055892 | A1* | 3/2003 | Huitema et al. .............. 709/204 |
| 2003/0061261 | A1* | 3/2003 | Greene ........................ 709/104 |
| 2003/0097485 | A1 | 5/2003 | Horvitz et al. |
| 2003/0139970 | A1 | 7/2003 | Badura et al. |
| 2003/0154476 | A1 | 8/2003 | Abbott, III et al. |
| 2003/0191676 | A1 | 10/2003 | Templeton |
| 2004/0143636 | A1 | 7/2004 | Horvitz et al. |
| 2004/0201500 | A1 | 10/2004 | Miller et al. |
| 2005/0034078 | A1 | 2/2005 | Abbott et al. |
| 2005/0165860 | A1 | 7/2005 | Cabrera et al. |
| 2005/0209914 | A1* | 9/2005 | Nguyen et al. .................. 705/14 |
| 2005/0223043 | A1 | 10/2005 | Randal et al. |
| 2005/0266858 | A1 | 12/2005 | Miller et al. |
| 2005/0272442 | A1 | 12/2005 | Miller et al. |
| 2006/0019676 | A1 | 1/2006 | Miller et al. |
| 2008/0090591 | A1 | 4/2008 | Miller et al. |
| 2008/0091537 | A1 | 4/2008 | Miller et al. |
| 2008/0134069 | A1* | 6/2008 | Horvitz ........................ 715/765 |
| 2008/0140776 | A1* | 6/2008 | Horvitz ........................ 709/204 |
| 2008/0161018 | A1 | 7/2008 | Miller et al. |

OTHER PUBLICATIONS

Robert M. Losee, Jr., Minimizing information overload: the ranking of electronic messages, Journal of Information Science 15, Elsevier Science Publishers B.V., 1989, pp. 179-189.
Andy Harter, et al., A Distributed Location System for the Active Office, IEEE Network, 1994, pp. 62-70.
Guanling Chen, et al., A Survey of Context-Aware Mobile Computing Research, Dartmouth Computer Science Technical Report, 2000, 16 pages.
William Noah Schilt, A System Architecture for Context-Aware Mobile Computing, Columbia University, 1995, 153 pages.
Mike Spreitzer, et al., Providing Location Information in a Ubiquitous Computing Environment, SIGOPS '93, 1993, pp. 270-283.
Marvin Theimer. et al., Operating System Issues for PDAs, in Fourth Workshop on Workstation Operating Systems, 1993, 7 pages.
Roy Want, Active Badges and Personal Interactive Computing Objects, IEEE Transactions on Consumer Electronics, 1992, 11 pages, vol. 38—No. 1.
Bill N. Schilit, et al., The ParcTab Mobile Computing System, IEEE WWOS-IV, 1993, 4 pages.
Bill Schilit, et al., Context-Aware Computing Applications, In Proceedings of the Workshop on Mobile Computing Systems and Applications, Dec. 1994. pp. 85-90.
Bill N. Schilit, et al., Customizing Mobile Applications, Proceedings USENIX Symposium on Mobile and Location Independent Computing, Aug. 1993, 9 pages.
Mike Spreitzer, et al., Architectural Considerations for Scalable, Secure, Mobile Computing with Location Information, In the 14th International Conference on Distributed Computing Systems, Jun. 1994, pp. 29-38.
Mike Spreitzer et al., Scalable, Secure, Mobile Computing with Location Information, Communications of the ACM, Jul. 1993, 1 page, vol. 36—No. 7.
Roy Want, et al., The Active Badge Location System, ACM Transactions on Information Systems, Jan. 1992, pp. 91-102, vol. 10—No. 1.
Mark Weiser, Some Computer Science Issues in Ubiquitous Computing, Communications of the ACM, Jul. 1993, pp. 75-84, vol. 36—No. 7.
M. Billinghurst, et al., An Evaluation of Wearable Information Spaces, Proceedings of the Virtual Reality Annual International Symposium, 1998, 8 pages.
Bradley J. Rhodes, Remembrance Agent: A continuously running automated information retrieval system, The Proceedings of the First International Conference on the Practical Application of Intelligent Agents and Multi Agent Technology, 1996, pp. 487-495.
Eric Horvitz, et al., In Pursuit of Effective Handsfree Decision Support: Coupling Bayesian Inference, Speech Understanding, and User Models, 1995, 8 pages.
Bradley J. Rhodes, The Wearable Remembrance Agent: A System for Augmented Theory, The Proceedings of the First International Symposium on Wearable Computers, Oct. 1997, pp. 123-128.
Eric Horvitz, et al., Attention-Sensitive Alerting in Computing Systems, Microsoft Research, Aug. 1999.
Bill N. Schilit. et al., Disseminationg Active Map Information to Mobile Hosts, IEEE Network, 1994, pp. 22-32, vol. 8—No. 5.
Mark Billinghurst, et al., Wearable Devices: New Ways to Manage Information, IEEE Computer Society, Jan. 1999, pp. 57-64.
Thad Eugene Starner, Wearable Computing and Contextual Awareness, Massachusetts Institute of Technology, Jun. 1999, 248 pages.
Bradley J. Rhodes, The Wearable Remembrance Agent: A System for Augmented Memory, Personal Technologies Journal Special Issue on Wearable Computing, 1997, 12 pages.
Workshop on Wearable Computing Systems, Aug. 19-21, 1996.
Mark Billinghurst, Research Directions in Wearable Computing, University of Washington, May 1998, 48 pages.
Mark Weiser, The Computer for the 21st Century, Scientific American, Sep. 1991, pp. 94-104, vol. 265—No. 3.
Carlson J., et al., "Channel Expansion Theory and the Experiential Nature of Media Richness Perceptions", Academy of Management vol. 42, No. 2, Apr. 1, 1999, p. 153-170.
Bhattacharya, et al., Coordinating Backup/Recovery and Data Consistency between Database and File Systems, Jun. 4-6, 2002, 12 pages, ACM SIGMOD, Madison Wisconsin, USA.
Hewlett-Packard Development Company, LP., Sybase Database Migration, 2004, 19 pages.
Planning Protection Schedules, Published Apr. 8, 2005, Updated Aug. 17, 2005, 5 pages. http://www.microsoft.com/technet/prodtechnol/dpm/proddocs/7f70f48c-6661-4573-ac17-47.
Webster's II New Riverside University Dictionary, Houghton Mifflin Company, 1994, pp. 496. In OA Dated Aug. 11, 2008 for U.S. Appl. No. 11/250,848, 40 pages.
International Search Report dated Sep. 7, 2002 for PCT Application Serial No. PCT02/07894, filed Mar. 15, 2002.
OA Dated Oct. 16, 2008 for U.S. Appl. No. 10/036,566, 24 pages.
OA dated Jan. 6, 2009 for U.S. Appl. No. 11/464,151, 57 pages.
Eric Horvitz, Principles of Mixed Initiative User Interfaces, 1999, Conference on Human Factors in Computing Systems archive Proceedings of the SIGCHI conference on Human factors in computing systems: the CHI is the limit, ISBN:0-201-48559-1, pp. 159-166.
OA dated Jan. 6, 2009 for U.S. Appl. No. 11/464,157, 61 pages.
Harry Newton, Newton's Telecom Dictionary, Feb. 2002, CMP Books, Eighteenth Edition, pp. 123-124.
OA dated Nov. 13, 2008 for U.S. Appl. No. 11/250,848, 18 pages.
OA dated Jan. 28, 2009 for U.S. Appl. No. 11/047,066, 73 pages.
OA dated Jan. 16, 2009 for U.S. Appl. No. 11/047,318, 65 pages.
OA dated Jan. 15, 2009 for U.S. Appl. No. 11/047,228, 61 pages.
OA dated Jan. 16, 2009 for U.S. Appl. No. 11/047,130, 61 pages.
OA mailed Jun. 20, 2008 for U.S. Appl. No. 11/464,155, 20 pages.
Kaushal Kurapati, et al., "A Multi-Agent TV Recorder, Adaptive Systems Department", Philips Research Briarcliff, 2001, 8 pages.
Eric J. Horvitz, et al., "Utility-Based Abstraction and Categorization", Palo Alto Laboratory, Rockwell International Research, 1993, 8 pages.
Eric J. Horvitz, et al., "Decision Theory in Expert Systems and Artificial Intelligence", International Journal of Approximate Reasoning, Jul. 1988, pp. 1-39.
Eric J. Horvitz, et al., "Attention-Sensitive Alerting", Proceedings of UAI '99, Conference on Uncertainty and Artificial Intelligence, Microsoft Research, Jul. 1999, pp. 305-313.
John R. Carlson,e t al., "Channel Expansion Theory and the Experiential Nature of Media Richness Perceptions", Academy of Management Journal, 1999, pp. 153-170, vol. 42, No. 2.
Andrew Silver, et al., "Unified Network Presence Management", Nortel Networks Wireless Solutions, 6 pages, printed 2000.
European Search Report dated Aug. 28, 2003, for International Application Serial No. 02 000 906.4-1244.

* cited by examiner

FIG. 18

| COMM CHANNEL | COMM TIME | SUBJECT MATTER | GROUP MEMBERSHIP | SELECTED GROUP MEMBERS | EXT. INFO. | |
|---|---|---|---|---|---|---|
| $A_1$ | $B_1$ | $C_1$ | $D_1$ | $E_1$ | $F_1$ | $COMM_1$ |
| $A_2$ | $B_2$ | $C_2$ | $D_2$ | $E_2$ | $F_2$ | $COMM_2$ |
| $A_3$ | $B_3$ | $C_3$ | $D_3$ | $E_3$ | $F_3$ | $COMM_3$ |
| $A_4$ | $B_4$ | $C_4$ | $D_4$ | $E_4$ | $F_4$ | $COMM_4$ |
| • | • | • | • | • | • | • |
| • | • | • | • | • | • | • |
| • | • | • | • | • | • | • |
| $A_Z$ | $B_Z$ | $C_Z$ | $D_Z$ | $E_Z$ | $F_Z$ | $COMM_Z$ |

1700

METHODS, TOOLS, AND INTERFACES FOR THE DYNAMIC ASSIGNMENT OF PEOPLE TO GROUPS TO ENABLE ENHANCED COMMUNICATION AND COLLABORATION

CROSS-REFERENCE TO RELATED APPLICATIONS

This application is a divisional of co-pending U.S. patent application Ser. No. 10/036,566, filed Dec. 21, 2001, entitled, "METHODS, TOOLS, AND INTERFACES FOR THE DYNAMIC ASSIGNMENT OF PEOPLE TO GROUPS TO ENABLE ENHANCED COMMUNICATION AND COLLABORATION." This application is also related to co-pending divisional U.S. patent application Ser. No. 11/047.066, filed on Jan. 31, 2005, entitled, "METHODS, TOOLS, AND INTERFACES FOR THE DYNAMIC ASSIGNMENT OF PEOPLE TO GROUPS TO ENABLE ENHANCED COMMUNICATION AND COLLABORATION," co-pending divisional U.S. patent application Ser. No. 11/047,318, filed on Jan. 31, 2005, entitled, "METHODS, TOOLS, AND INTERFACES FOR THE DYNAMIC ASSIGNMENT OF PEOPLE TO GROUPS TO ENABLE ENHANCED COMMUNICATION AND COLLABORATION," co-pending divisional U.S. patent application Ser. No. 11/047,228, filed on Jan. 31, 2005, entitled, "METHODS, TOOLS, AND INTERFACES FOR THE DYNAMIC ASSIGNMENT OF PEOPLE TO GROUPS TO ENABLE ENHANCED COMMUNICATION AND COLLABORATION," co-pending U.S. patent application Ser. No. 09/809,142, filed Mar. 15, 2001, entitled, "SYSTEM AND METHOD FOR IDENTIFYING AND ESTABLISHING PREFERRED MODALITIES OR CHANNELS FOR COMMUNICATIONS BASED ON PARTICIPANTS' PREFERENCES AND CONTEXTS," co-pending U.S. patent application Ser. No. 09/982,306, filed on Oct. 17, 2001, entitled, "SYSTEM AND METHOD FOR IDENTIFYING AND ESTABLISHING PREFERRED MODALITIES OR CHANNELS FOR COMMUNICATION BASED ON PARTICIPANTS' PREFERENCES AND CONTEXTS," co-pending U.S. patent application Ser. No. 10/281, 547, filed on Oct. 28, 2002, entitled, "SYSTEM FOR PERFORMING CONTEXT-SENSITIVE DECISIONS ABOUT IDEAL COMMUNICATION MODALITIES CONSIDERING INFORMATION ABOUT CHANNEL RELIABILITY," co-pending U.S. patent application Ser. No. 10/281, 718, filed on Oct. 28, 2002, entitled, "SYSTEM AND METHODS ENABLING A MIX OF HUMAN AND AUTOMATED INITIATIVES IN THE CONTROL OF COMMUNICATION POLICIES," co-pending U.S. patent application Ser. No. 10/187,078, filed on Jun. 28, 2002, entitled, "METADATA SCHEMA FOR INTERPERSONAL COMMUNICATIONS MANAGEMENT SYSTEMS," and co-pending U.S. patent application Ser. No. 10/281,546, filed on Oct. 28, 2002, entitled, "REPRESENTATION, DECISION MODELS, AND USER INTERFACE FOR ENCODING MANAGING PREFERENCES, AND PERFORMING AUTOMATED DECISION MAKING ABOUT THE TIMING AND MODALITIES OF INTERPERSONAL COMMUNICATIONS." The entireties of the aforementioned applications are incorporated herein by reference.

TECHNICAL FIELD

The present invention relates generally to managing communication groups and more particularly to creating and managing distinctions about people, their context and communication policies related to such people and contexts, to facilitate dynamically assigning people to communication categories and managing such categories to facilitate maximizing utility of communications based on category membership of the contactor, the current and/or anticipated context (situation) of the contactee, and communication channel(s) available to the communicating parties.

BACKGROUND OF THE INVENTION

As people move in and out of groups, and as people's contexts change, policies concerning how such people communicate can change. Associations between people are constantly changing. New associations come into being, old associations fall apart, and existing associations add members, lose members and have the status of the relationships between the members change. Furthermore, communication channels available to a member of a group, for the group as a whole and/or for a subset of the group may change.

Consider the problems associated with disseminating information to a dynamically changing group (e.g., a programming team tasked with developing a new release for a product while maintaining an existing product). The team may typically include an architect, designers, analysts, programmers, quality assurance personnel, technical support members, secretaries and managers. Throughout the lifetime of the project, the membership may change (e.g., a first programmer leaves the team, a new programmer joins the team), the relationships within the group may change (e.g., an analyst is promoted to a designer) and the responsibilities of members may change (e.g., a programmer may be transitioned from new development to maintenance programming). The desired flow of information within the group, from the group and to the group may change based on such changes to the group. Typically, the desired communication paths, the desired communication channels and/or the desired points of contact with the group may be maintained manually (e.g., a printout of a phone chain, a printout of an organizational chart) and may quickly become out of date. Thus, sub-optimal communications within and with the group may be expected.

SUMMARY OF THE INVENTION

The following presents a simplified summary of the invention in order to provide a basic understanding of some aspects of the invention. This summary is not an extensive overview of the invention. It is not intended to identify key or critical elements of the invention or to delineate the scope of the invention. Its sole purpose is to present some concepts of the invention in a simplified form as a prelude to the more detailed description that is presented later.

The present invention relates to systems and methods for dynamically assigning entities (e.g., people, processes, computer components) to communication categories and for dynamically managing categories to facilitate maximizing utility of communications based on membership in such communication categories. Thus, the present invention relates to creating and managing distinctions about people, their context and their tasks. Context can be abstracted by examining, for example, a communication sender, the relationship of the sender to a user, the time of day at which the sender is attempting to communicate, the task(s) with which the user and/or sender are engaged, the age of project(s) to which the user and/or sender are engaged, the sender and/or user location and so on. Thus, multiple attributes concerning people, including their preferences, contexts, tasks and priorities are analyzed to facilitate building and managing collections of people and to further facilitate establishing and adapting communication policies for people in the collections.

One aspect of the invention relates to a system that dynamically manages groups of communicating parties to facilitate identifying meaningful subsets of managed parties that will facilitate maximizing utility of a communication between the subset of managed parties. The system facilitates establishing, analyzing, and modifying activity-based associations of people. The system can be implemented via hardware and/or software and can be embodied on a computer readable medium.

Another aspect of the present invention concerns a communication group manager that facilitates specifying, in terms of different groups of people, policies and preferences employed in ideal communication routing and scheduling. The communication group manager also facilitates determining, in terms of different groups of people, how automated analysis of such ideal communication routing and scheduling can be performed. Such groups of people can be defined by a user (e.g., placed in a list via a user interface), can be automatically assembled based on descriptions of relationships between people (e.g., familial, organizational) and/or can be automatically assembled based on a person having one or more properties that satisfy group inclusion criteria (e.g., age, location, concerned about specific subject matter). The communication group manager facilitates improving communication utility by maximizing the expected utility of a communication through actions including, but not limited to, selecting a communication channel, displaying a list of communication channels, displaying a list of communication channels sorted, for example, by the preferences of the communicating parties and/or rescheduling communications to different channels and/or times than originally selected by the communicating parties. The grouping of people into communication categories simplifies employing abstractions employed in assessing utilities of outcomes and the computation of ideal communication actions.

Another aspect of the invention relates to a method for dynamically managing communicator category membership. The method includes monitoring communications between category members and updating category membership based on the monitoring. Thus, people can be moved between groups based on activity-centric analysis.

Yet another aspect of the invention relates to a method for managing group communications. The method includes determining when a group communication will occur, determining who will be involved in the group communication, based at least in part on category membership, determining which communication channels will maximize utility of the communication and establishing the communication. This method can, in some cases, create groups that will exist for short durations based, for example, on relationships that will only exist for short durations (e.g., ad hoc group editing a paragraph in a contract).

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

BRIEF DESCRIPTION OF THE DRAWINGS

FIG. 18 schematically illustrates a representative data structure that may be employed by a computer component in connection with the present invention.

DETAILED DESCRIPTION

Figure 1:
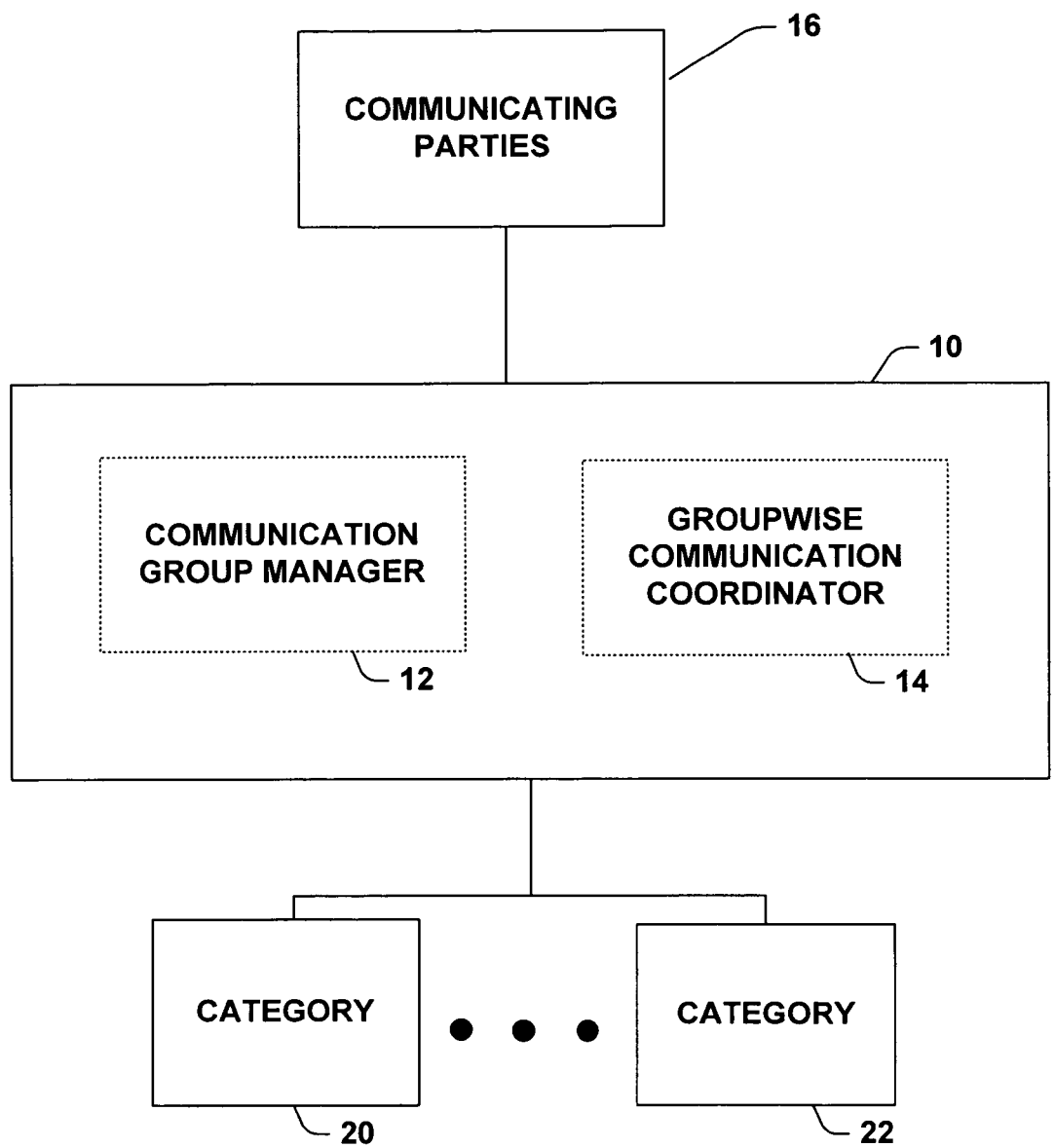
FIG. 1 is a schematic block diagram that illustrates a system for dynamic group management and facilitating group communications in accordance with an aspect of the present invention.

The present invention is now described with reference to the drawings, where like reference numerals are used to refer to like elements throughout. In the following description, for purposes of explanation, numerous specific details are set forth in order to provide a thorough understanding of the present invention. It may be evident, however, to one skilled in the art that the present invention may be practiced without these specific details. In other instances, well-known structures and devices are shown in block diagram form in order to facilitate description of the present invention.

As used in this application, the term "computer component" is intended to refer to a computer-related entity, either hardware, a combination of hardware and software, software, or software in execution. For example, a computer component may be, but is not limited to being, a process running on a processor, a processor, an object, an executable, a thread of execution, a program and a computer. By way of illustration, both an application running on a server and the server can be computer components. One or more computer components may reside within a process and/or thread of execution and a computer component may be localized on one computer and/or distributed between two or more computers.

It is to be appreciated that various aspects of the present invention employ representations of deterministic policies specified as functions or rules that take as arguments contextual information, details about the nature of the participants, and the content or task at hand. One example of the present invention also employs technologies associated with facilitating inference and decision making under uncertainty and optimization of expected utility and/or minimization of expected costs. Thus, statistical inference can be performed with models constructed by hand, from data with machine learning methods, or by a mixture of machine learning and human assessment. Such models can be used in conjunction with deterministic policies where, depending on the context, an inferential rule or deterministic rule is used. A variety of machine learning systems/methodologies including Bayesian learning methods that search over alternative dependency structures and apply a score (such as the Bayesian Information Criteria, etc.), Bayesian classifiers and other statistical classifiers, including decision tree learning methods, support vector machines, linear and non-linear regression, and neural network representations, can be employed to build and update inferential models.

FIG. 1 illustrates a system 10 that facilitates optimizing utility of a communication. The system 10 includes a communication group manager 12 and a group wise communication coordinator 14. The communication group manager 12 is a computer component, as that term is defined herein. The communication group manager 12 manages groups of communicating parties to facilitate maximizing utility of a communication between a subset of the communicating parties. The subset is selected by, and the communication is coordinated by the groupwise communication coordinator 14, which is also a computer component as that term is defined herein.

The communication group manager 12 can establish a group of communicating parties, delete a group of communicating parties, merge groups of communicating parties and partition groups, for example. The communication group manager 12 also adds new communicating parties to groups, removes communicating parties from groups, moves parties between groups and changes data associated with groups, for example. Thus the system 10 analyzes a set of communicating parties 16 and manages one or more categories or subsets of communicating parties (e.g., category 20, category 22) to facilitate maximizing utility of a communication.

The communication group manager 12 can establish a group based, for example, on relationships between communicating parties. For example, an organization may have an organization chart that lists the name and position of employees in the organization. Individuals, and/or the organization may desire to create communication groups based, for example, on the relative position of people in the organizational chart. Thus, communications from employees located more than a pre-determined number of levels below a user can trigger an employee automatically being assigned to a first communication group while communications from employees located more than a pre-determined number of levels above a user can trigger an employee automatically being assigned to a second communication group. Relationship based assignment to groups is but one example of dynamic group creation and will be discussed in greater detail in association with FIG. 21.

The group manager 12 can also dynamically assign people to groups based on activities. For example, communications, communication history, meetings, projects, and current states can lead to the group manager 12 dynamically assigning a person to a group. By way of illustration, a person with whom the user communicates concerning topic X may dynamically be assigned to a group for people with whom the user has communicated concerning topic X during the last seven days. If, after seven days, there have been no subsequent communications between the parties concerning topic X, then the group manager 12 can dynamically de-assign the person from the group. By way of further illustration, a person who is being consulted concerning a real-time edit of a paragraph in a contract can be dynamically assigned to groups that include groups of people who have been consulted on the contract, groups of people who have been allowed to edit the contract, groups of people with whom the user has communicated concerning the contract and groups of people with whom the user has communicated in the last twelve hours. Thus, the dynamic assignment of people to groups can lead to an individual being assigned to a number of groups substantially simultaneously. Dynamic assignment based on activities is but one example of the operation of the system 10, and further discussion of dynamic assignment is provided in association with FIG. 22.

The communication group manager 12 can also be employed to prepopulate clusters of users into groups. For example, a user interface can be employed to display a list of people of whom the communication group manager 12 is aware. Then, a user can define named groups of people and assign different people to these groups. Such groups can be stored, for example, in lists, files, trees, and other data structures.

The groups, whether established through prepopulation, relationship based processing, activity centric processing, context centric processing or other means can be employed to facilitate the specification of or automatic computation of communication actions. For example, actions including, but not limited to, selecting a communication channel, displaying lists (possibly sorted) of communication channels, rescheduling communication times, and reselecting communication channels can be performed by the communication group manager 12 based, at least in part, on the abstractions captured by membership in a group.

Concerning utility of a communication, the value of a current potential communication can be evaluated by considering a measure of the history of utility of communication with a member of a group, attributes of the communication that can be stored as metadata (e.g., intended focus of communication, nature of communication channel, reliability of communication channel), and/or combinations thereof. Such an expected utility can be computed through the use of probabilistic models such as Bayesian networks and decision trees that provide probability distributions over outcomes based on observations or attributes associated with the communication, setting, and so on. Coupling probabilistic inference models with preferences, and employing the principles of maximum expected utility for optimization provides a useful method for computing the value of different communication actions. In one example of the present invention, utility represents communication effectiveness correlated to adherence to user preferences. Such effectiveness can be measured by factors including, but not limited to, reliability achieved on the communication channel, quantity of information content transferred, quality of information content transferred, and relevancy of information content transferred.

An expected utility function takes into consideration probability distributions over future outcomes and user preferences while reasoning under uncertainty. An example expected utility function can be calculated using:

$$E[u(d_i,c)] = s_j \epsilon s \Sigma u(s_j,d_j) p(s_j | d_i, c),$$

Where $p(s_j|d_i,c)$ represents the probability of achieving a future state $s_j$ given a decision $d_i$ concerning situation c, capturing communication channel parameters, nature of the contactor and a context for the contactee. Each individual outcome state $s_j \epsilon s$ represents a possible match of preferences to related communication parameters. The function $u(s_j,d_i)$ represents the utility of state $s_j$ after the decision $d_i$ has been made.

Assume that the present invention considers two possible utilities, $U_{high}$ and $U_{low}$. Based on selecting particular communication parameters (e.g., time, media, location), the system 10 can compute $P_{high}$ and $P_{low}$, the probabilities of achieving $U_{high}$ and $U_{low}$, where $P_{high}=1-P_{low}$. Although two utility states are identified, it is to be appreciated that a greater number of utility states can be employed with the present invention. The expected utility of a decision $d_i$ is then:

$$E(d_i) = P_{high} U_{high} + P_{low} U_{low}.$$

After computing the $d_i$ E D, the system 10 can select the decision d* where $d^* = \arg\max_{d_i \epsilon D} E[u(d_i,c_j)]$, where d* represents the decision associated with maximum expected utility E.

A high utility can be associated with, for example, a large amount of valuable information being transferred. A low utility can be associated with, for example, a small amount of valuable information being transferred. Similarly, a low cost can be associated with a low drain on the attentional resources of the contactee, as might be captured by a low interruptability factor (e.g., user does not have to leave important meeting or shut down an application) and with a low amount of "hanging" (e.g., the number, type and/or importance of people and/or resources left waiting for the return of the attentional resource of the user). A high cost can be associated with a significant drain on the attentional resources of the contactee, as might be associated with an action of high interruptability (e.g., pulling a person from an important meeting) leaving many important people waiting. The utilities can take into consideration both the value and the disruptiveness of communication outcomes, combining the costs and benefits in a single assessment or explicitly breaking out the cost and benefits of the communication, and providing a means for coupling the two together (e.g., employing an additive multi-linear model, summing costs and benefits after selective weighting of the separate factors).

Figure 2:
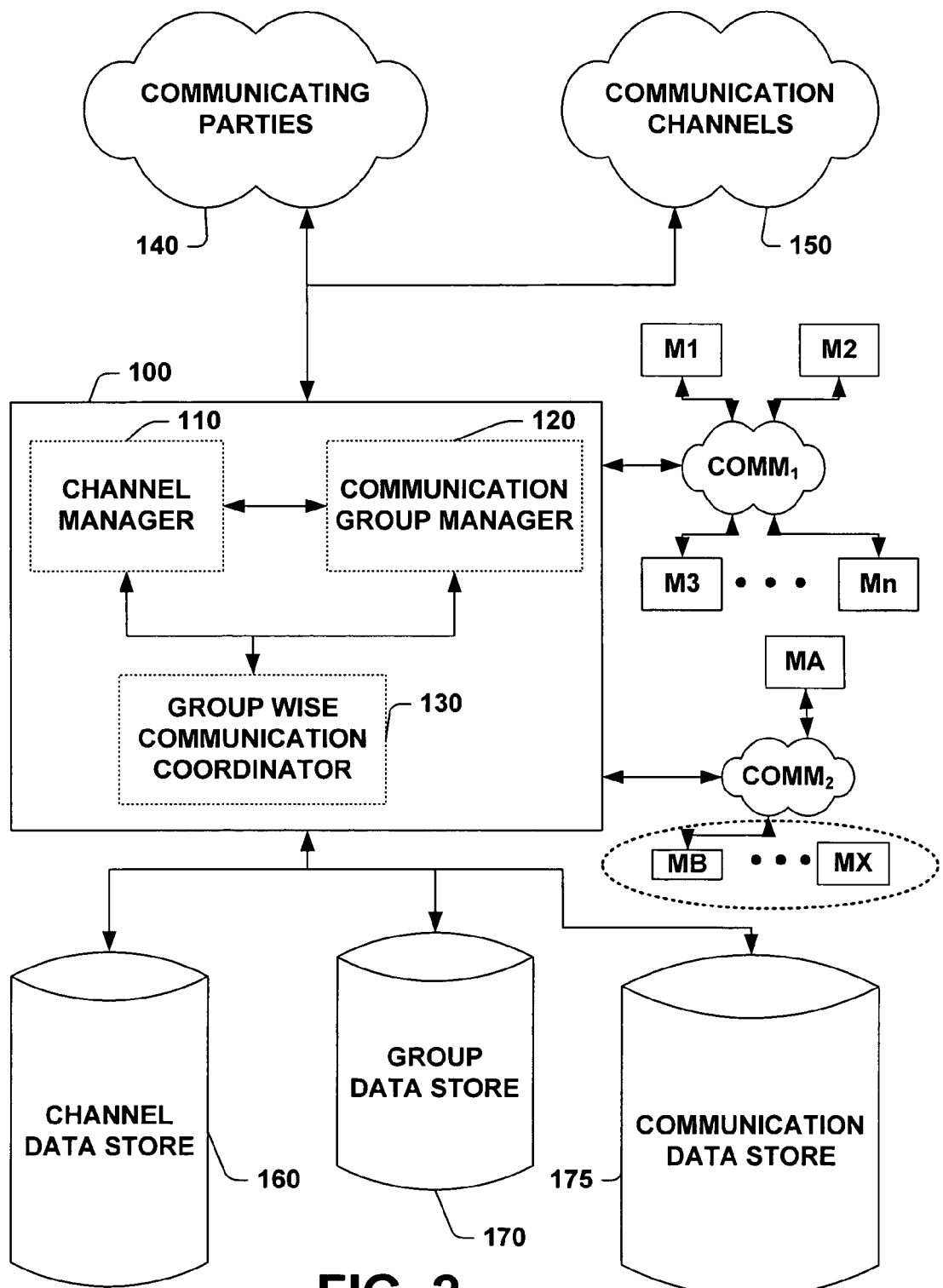
FIG. 2 is a schematic block diagram illustrating a system for facilitating optimizing utility of a communication by dynamically creating and managing distinctions about communicators and their context, including groupings of communicators and group communications, in accordance with an aspect of the present invention.

FIG. 2 is a schematic block diagram illustrating a communication selecting system 100 that facilitates optimizing utility of a communication. The system 100 dynamically creates and manages groups that account for distinctions about communicators and their context. The context of a person can include, for example, the person's presence or absence at a scheduled meeting. For example, calendar information concerning a person can indicate that a person is supposed to be at a meeting at a certain time. Therefore, the system 200 may have dynamically assigned the person to a group associated with the meeting (e.g., to ensure person receives meeting reminders). However, when the person becomes late for the meeting, the system 100 can dynamically assign the person to an additional group (e.g., people who are late for the meeting) and reminders that will be given a very high priority (e.g., breakthrough priority) are sent to the people in this group.

The context of a person can also include, for example, the location of a person. For example, cellular phones can provide location information. World events may transpire that require mass notification by very rapid means of an impending disaster to as many people as possible who are located in a certain geographic region. The system 100 can, through context analysis, dynamically assign people to groups based on their geographic location, if known. Furthermore, the system 100 can reason under uncertainty concerning a person's location and dynamically assign them to a group based on such reasoning. Thus, the activity-centric dynamic assignment of people to groups is complemented by context-centric dynamic assignment of people to groups, which facilitates maximizing the utility of communications based on membership in a group.

The system 100 facilitates maximizing utility of a communication based on a communicating party's membership in a group, the availability of a useful communication group, and preferences and/or contexts associated with the group(s). Increasing the utility of a group communication is a long-standing problem. Increasing utility of a group communication has been complicated by issues including, but not limited to, the complexities of scheduling group communications and the difficulties of assembling a useful group of entities with which to communicate. Scheduling problems arise due to factors like group members who travel, group members who live in different time zones, mismatched communication technology, conflicting schedules, conflicting available communication channels, monetary constraints and the like. Assembling a useful group of entities to communicate can be complicated by problems like shifting roles of group members, schedule conflicts, preferred communication channel conflicts, personality conflicts, knowledge conflicts and budget constraints.

The system 100 includes a communication group manager 120. The communication group manager 120 is a computer component that creates and manages groups whose members communicate along selected communication channels. The system 100 also includes a groupwise communication coordinator 130. The groupwise communication coordinator 130 is a computer component that selects and schedules/connects group members from available communicating parties 140 for communications. The communication group manager 120 can create and manage groups that were formed by, for example, prepopulating clusters, relationship processing, activity centric processing, context centric processing and/or the satisfaction group inclusion criteria by communicating parties.

The system 100 can also include a channel manager 110, which will be described in greater detail in association with FIG. 15. While a channel manager 110 is illustrated in the system 100 in FIG. 2, it is to be appreciated that the communication group manager 120 and the groupwise communication coordinator 130 can be employed in systems 100 that do not include the channel manager 110. The channel manager 110 is a computer component that selects a communication channel that will facilitate maximizing utility of a communication.

When scheduling a group communication, there may be a value to considering the cost of the communication. For example, the cost of the communication time (e.g., telephone time, videoconference time, packet costs), the cost of the personnel (e.g., hourly rate of attendees, opportunity cost of attendees) and the cost of delaying the communication (e.g., value of group communication while the stock market is open is different from value of group communication after the stock market has closed) may be considered. Conventionally, such costs, if analyzed at all, may have been manually analyzed by a skilled meeting scheduler. However, such skilled schedulers may be unique individuals with limited availability who are expensive to employ.

The utility of the communication can be evaluated according to formulae that consider the cost of the communication and the value of the communication as viewed from the points of view of both a sender and a receiver. An exemplary formula can take the form:

$$\text{utility} = u(\text{cost}_S, \text{value}_S, \text{cost}_R, \text{value}_R),$$

The utility calculations may weight the costs and/or benefits to the contactors and/or contactees differently based, for example, on membership in a group. By way of illustration, the value can be computed via a combination function f of other functions g and h that operate separately on the costs and the benefits to the contactor (the sender) and the contactee (recipient of the initial communication) as follows:

$$\text{utility} = f(g[(\text{value}_S * w1), (\text{cost}_S * w3)], h[(\text{value}_R * w2), (\text{cost}_R * w4)]).$$

By way of further illustration, consider a case where the value is a function of the difference of the costs and the benefits to the contactor and the contactee, as follows:

$$\text{utility} = f([(\text{value}_S * w1) - (\text{cost}_S * w3)], [(\text{value}_R * w2) - (\text{cost}_R * w4)]).$$

One example of such a difference function employs a multi-linear weighted combination of the separate terms for contactee and contactor, $$\text{utility} = w_S[(\text{value}_S * w1) - (\text{cost}_S * w3)] + W_R [(\text{value}_R * w2) - (\text{cost}_R * w4)]).$$

For such a formulation, diminishing $w_S$ to zero, removes the preferences of the contactor, and makes communication decisions depend on the preferences of the contactee. Diminishing $w_R$ to zero, makes communication decisions depend on the preferences of the contactor. Such adjustments to the weights, which can lead to diminutions and/or enhancements of the relative importance of the contactor and/or contactee costs and/or benefits can be based, for example, on membership in a group. For example, a communication recipient (contactee) may desire to take into account the preferences of people in a group defined as those "with whom I am meeting today" by assigning a high weight to $w_s$. However, for other groups, the user may desire that communication actions be based on maximizing expected utility by setting weight $w_s$ to zero, thus considering only the preferences of the contactee. An enterprise may impose a communication policy imposing a strong weight $w_s$ on the group of senior managers' preferences and less weight $w_r$ on the contactees' preferences when contacting people they manage and others at lower levels in an organization hierarchy, for example.

Similarly, weights associated with groups can be affected by context (e.g., time, location, activity). By way of illustration, the preferences of a group defined as "those actively engaged in combat" may be given a higher weight than a group defined as "those on vacation", where membership in the group changes dynamically. By way of further illustration, the preferences of a group defined as "those who have less than thirty minutes of free time today" might be given higher weight, where membership in such a group can be dynamically determined through analysis of calendar data.

The cost to the sender ($\text{cost}_S$) can be analyzed by examining a set of cost factors $\text{cost}_S = \{a, b, c, \ldots\}$ that can include, but are not limited to, the cost of making a connection instantly, the cost of making a connection at a later time, the cost of employing a particular channel and/or set of channels and the cost of not making a connection, where the costs may include actual costs and/or expected costs. Such costs can be measured by actual and/or opportunity cost in time, communication resources and/or human resources.

The value to the sender ($\text{value}_S$) can also be analyzed by examining a set of value factors $\text{value}_S = \{m, n, o, \ldots\}$ that can include, but are not limited to, the value of making an instant connection, the value of making a later connection and the value of employing a particular channel and/or set of channels, where the values can include actual values and/or expected values. The values can similarly be measured by actual and/or opportunity cost of time, communication resources, dollars, and/or human resources. The expected costs and/or expected values can be computed through deterministic processing and/or reasoning under uncertainty.

The cost to the receiver ($\text{cost}_R$) can be analyzed by examining a set of cost factors $\text{cost}_R = \{x, y, z, \ldots\}$ that can include, but are not limited to, the cost of making a connection instantly, the cost of making a connection at a later time, the cost of employing a particular channel and/or set of channels and the cost of not making a connection, where the costs can include actual costs and/or expected costs. Such costs and/or values can be measured by actual cost in time, money, human resources, and/or opportunity cost in time, money, human resources and/or communication resources, for example.

The value to the receiver ($\text{value}_R$) can also be analyzed by examining a set of value factors $\text{value}_R = \{p, q, r, \ldots\}$ that can include, but are not limited to, the value of making an instant connection, the value of making a later connection and the value of employing a particular channel and/or set of channels, where the values can include actual values and/or expected values. The expected costs and/or expected values can be computed through reasoning under uncertainty. The costs can vary over time, thus, a first set of costs $\text{cost}_S T_0$ computed for a first time $T_0$ may not be equal to a second set of costs $\text{cost}_S T_1$ computed for a second time $T_1$. Similarly, the values can vary over time and a first set of values $\text{value}_s T_0$ may not be equal to a second set of values $\text{value}_s T_1$. Thus, rather than producing a single value, the system 100 can produce a set of expected utilities for the communications via a plurality of communication channels.

Assembling a useful group has further complicated increasing the utility of a group communication. By way of illustration, a group meeting concerning which direction a ship should sail around an iceberg has limited value if the person steering the ship and the person with the power to order a direction change are not included.

Thus, one example of the present invention is employed to facilitate optimizing utility of a communication, where the system includes the channel manager 110 that identifies communication channels 150 that facilitate maximizing utility of the communication and a communication group manager 120 that manages a group of communicating parties that are analyzed by the channel manager 110 to facilitate optimizing utility of the communication. The communication channels 150 can include, but are not limited to, telephone channels, facsimile channels, computer channels, paging channels, proxy channels and personal channels. Information concerning such communication channels 150 can be stored, for example, in a communication channel data store 160.

The channel manager 110 identifies a communicating party group from the available communicating parties 140, analyzes data associated with that group (e.g., membership, inclusion criteria, context, preferences), identifies an individual communicating party group member that is involved with the communication that has unique characteristics (e.g., most important recipient, least important recipient, highest capacity, lowest capacity) and/or analyzes data associated with that communicating party group member (e.g., identity, location, needs). Based on such analysis, the channel manager 110 computes which communication channels 150 are likely to produce the greatest expected utility for the communication.

Channel selection depends, at least in part, on communicating party group membership. Group membership is predicated on the existence of groups. Thus, communicating parties 140 may be analyzed by the communication group manager 120 to produce groups. Multiple attributes concerning the communicating parties (e.g., people, processes, computers, apparatus), their preferences and their priorities are analyzed to facilitate building and managing groups. The attributes are further analyzed to facilitate establishing and adapting communication policies for members of the groups, where such policies can affect channel, time, group and security selections, for example. The groups can be based on factors like, the presence or absence of an entity in an address book, the time since the entity last communicated with another entity and/or group, the time left until a deadline with which the entity must comply, the presence and/or location of an entity in a collection (e.g., organization chart, family tree, team roster), the degree to which an entity is trusted by an individual, a group or by a related individual and/or group, whether a person has authored a document in which the user is interested, whether such document was authored within a pre-determined, configurable period of time (e.g., within the last thirty days), whether a person has met with the user within a pre-determined, configurable period of time (e.g., within the last week), whether the person is scheduled to meet with the user within a pre-determined, configurable period of time (e.g., has a meeting scheduled in the next two weeks), whether the person is actively working on a project of interest to the user, and who is attempting to initiate a communication. Thus, the communication group manager 120 analyzes multiple attributes to determine how and/or when to establish a group of communicating parties.

By way of illustration of group membership being employed in channel selection a user may be a person who has a tight schedule and who has to attend a lot of meetings. The subject matter of these meetings may be disjoint, and thus it may require mental gymnastics to keep the purpose of each meeting straight and to be able to focus on impending meetings. Thus, such a person can establish communication policies that are employed in dynamic assignment of people to communication groups based on the proximity of a desired communication to a meeting that concerns the communication. Communications that are attempted within a first time period (e.g., within an hour of the meeting), can trigger assigning the contactor to a high-priority communication group that is more likely to get the immediate attention of the contactee. Communications that are attempted outside that first time period (e.g., three weeks before the meeting, with at least ten intervening meetings on disjoint subjects), can trigger assigning the contactor to a lower-priority communication group whose messages will be examined by the contactor at a more convenient time than immediately before a meeting on another subject. Thus, the utility of communications to the user is increased by filtering communications in critical time periods (e.g., immediately before a meeting) to those communications that relate to the meeting. Thus, group membership simplifies aggregating abstractions for outcome utility processing and/or computation of ideal communication actions.

Information concerning the groups can then be stored in a group data store 170, for example. The group data store 170 may therefore store data including, but not limited to, group identity data, group preference data and group context data. The group identity data can include, but is not limited to, the name of a group, the membership of a group (where the membership can be stored in one or more data structures including, but not limited to, a list, a linked list, an array, a table, a database, a datacube, and the like), group classification data and group inclusion criteria. Group classification data can be, for example, information concerning how the group was formed, when the group was formed, additions/deletions/updates performed for the group, and group creator metadata associated with the group. The group inclusion criteria can be, for example, information concerning traits that make a communicating party eligible for membership in the group. Such traits can include, but are not limited to, the presence or absence of a communicating party in an address book, the time since the communicating party last communicated through the system 100, the time left until a deadline with which the communicating party must comply, the presence and/or location of the communicating party in a collection (e.g., organization chart, family tree, team roster), the relative location of a person in that organization chart (e.g., x levels up, y levels down, x and y being integers), the degree to which a communicating party is trusted (e.g., nuclear family member vs. known spammer), and who is attempting to initiate the communication through the system 100. Such traits can also include, for example, membership information associated with a project. A project can be a long-term undertaking (e.g., developing a new car) or a short-term undertaking (e.g., driving to the corner store). Thus, groups associated with projects can be formed and dissolved dynamically and over varying time periods.

The collections of communicating parties, which can be, for example, computer components, humans and/or machines, are dynamic, and can change in response to factors like time since last communication, value of last communication, average value of communication, change in status (e.g., joined organization, left organization, moved within organization), and time to deadlines. Thus, the communication group manager 120 can also dynamically modify the initial groups.

The groups may not be mutually exclusive, with a communicating party appearing in several groups. Determining when to create/delete/adapt a group and determining when to include/exclude a communicating party from a group involves processing information including, but not limited to, the identity of the communicating party, the location of the communicating party, the assigned task, the current activity of the communicating party, the attentional focus of the communicating party, the time of day, the ambient acoustics at the location of the communicating party, deadlines applicable to the communicating party, assets (e.g., hardware, software, proxies) available to the communicating party, cost of assets, value of assets, preferences, subscription to services and the like. Data concerning such information may not be complete, and thus reasoning employed to include/exclude/modify a communicating party in a collection can involve both deterministic reasoning and reasoning under uncertainty. Thus, the communication group manager 120 analyzes such data in determining when to create a new group of communicating parties, when to delete a group of communicating parties, when to merge two or more groups of communicating parties and/or when to partition a group of communicating parties into two or more groups. Furthermore, the communication group manager 120 also analyzes such data to determine when to add a communicating party to a group, when to remove a communicating party from a group, when to move a communicating party between groups and/or when to update information concerning the communicating party. By way of illustration, deadlines can affect the dynamic assignment of people to groups. For example, for a contactee who manages people involved on a project whose deadline is a long time away, people working on the project can be assigned to a low priority communication group whose communications will likely be reviewed at a time and manner of the desired contactee's choosing. Thus, the contactee can receive higher priority messages concerning projects with closer deadlines before lower priority messages. However, as the deadline approaches for the project, the people in the group can be progressively migrated to communication groups with higher and higher priorities until, as the deadline looms, such people may have migrated to the highest priority groups available and thus may have, for example, breakthrough priority for the contactee.

The communication group manager 120 and/or the group wise communication manager 130 also consider group preference data and/or group context data when determining how to manage groups and/or how to employ group members. The group preference data can include, but is not limited to, hardware that the group desires to use and/or hardware that an individual desires to use when interacting with members of that group, software that the group desires to use and/or software that an individual desires to use when interacting with members of that group, a time of day when the group desires to communicate or at which an individual desires to communicate with a group, a desired size for the group and a desired date before which or after which communications with and/or between the group will be given greater and/or lesser urgency. For example, as a deadline approaches, priority for communication with the group with the deadline may increase while priority with non-deadline groups may decrease. Such preference data can be stored, for example, in the group data store 170. While an individual group data store 170, channel data store 160 and communication data store 175 are illustrated, it is to be appreciated that the group data store 170, channel data store 160 and communication data store 175 can be implemented in a single data store and/or can be distributed in different combinations between two or more communicating and/or cooperating data stores.

By way of illustration of the use of time of day preferences in group assignment, consider a time period of great interest to parents with school-aged children, immediately after school lets out. During this time, many parents are still at work and yet many child-sized crises occur (e.g., I can't find my red jacket, can I go to Joe's for dinner). The impatient child may require immediate answers concerning these questions, and the parent can benefit from receiving such information (e.g., child going to Joe's and not returning home immediately). Thus, during these time periods communications from the child may be routed via high priority communication devices based, at least in part, on the child's membership in a group (e.g., child in family) and the time at which the communication is attempted.

The groups are analyzed to facilitate maximizing utility of a communication, either for an individual or a group. Thus, the context of the groups is analyzed as is the pending communication itself. A communication can be classified by factors including, but not limited to, the type of communication, its content, length, sender(s), recipient(s), context and the like. Information concerning the communication can be stored in a communication data store 175. Data packets containing channel, groups and/or communication information can be transmitted between the various system components. For more information concerning sample data packets, see the discussion associated with FIGS. 16 and 17.

The context of the communicating party can include data concerning, but not limited to, hardware data (e.g., current/anticipated capacity, current/anticipated bandwidth, current/anticipated availability, current/anticipated status, current/anticipated cost, revision data, metadata), software data (e.g., current/anticipated capacity, current/anticipated bandwidth, current/anticipated availability, current/anticipated status, current/anticipated cost, revision data, metadata) and observed data (e.g., time, date, activity, task, location, communication history, environment). Such context information can be stored in the group data store 170, for example. The preference, context and/or status data can be deterministic and/or uncertain. Thus, the system 100 can reason under uncertainty to infer values for uncertain data points.

The system 100 also includes a group wise communication coordinator 130. The group wise communication coordinator 130 is operably connected to (e.g., is in electrical, data, physical and/or logical contact with) the communication group manager 120. The group wise communication coordinator 130 identifies a subset of the communicating parties 140 based, at least in part, on group membership, channel data and/or communication data, where establishing the group communication between the identified subset of communicating parties will facilitate maximizing utility of the communication. Volunteer fire fighter examples provided hereafter illustrate selecting a meaningful subset of communicating parties to establish a useful group communication.

Thus, one example of the present invention facilitates optimizing the utility of a group communication and includes a group wise communication coordinator 130 that identifies a group of communicating parties that can communicate via the communication channels 150, where establishing the communication along the identified communication channels facilitates maximizing the utility of the communication. In the example, the groupwise communication coordinator 130 includes a group wise communication assembler that assembles the group of communicating parties and a group wise communication scheduler that schedules a time for the group communication that maximizes the utility of the communication.

While the group data store 170 can store information concerning the groups as groups, the group data store 170 can also store information concerning the group members. For example, the group data store 170 can store communicating party group member data including, but not limited to, the identity of a communicating party group member (e.g., name, classification, group memberships), preferences associated with the communicating party group member (e.g., hardware, software, time, date, location), and context data (e.g., hardware, software, observed).

Thus, in one example of the present invention, the system 100 creates and manages groups of communicating parties identified by an individual so that group parameters (e.g., individual preferences for communicating with group members) can be applied to an individual member of the group to maximize the utility of the communication. Thus, referring to communication $COMM_2$, the system 100 facilitates maximizing the utility of the communication $COMM_2$ between the communicating parties MA and MB, where MB is a member of the group that includes members from MB through MX, X being an integer. Since MB through MX are members of a group, the communicating party MA does not have to store individual preferences for the member MB, but can apply group information concerning the group(s) to which MB belongs to the member MB. Division head and working group examples provided hereafter illustrate communications like $COMM_2$.

The system 100 also facilitates selecting a subset of communicating parties from the managed groups of communicating parties that will facilitate maximizing the utility of a group communication. Thus, referring to communication $COMM_1$ between communication group members M1, M2, and M3 through Mn, n being an integer, the subset of communicating parties can be selected by the group wise communication coordinator 130 to facilitate maximizing the utility of the group communication. The communication can then proceed, for example, along a communication channel(s) selected by the channel manager 110. The subset M1 through Mn can include less than the entire set to which M1 through Mn belong. Volunteer fire fighter examples provided hereafter illustrate communications like $COMM_1$.

Therefore, based on the capabilities described above, group management decisions can be based on one or more determinations of whether two or more communicating parties: are or are likely to become concurrently engaged in a related activity; are or are likely to become concurrently engaged in a similar activity; are or likely to concurrently process one or more related documents; are or are likely to concurrently view one or more related documents; are or are likely to concurrently become engaged in a shared project; are or are likely to become scheduled to communicate within a pre-defined period of time; have communicated within a pre-defined period of time; are or are likely to become scheduled to meet within a pre-defined period of time, and have met within a pre-defined period of time. Similarly, group management decisions can be based on one or more determinations of whether a communicating party: has engaged in one or more pre-defined activities of interest within a pre-defined period of time; is likely to engage in one or more pre-defined activities of interest within a pre-defined period of time; has purchased one or more pre-defined items of interest within a pre-defined period of time; has registered an interest in one or more pre-defined items of interest within a pre-defined period of time, and the degree to which a communicating party is trusted by one or more other communicating parties. It is to be appreciated that there can be one or more different pre-defined times for each of the items listed above, and that such times can be independent of each other. It is to be further appreciated that there can be one or more different activities and/or items of interest for the items listed above, and that such activities and/or items can be independent of each other.

While FIG. 2 is a schematic diagram illustrating components for the system 100, it is to be appreciated that the system 100 can be implemented as one or more computer components, as that term is defined herein. It is to be further appreciated that computer executable components operable to implement the system 100 can be stored on computer readable media including, but not limited to, an ASIC (application specific integrated circuit), CD (compact disc), DVD (digital video disk), memory, read only memory (ROM), random access memory (RAM), programmable ROM (PROM), floppy disk, hard disk, EEPROM (electrically erasable programmable read only memory), carrier wave, and memory stick.

Figure 3:
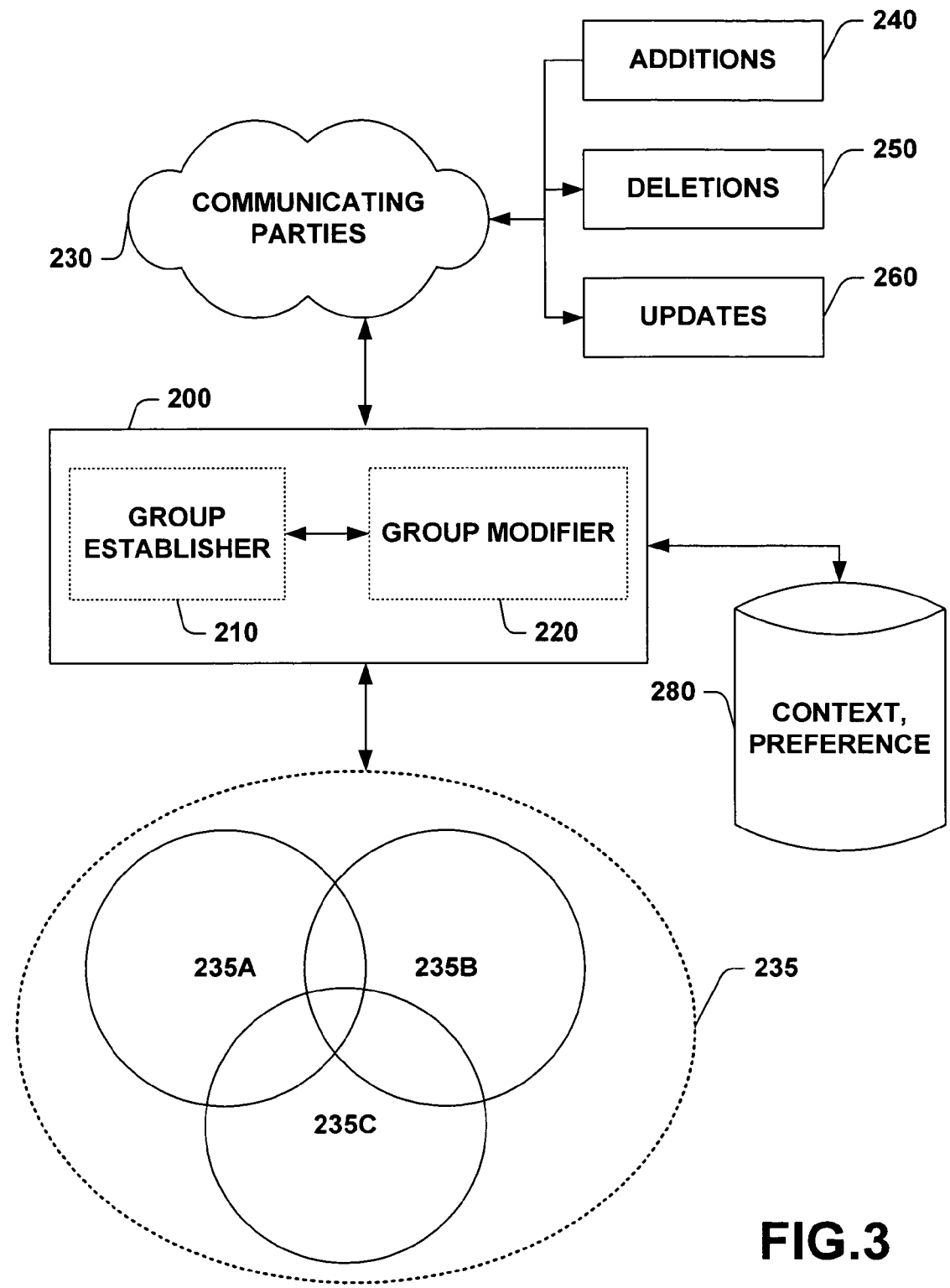
FIG. 3 is a schematic block diagram illustrating a system for establishing and modifying groups, in accordance with an aspect of the present invention.

FIG. 3 illustrates a system 200 for establishing and modifying groups. The system 200 includes a group establisher 210 and a group modifier 220. The group establisher 210 is a computer component that analyzes communicating parties 230 and produces groups 235. The group modifier 220 is a computer component that dynamically modifies the groups 235.

The groups 235 can include one or more groups, for example the groups 235A, 235B and 235C. A communicating party from the available communicating parties 230 can be placed in one or more of the groups 235. Thus FIG. 3 illustrates an intersection between groups 235A and 235B, 235B and 235C, 235A and 235C, and 235A, 235B and 235C. While three groups are illustrated, it is to be appreciated that a lesser and/or greater number of groups can be established by the system 200. It is to be further appreciated that although intersection between the groups 235A, 235B and 235C is illustrated that groups formed by the group establisher 210 and/or groups modified by the group modifier 220 can have a greater and/or lesser degree of intersection and can, in one example of the present invention, be mutually exclusive.

In one example of the present invention, the group establisher 210 performs actions including but not limited to, creating new groups of communicating parties, deleting groups of communicating parties, merging two or more groups of communicating parties into one group and partitioning a group of communicating parties into two or more groups. By way of illustration, the group establisher 210 can analyze the communicating parties 230 and determine that a combination of a number and type of communicating parties that satisfies a pre-determined, configurable threshold for group creation warrants the creation of a new group. The pre-determined configurable threshold can be based, for example, on a function that considers both the number of communicating parties with similar traits (e.g., name, location, preferences, communication channels available) and the degree of similarity between such traits. For example, identifying three communicating parties that share ten traits can trigger the creation of a new group. The number and type of group members can be configured (e.g., via a graphical user interface), and can be adapted pursuant to human and/or machine learning during the operation of the present invention. Thus, the group establisher 210 can receive feedback concerning groups that it creates, and can, therefore, engage in a higher and/or lesser degree of group formation based on such feedback. By way of further illustration, the group establisher 210 can examine the set of groups that it created and that the group modifier 220 modified, and determine that two groups have become so similar that the two groups should be merged into one group. By way of still further illustration, the group establisher 210 can examine a group that it created and that the group modifier 220 modified, and the group establisher 210 may determine that the group has become so diverse that two, more focused groups are warranted.

Such changes occur because the available communicating parties 230 change. For example, additions 240 to the available communicating parties 230 may occur, deletions 250 from the available communicating parties 230 may occur, and updates 260 to existing members of the available communicating parties 230 may occur. By way of illustration of an addition 240, a new computer network may become available to the system 200, and thus the available communicating parties 230 can expand to include communicating parties (e.g., humans, computers), associated with the newly available network. By way of illustration of a deletion 250, a worker may leave an organization that employs the system 200 and thus the available communicating parties 230 can be reduced. By way of illustration of an update 260, a worker in an organization that employs the system 200 may change jobs within the organization (e.g., promoted to a higher rank), and thus data associated with the promoted worker can be updated to reflect greater security, higher priority, and more consideration of that worker's preferences. Such an update can be achieved, via the present invention, by moving the worker to a different group, for example.

The context and preferences of communicating parties and/or groups with which the system 200 interacts are not static. Thus, the group establisher 210 and/or the group modifier 220 can analyze context and/or preference information concerning the communicating parties 230 and/or the established/modified groups 235. Such context and/or preference information can be stored, for example, in a context/preference data store 280. While a single context/preference data store 280 is illustrated, it is to be appreciated that the data store 280 can be implemented in two or more data stores distributed between two or more computer components.

Since the context and preferences of the communicating parties 230, the groups 235 and/or individuals who desire to employ the groups 235 and/or information associated with the groups to facilitate maximizing the utility of a communication may change, the communication group establisher 210 can analyze such preferences and contexts when establishing a group. Additionally and/or alternatively, the group establisher 210 can analyze information like communication channels employed by the communicating parties 230 and/or the groups 235, communication channels available to the communicating parties 230 and/or groups 235. For example, the group establisher 210 can create a group based on the ability of communicating parties to share a particular communication channel (e.g., collaborative editing, instant messaging). The group establisher 210 can also analyze information like the frequency with which parties communicate. For example, if a group of five communicating parties communicates daily, or perhaps even more frequently, then the group establisher 210 can create a group to increase the utility of communications between such a tight group of frequent communicators. By way of illustration, if a graduate assistant receives email from a group of undergraduates on a daily basis concerning the course that the graduate assistant is teaching, then the group establisher 210 can create a group that facilitates maximizing the utility of the email communications between the students and the graduate assistant. The group establisher 210 can also consider the amount of time remaining until a deadline must be met by a group when creating a group. For example, the graduate assistant may be tutoring one hundred students, but ten of those students may be seniors who are four weeks from potential graduation. Thus, the group establisher 210 can, for example, create a group that facilitates maximizing the utility of communications between the hopefully graduating seniors and their tutor. The group establisher 210 can also consider the position of communicating parties when creating groups. For example, the graduate assistant may receive communications from professors, other graduate assistants and students. The group establisher 210 can determine that heightened security should be applied to communications from professors and thus can create a separate group with separate inclusion criteria (e.g., above graduate assistant on organization chart) and separate security (e.g., encrypted email only). Similarly, the graduate assistant may receive communications from family members, both distant and near, especially if the graduate assistant has a frequently queried skill (e.g., system administrator skills, tax preparation skills). Thus, the group establisher 210 may set up different groups based, at least in part, on the location of an individual in the graduate assistant's family tree.

The group establisher 210 can also consider the trustworthiness of communicating parties when determining whether to create/delete/merge/partition groups. For example, a first set of communicating parties may be considered very trustworthy, (e.g., professors) while another set of communicating parties may not be considered to be as trustworthy (e.g., competing graduate assistants). Thus, the group establisher 210 can create separate groups based on such trustworthiness. In some situations, the group establisher 210 may not have information concerning the trustworthiness of a communicating party as related to a first communicating party, but the group establisher 210 may have information concerning the trustworthiness of a communicating party as determined by a second related communicating party.

The group establisher 210 can also consider the initiator of a communication in determining when to create/delete/merge/partition a group. For example, if a communicating party frequently initiates communications with a group of communicating parties (e.g., sends five emails a day to members of a fantasy soccer league), then the group establisher 210 can establish a separate group for such communicating parties. Thus, the group establisher 210 can consider not only identity of communicating parties, but also subject matter of communications when dynamically assigning people to groups. For example, a first communicating party may have communicated with a user concerning one topic exclusively. However, when the first communicating party asks about the fantasy soccer league, the first communicating party may be dynamically assigned to the group associated with the soccer league.

The group modifier 220 can similarly analyze context, preferences and channel properties when determining whether to modify (e.g., add, delete, move, update) a member's relationship with a communication group. Since the context, preferences and channel properties can change, and in fact are likely to be in constant flux, the group modifier 220 can dynamically modify the member's relationship. Furthermore, the group modifier 220 can monitor communications undertaken by communication group members and dynamically update group membership based on such communications.

By way of illustration, a communication group manager can determine that a channel user has initiated an increasing number of high-priority channel communications with a select group of communication recipients. This may occur, for example, when a release deadline is approaching and a manager is frequently checking status with project leaders. Thus, based on machine learning, the communication group manager can form a new group (e.g., people to whom the user has initiated communications with a certain frequency within a certain time period via pre-determined means that have been responded to within a pre-determined response period) and can assign high-priority real-time communication channel preferences to such a group. By way of further illustration, based on machine learning the communication group manager can form a new group (e.g., people who have contacted the user more than a pre-determined number of times to whom the recipient has not responded or to whom the recipient has sent "cease and desist" responses (e.g., stop sending me unsolicited email "spam")) and can assign low-priority non-real-time communication channel preferences and/or blocks to such a group.

The group modifier 220 can similarly consider communication channels available to the communication group member and the lengths of communications in which communicating parties engage (e.g., one kilobyte transfers, ten megabyte transfers, one minute phone calls, hour long phone calls). For example, short phone calls can be analyzed and affect group membership in a group that has established cellular communications as a preference while long phone calls, which are more likely to drain battery resources, can affect group membership in a group that has established POTS (plain old telephone system) telephony as a preference. The group modifier 220 can also consider factors including, but not limited to, the subject matter of communications, the time between communications, group deadlines, organizational position, family relationships, indicia of trustworthiness and initiating party data to determine whether to modify a group. It is to be appreciated that the system 200 can be employed with the system 10 (FIG. 1).

While FIG. 3 illustrates components for the system 200, it is to be appreciated that the system 200 can be implemented as one or more computer components, as that term is defined herein. Thus, it is to be appreciated that computer executable components operable to implement the system 200 can be stored on computer readable media including, but not limited to, an ASIC, CD, DVD, ROM, RAM, PROM, floppy disk, hard disk, EEPROM, carrier wave, and memory stick.

Figure 4:
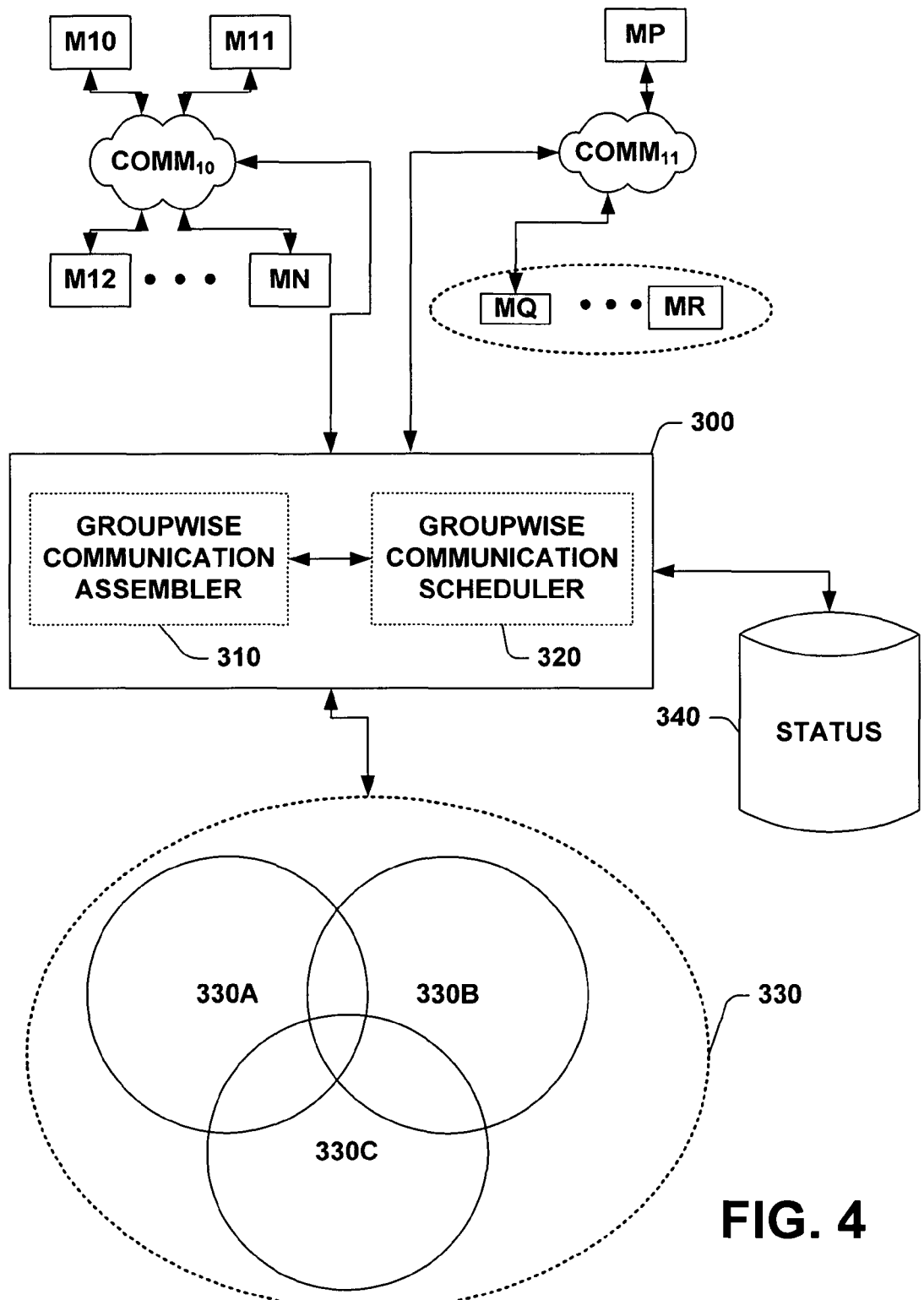
FIG. 4 is a schematic block diagram illustrating a system for assembling and scheduling group communications, in accordance with an aspect of the present invention.

FIG. 4 is a schematic block diagram illustrating a system 300 for assembling and scheduling group communications. The system 300, which can be referred to as a groupwise communication coordinator 300, includes a groupwise communication assembler 310 and a groupwise communication scheduler 320. The groupwise communication assembler 310 is a computer component that selects a useful set of communicating parties. The useful set of communicating parties can depend, for example, on people who are working on a project that interests a user. For example, a user may be working on three contracts, each of which concerns separate subject matter. The user can than benefit from having different communication groups associated with communications concerning the separate subject matters and the people involved with those contracts. Separate groups may also be formed concerning contract law that applies to all three contracts. The groupwise communication scheduler 320 is a computer component that establishes and/or schedules the communication between the useful set selected by the groupwise communication assembler 310. For example, when the user wants to discuss a first contract, members in the group associated with the first contract can be contacted while when the user wants to discuss contract law, members in the group associated with contract law can be contacted.

Given the groups 330, (e.g., group 330A, group 330B, group 330C), which may have been formed, for example, by a group establisher (e.g., group establisher 210, FIG. 3), the groupwise communication assembler 310 assembles a subset of communicating party members from the groups 330 so that the subset facilitates maximizing the utility of the group communication. Such assembling is based, at least in part, on the status of the communicating parties, where status information can be stored in a status data store 340. The groupwise communication scheduler 320 schedules a time(s) for the communication between the meaningful subset, where the selected time(s) facilitate maximizing the utility of the group communication. Thus, abstractions concerning the members of the groups 330 that are captured by inclusion in a group facilitate selecting an ideal time, channel, and/or group, for example, for a communication. In one example of the present invention, the ideal time, channel and/or group is determined by maximizing a measure of utility. Calculations concerning such maximization can be simplified by the abstractions captured by the groupings.

The groups 330 may include, for example, communication party members M10 through MN, N being an integer. In one group communication handled by the present invention, the groupwise communication assembler 310 can be tasked with assembling a meaningful group for a group communication $COMM_{10}$ that concerns an approaching deadline for a software project. A group establisher (e.g., group establisher 210, FIG. 3) may have formed a group 330A that includes the members of the programming team and may similarly have formed a group 330B that includes contracting executives from the company for whom the software is being written. Thus, the groupwise communication assembler 310 can identify group member classifications (e.g., programming team management, contracting party management) that are required for the communication $COMM_{10}$. Since project status updates typically do not require participation of one hundred percent of the management teams on both sides of the project, the groupwise communication assembler 310 can therefore identify a minimal number of communicating parties from the group member classifications required for the communication. For example, the communication $COMM_{10}$ may require two members from the programming team management (which may have five total members), and two members from the contracting party management (which may have three total members). Having identified the group member classifications and the minimal number of communicating parties, the groupwise communication assembler 310 can then verify that the minimal number of communicating parties are available at various times for a group communication. For example, the groupwise communication assembler 310 can examine the calendars and schedules of the communicating parties, if available, to determine a set of available times for the communication $COMM_{10}$. If calendar and/or schedule data is not available, then the groupwise communication assembler 310 can reason under uncertainty to predict times at which the communicating party members are likely to be available. For example, if ten previous communications between the programming team management and the contracting party management have occurred at 10:30 a.m. on a Monday, then the groupwise communication assembler 310 can infer that the communicating parties are likely to be available for $COMM_{10}$ at a similar time. Furthermore, the groupwise communication assembler can determine that dynamically creating a new group each Monday morning of people who are available for a weekly update is appropriate. Thus, each Monday morning, people can dynamically be assigned to a group for the purpose of the update and for the duration of the meeting, with the group being dissolved after the meeting.

The groupwise communication scheduler 320 can then schedule, calendar and/or initiate processing to establish the communication $COMM_{10}$. By way of illustration, if the groupwise communication assembler 310 identified ten different meaningful subsets of communicating parties that satisfied the group member classification and minimal number of parties criteria, then the groupwise communication scheduler 320 can compute the expected utility for each of these meaningful subsets and schedule, calendar and/or initiate the group communication $COMM_{10}$ based on maximizing the expected utility. For example, a conference call can be scheduled between a subset of the programming team management and the contracting party management identified by the groupwise communication assembler 310 at a time that was identified as available in their respective calendars and reserved by the groupwise communication scheduler 320. Thus the communication $COMM_{10}$ may proceed between the subset of communicating parties M10, M11, and M12 through MN, (N being an integer), that the groupwise communication assembler 310 predicts will maximize the utility of the communication $COMM_{10}$ at the time(s) predicted by the groupwise communication scheduler 320 to maximize the utility of the communication $COMM_{10}$.

The groupwise communication assembler 310 can also be tasked with assembling a group with which a communicating party MP desires to have a communication $COMM_{11}$. For example, a local national guard company commanding officer may desire to initiate a call up of his forces in preparation for deployment. Thus, the groupwise communication assembler 310 can select a meaningful subset of communicating parties (e.g., executive officer, platoon commanders, platoon seconds-in-command, company sergeant-major, platoon sergeants) that are sufficient to initiate the call up. Such a meaningful subset can be required to have a minimal number of parties from each of several categories (e.g., a predetermined number of officers from each platoon, a predetermined number of non-commissioned officers from each platoon). The groupwise communication scheduler 320 can then attempt to initiate, schedule and/or calendar the call up communication $COMM_{11}$ as soon as possible. It is apparent that the communication $COMM_{10}$ may be less time critical than the communication $COMM_{11}$, and thus the relative weights accorded to the preferences of the communicating parties may be varied based on the time critical nature of a communication. For example, preferences associated with M10 through MN can be analyzed to facilitate maximizing the utility of $COMM_{10}$ while considering the convenience of the time for the communicating parties, while preferences associated with commanding officer MP can be weighted more heavily than the preferences of MQ through MR, due to the time critical nature of $COMM_{11}$. It is to be appreciated that the system 300 can be employed with the system 10 (FIG. 1).

Figure 5:
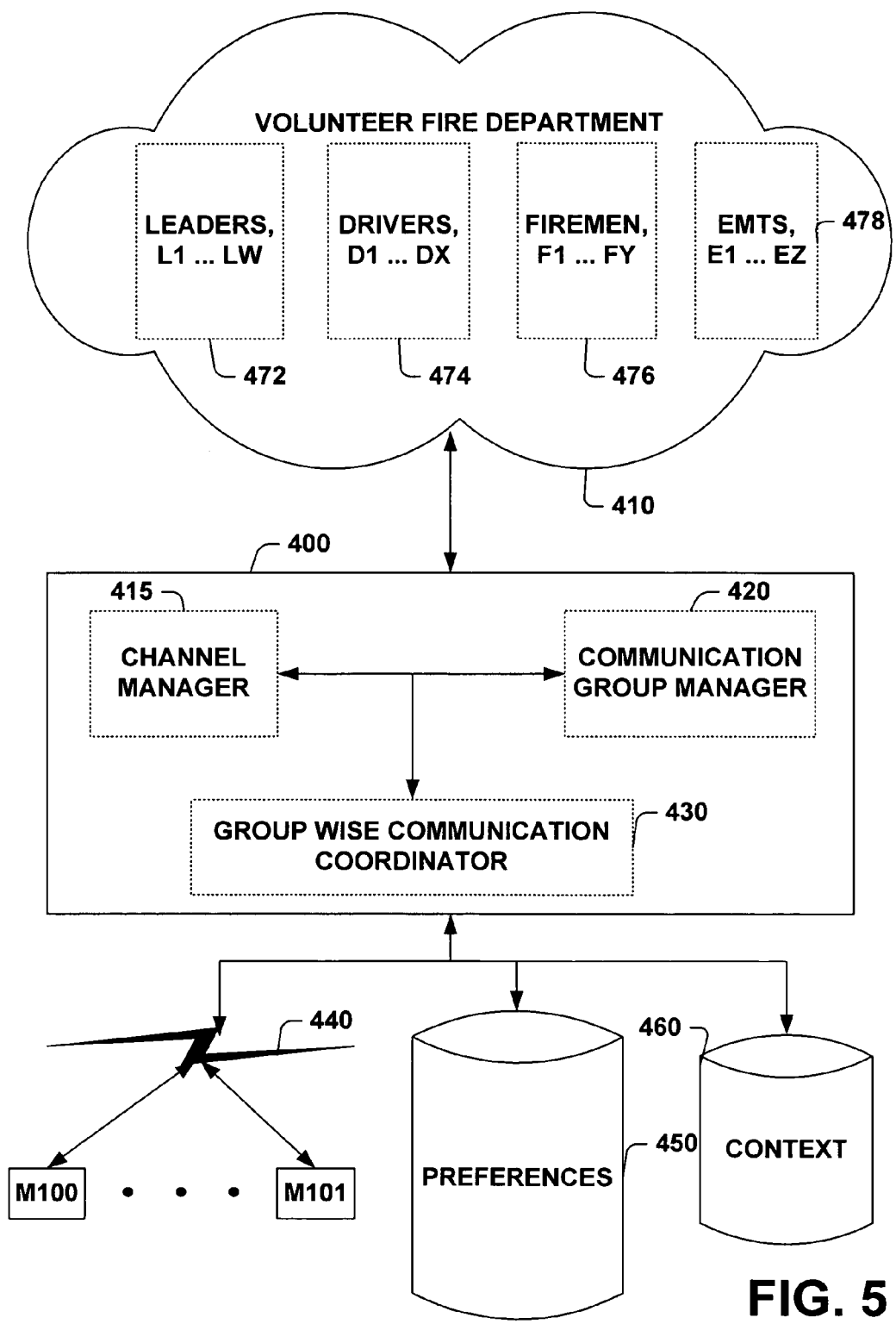
FIG. 5 is a schematic block diagram illustrating a system for analyzing group communications, in accordance with an aspect of the present invention.

FIGS. 5 through 9 demonstrate the creation, modification and analysis of groups by the present invention. Thus, FIG. 5 illustrates a system 400 for analyzing group communications associated with a volunteer fire department 410. The system 400 includes a channel manager 415, a communication group manager 420 and a groupwise communication coordinator 430 that maximize the utility of a communication 440 between communicating party members M100 through M101, where the communicating party members M100 through M101 are members of the volunteer fire department 410. A volunteer fire department is one example of a pre-populated group that can be further processed by relationship analysis, activity-centric analysis and/or context-centric analysis. For example, while a volunteer fire fighter group can be pre-populated (e.g., through a user interface), and some communication policies can apply to all members of the group, at times, sub-groups may need to be formed from the pre-populated group. Such sub-groups can be generated, for example, by relationship processing (e.g., to identify firemen available for different shifts (e.g., day shift, night shift)), by satisfaction of inclusion criteria (e.g., to identify firemen with different skill sets or properties), by activity-centric processing (e.g., to identify firemen who are engaged in a task (e.g., responding to a call)) and/or context-centric processing (e.g., to identify firemen who are in a certain state (e.g., medical leave)).

The system 400 considers the preferences of the members of the volunteer fire department 410. Thus, data concerning such preferences can be stored in a preferences data store 450. While a single preferences data store 450 is illustrated, it is to be appreciated that the preferences data store 450 can be distributed between two or more communicating and/or cooperating data stores 450. The preferences data store 450 can store the preference data in data structures including, but not limited to, one or more lists, arrays, tables, databases, stacks, heaps, linked lists and data cubes.

The system 400 also considers the context of the communicating parties and the communication channels by which the communicating parties will communicate. Thus, data concerning such context can be stored in a context data store 460. While a single context data store 460 is illustrated, it is to be appreciated that the context data store 460 can be distributed between two or more communicating and/or cooperating data stores 460. The context data store 460 can store the preference data in data structures including, but not limited to, one or more lists, arrays, tables, databases, stacks, heaps, linked lists and data cubes.

The volunteer fire department 410 may include groups like a leaders group 472, a drivers group 474, a firemen group 476 and an EMTs (emergency medical technician) group 478. While the four groups are shown as mutually exclusive groups, it is to be appreciated that there may be intersection between the groups. For example, a fireman may also be an EMT. When a call is received by the volunteer fire department 410, the communication group manager 420 and the groupwise communication coordinator 430 can cooperate to identify useful teams of volunteer firefighters and to establish communications with one or more such useful teams. The system 400 can be employed, for example, by the volunteer fire department 410 to maximize the utility of communications concerning assembling a fire fighting team to fight a fire. Therefore, the channel manager 415 can identify potential communication channels through which the group communication 440 may occur. The communication group manager 420 may have previously have been employed to create and/or modify groups associated with the firefighters, and thus the groupwise communication coordinator 430 can select a meaningful subset from the volunteer fire department 410 and establish the communication 440. By way of illustration, to fight a detached home fire, a meaningful subset may require one leader, two drivers (one for fire truck, one for ambulance), six firemen and one EMT. Thus, from the available leaders 472 (e.g., leaders L1 through LW), the available drivers 474 (e.g., drivers D1 through DX), the available firemen 476 (e.g., firemen F1 through FY) and the available EMTs 478 (e.g., EMTs E1 through EZ), the groupwise communication coordinator 430 can identify subsets like {L1, D1, D2, F1 . . . F6, E1, E2} and {L1, D2, D5, F7 . . . 12, E1, E3} and then attempt to establish communications, to assemble such subsets. While the system 400 considers the preferences of the communicating parties (e.g., desired communication channels, desired communication times, desired communication group), due to the time critical nature of a burning house, the preferences of the leader group 472 can be given precedence over the preferences of other groups. Furthermore, while the system 400 considers the context in which the communicating parties are situated and/or the context of the communication channels, again, due to the time critical nature of responding to a burning house, certain contextual factors (e.g., widest possible communication to most possible members of subsets in most timely fashion) can be weighted more heavily than other contextual factors (e.g., time of day). For example, while a volunteer fireman may prefer to receive phone calls on a land line when a house is burning, simultaneous communications via a siren in the town hall, land line phone, cellular phone, page and personal modalities may be selected to assemble the meaningful subset in the most timely manner possible.

The system 400 can also be employed, for example, by the volunteer fire department 410 to maximize the utility of communications concerning assembling an EMT team to respond to an automobile accident. Thus, a different meaningful subset (e.g., one leader, one driver, three EMTs) may be required. While two different types of communications are illustrated, it is to be appreciated that a greater and/or lesser number of types of communications can be processed by the present invention. It is to be further appreciated that although the volunteer fire department 410 is illustrated with four groups, that a greater and/or lesser number of groups may be processed by the present invention.

After the useful subsets of communicating parties have been identified, the system 400 can dynamically assign such parties to a group based on the activity in which they will engage. For example, a "currently fighting a fire" group can be established or a "currently responding to a car crash" group can be established. Such activity-based associations of people can facilitate increasing the utility of communications between such group members and/or with such group members. For example, radio frequency bandwidth is an increasingly scarce resource. Thus, while hundreds of firemen may have access to available frequencies, only those actively engaged on a call (e.g., burning house, car crash) may be allowed to transmit over such frequencies, which increases the likelihood that their communications will be effective.

Figure 6:
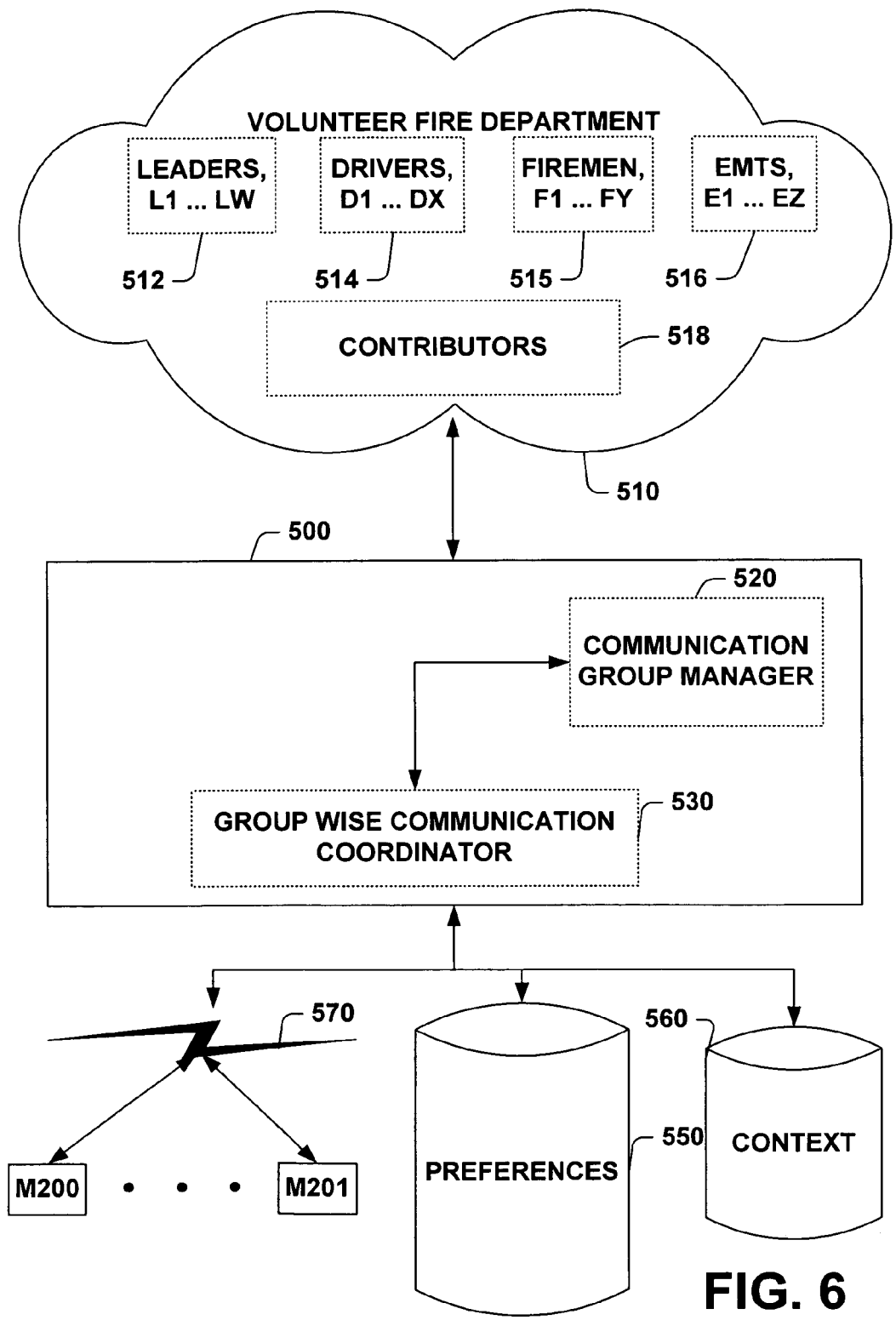
FIG. 6 is a schematic block diagram further illustrating a system for analyzing group communications, in accordance with an aspect of the present invention.

FIG. 6 illustrates a system 500 for analyzing group communications associated with a volunteer fire department 510, where in addition to the fire fighting personnel (e.g., leaders 512, drivers 514, firemen 515 and EMTs 516), the groups established by the communication group manager 520 include a group of contributors 518 (e.g., donors of cash and equipment). The system 500 includes a communication group manager 520 and a groupwise communication coordinator 530 that cooperate to select a communication channel, a communication group and a communication time that maximize the utility of a communication 570 between the communication group. As opposed to the time-critical example of FIG. 5 (a burning house), FIG. 6 concerns a less time critical communication that concerns a fund-raising meeting. FIG. 6 illustrates that the communication group manager 520 and the group wise communication coordinator 530 may operate independently of a channel manager.

The system 500 can apply a different analysis to the preferences 550 of the communicating parties and the context 560 of such parties. For example, given that the volunteer fire department 510 desires to receive additional funding from the contributors 518, the preferences 550 and context 560 of such contributors 518 can be weighted more heavily than the other members of the volunteer fire department 510. By way of illustration, the communication 570 may concern the annual Fourth of July celebration that serves as the primary fund raiser for the volunteer fire department. While the majority of the leaders 512, drivers 514, firemen 515 and EMTs 516 prefer to plan the fund raiser by email and telephone communications, the two contributors 518 who contribute the most money and/or equipment may prefer a lengthy weeknight meeting. Thus, to facilitate maximizing the utility of the communication 570 (e.g., raising the most amount of money), the preferences of the leaders 512, drivers 514, firemen 515 and EMTs 516 may be subjugated to the preference of the contributors 518. Furthermore, the context of the contributors 518 (e.g., extremely busy, physically challenged), can be weighted more heavily in scheduling the time and/or place for the meeting (e.g., wheelchair accessible hall close to contributor's home). Thus, the system 500 can reason differently given different communication needs (e.g., time critical vs. preference critical). Furthermore, once the identities of the contributors and firemen who will be attending the lengthy weeknight meeting are established, a separate group can be formed to facilitate communication between the members. Such activity-centric dynamic groupings facilitate creating and dissolving groups based on activities.

In some situations, the system 500 may have incomplete information concerning the preferences 550 and/or the context 560 of the communicating parties. Thus, the system 500 can reason under uncertainty concerning the preferences 550 and/or context 560. In one example of the present invention, the system 500 can employ decision-theoretic formulae to facilitate such reasoning.

Figure 7:
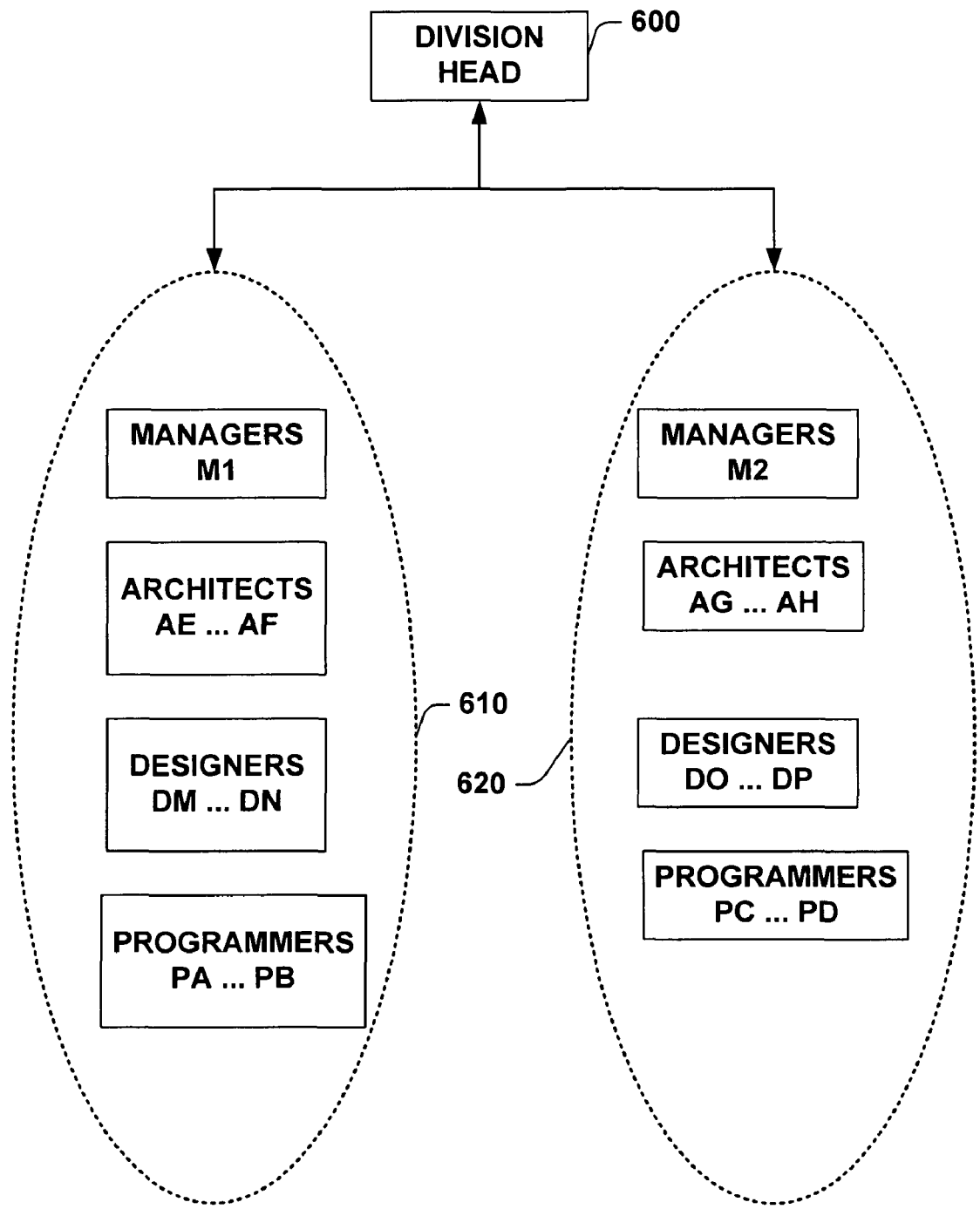
FIG. 7 illustrates groups affected by group management, in accordance with an aspect of the present invention.

FIG. 7 illustrates the effects of group management performed by the present invention. FIG. 7 illustrates a division head 600 and two groups (group 610 and group 620), associated with a software design team. The two groups both report to the division head 600. The division head 600 may employ the present invention to facilitate maximizing the utility of communications with the groups and/or with members of the groups. Furthermore, ad hoc, activity based sub-groups of the groups 610 and 620 can be formed based, for example, on activities in which the members are engaged. Thus, optimizing the utility of a communication between the division head 600 and a group member can be facilitated based on the preferences of the division head 600 as applied to group members, reducing the need to store individual preferences for each group member. Furthermore, the utility of communications between group members can be improved through the establishment, monitoring and/or enforcement of organizational preferences.

An aspect of the present invention (e.g., a group establisher) may have formed the groups 610 and 620 based on initial configuration data supplied by the division head 600 (e.g., organization chart) and on initial preferences, contexts and/or assumptions. This would be an example of a prepopulated cluster. Thus, the group 610 may be a programming team associated with new development of a product while the group 620 may be a programming team associated with maintenance programming. The programming team 610 may include managers, architects, designers and programmers and the maintenance team may similarly include managers, architects, designers and programmers.

Figure 8:
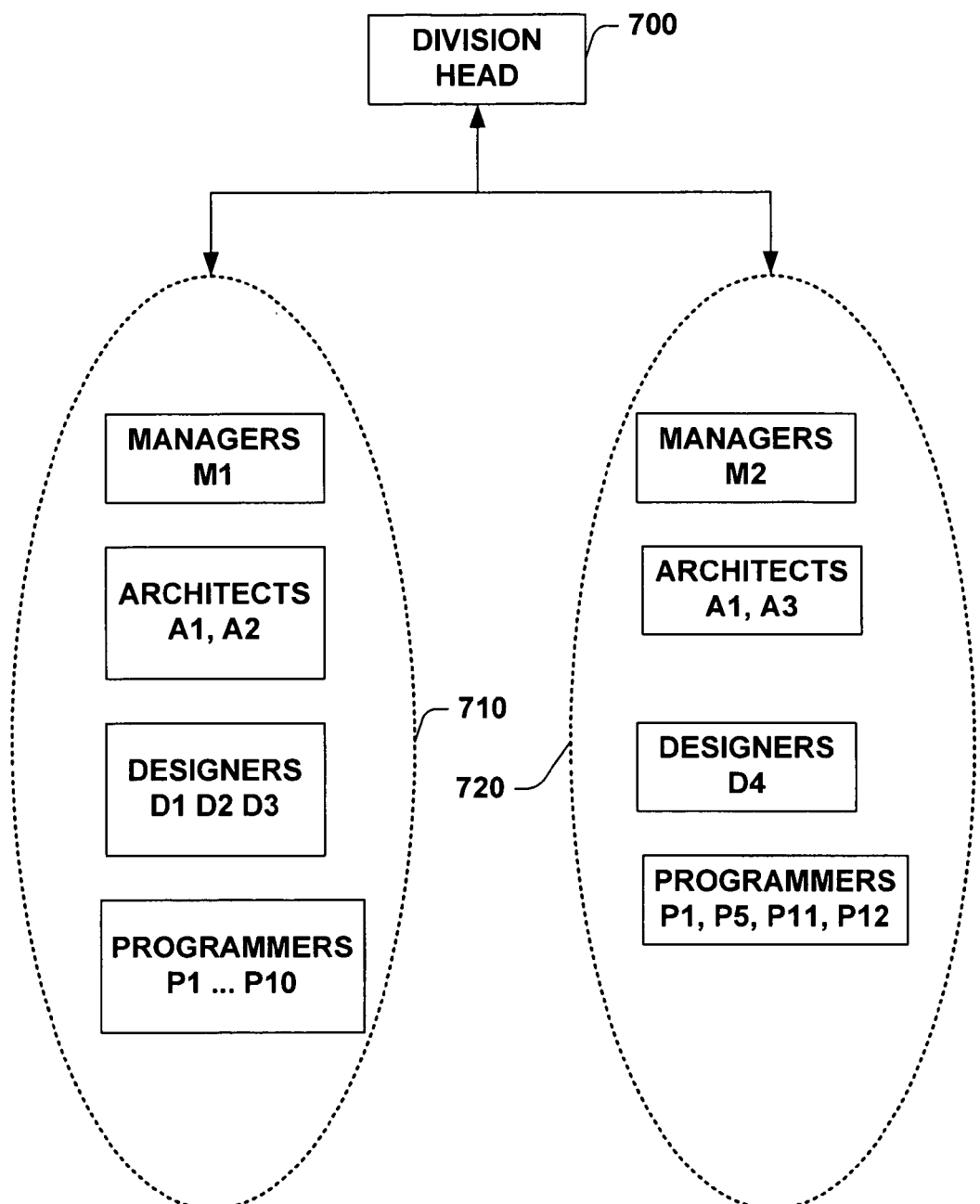
FIG. 8 further illustrates groups affected by group management, in accordance with an aspect of the present invention.

FIG. 8 illustrates one possible configuration of groups that are established, modified and analyzed by the present invention. A division head 700 controls a group 710 that is responsible for new development. The group 710 includes a manager M1, architects A1 and A2, designers D1, D2 and D3 and programmers P1 through P10. The group 720, which similarly reports to the division head 700, and which is responsible for maintenance programming, includes a manager M2, architects A1 and A3, a designer D4 and programmers P1, P5, P11, and P12. Thus, while there is mutual exclusivity between the managers in the two groups there is an intersection between the architects. Similarly, while there is mutual exclusivity between the designers, there is intersection between the programmers. The group 710 and the group 720 may have been initially formed by a group establisher, and/or may have been modified by a group modifier. The modifications may be performed, for example, after monitoring communications between the division head 700 and the groups and/or after monitoring communications between group members. In one example of the present invention, decisions concerning modifying the groups may be reviewed by machine learning algorithms, which can make it more or less likely that similar reorganizations occur in the future.

Figure 9:
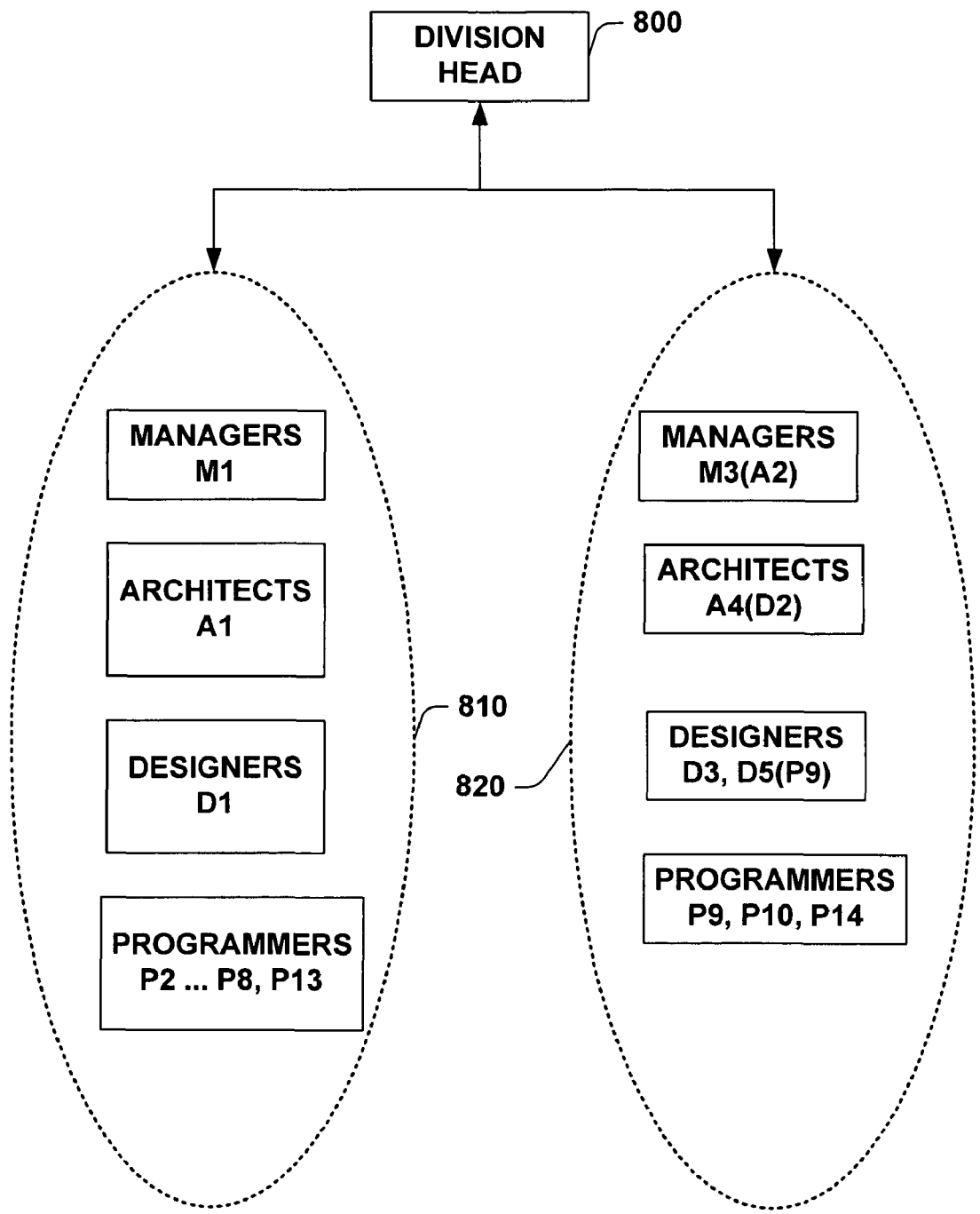
FIG. 9 further illustrates groups affected by group management, in accordance with an aspect of the present invention.

FIG. 9 illustrates a division head 800 and two groups 810 and 820 that are successors to groups 710 and 720 respectively, after reorganization. Thus, while group 810 retains manager M1, group 820 has had a change in the managerial group, namely manager M2 moved to a new company. A new manager M3 has been added to the group 820, and that new manager used to be architect A2 from group 710, thus illustrating the migration and addition functions of a group modifier. Group 810 retains one architect A1 in its architect group, illustrating deletion from a group, since group 710 had both architect A1 and architect A2. In group 820, the architect group includes a new architect A4, who used to be developer D2 from group 710, once again illustrating addition, deletion and migration functions of a group modifier. The designer group in group 810 includes only designer D1, since designer D2 moved to architect level in group 820 and designer D3 moved to group 820. Similarly, the programmers group in 810 has changed. Programmer P1 is no longer included in the programmer group, but, in this example, not because programmer P1 has left the company, but rather because a group modifier determined that the division head 800 rarely communicated with the programmer P1, and furthermore, communications with the programmer P1 took such different forms from all other communications that a separate group, not illustrated, was formed just for programmer P1. The designer group in group 820 includes designer D3, who migrated from the designer group in 710 and a new designer D5, who is the programmer P9 who migrated from the programmer group in 710 to both the designer group in 820 and the programmer group in 820, illustrating replication and migration features of a group modifier.

While FIG. 9 illustrates a number of additions, deletions, migrations, replications and promotions associated with the processing of a group modifier programmed in accordance with the present invention, it is to be appreciated that such additions, deletions, migrations, replications and promotions are intended to be illustrative and not limiting, and that a group modifier may perform a greater and/or lesser number of such modifications.

Figure 10:
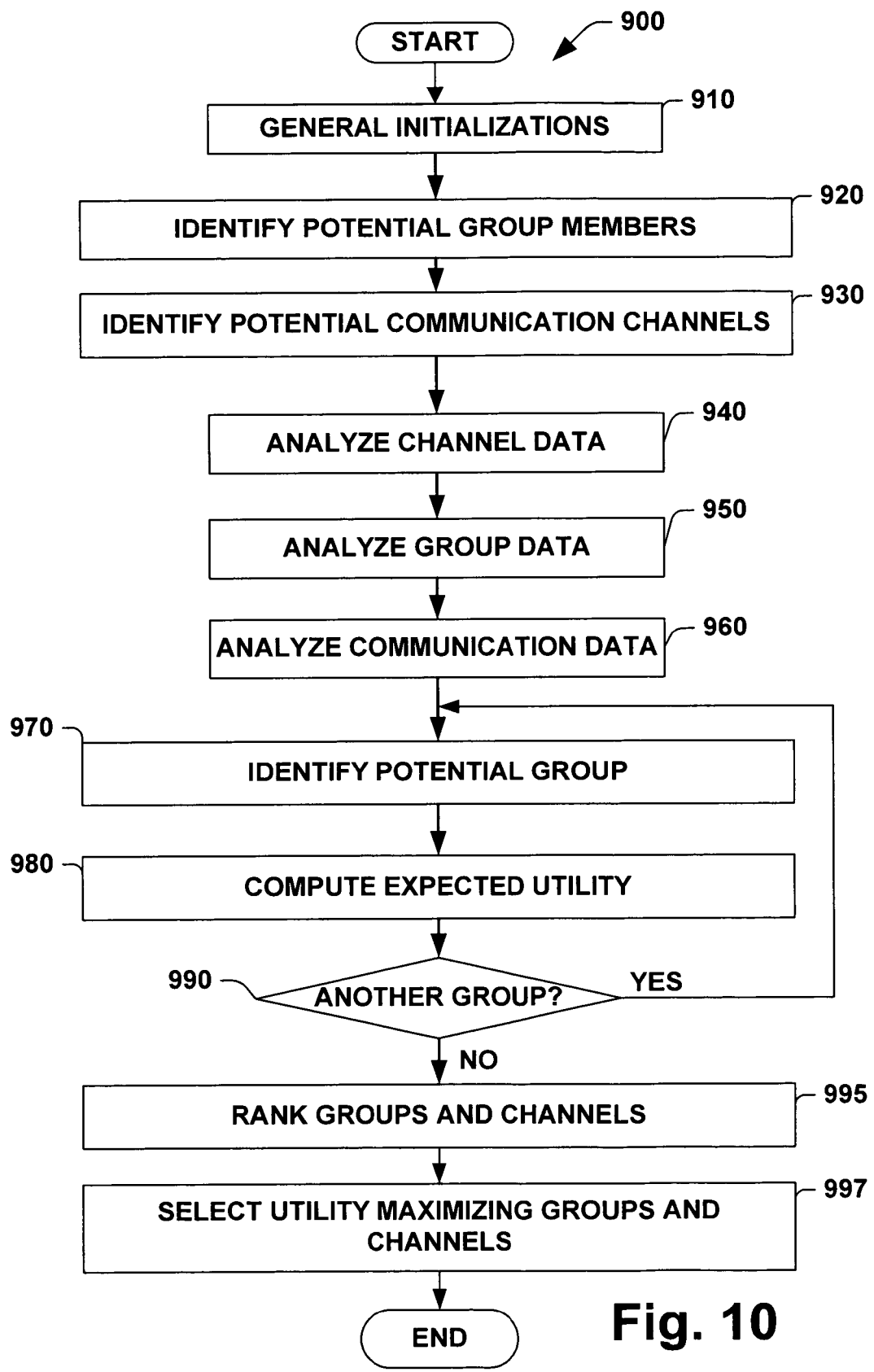
FIG. 10 is a flow chart illustrating a method that facilitates optimizing utility of a group communication, in accordance with an aspect of the present invention.
Figure 11:
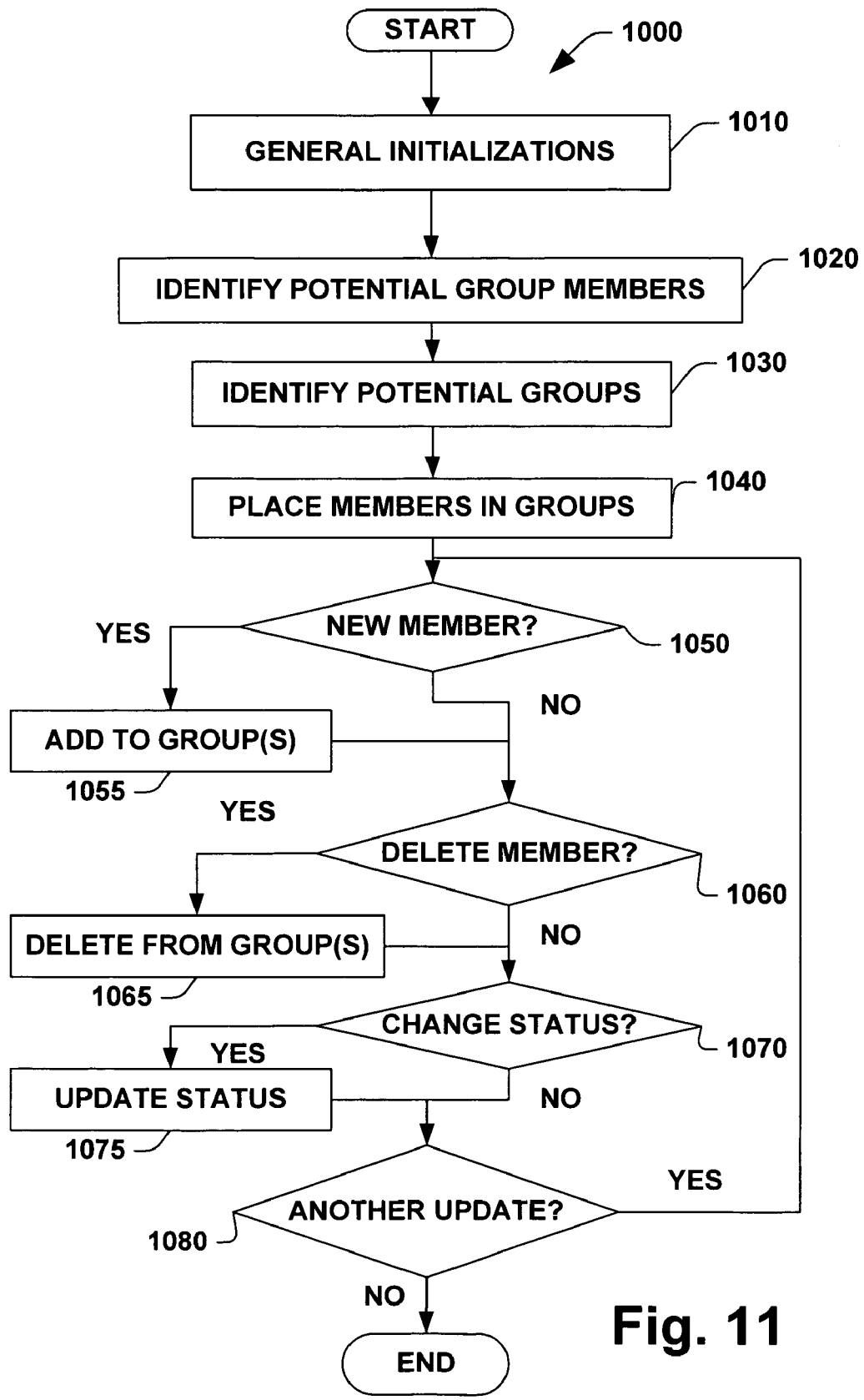
FIG. 11 is a flow chart illustrating a method for managing group membership, in accordance with an aspect of the present invention.
Figure 12:
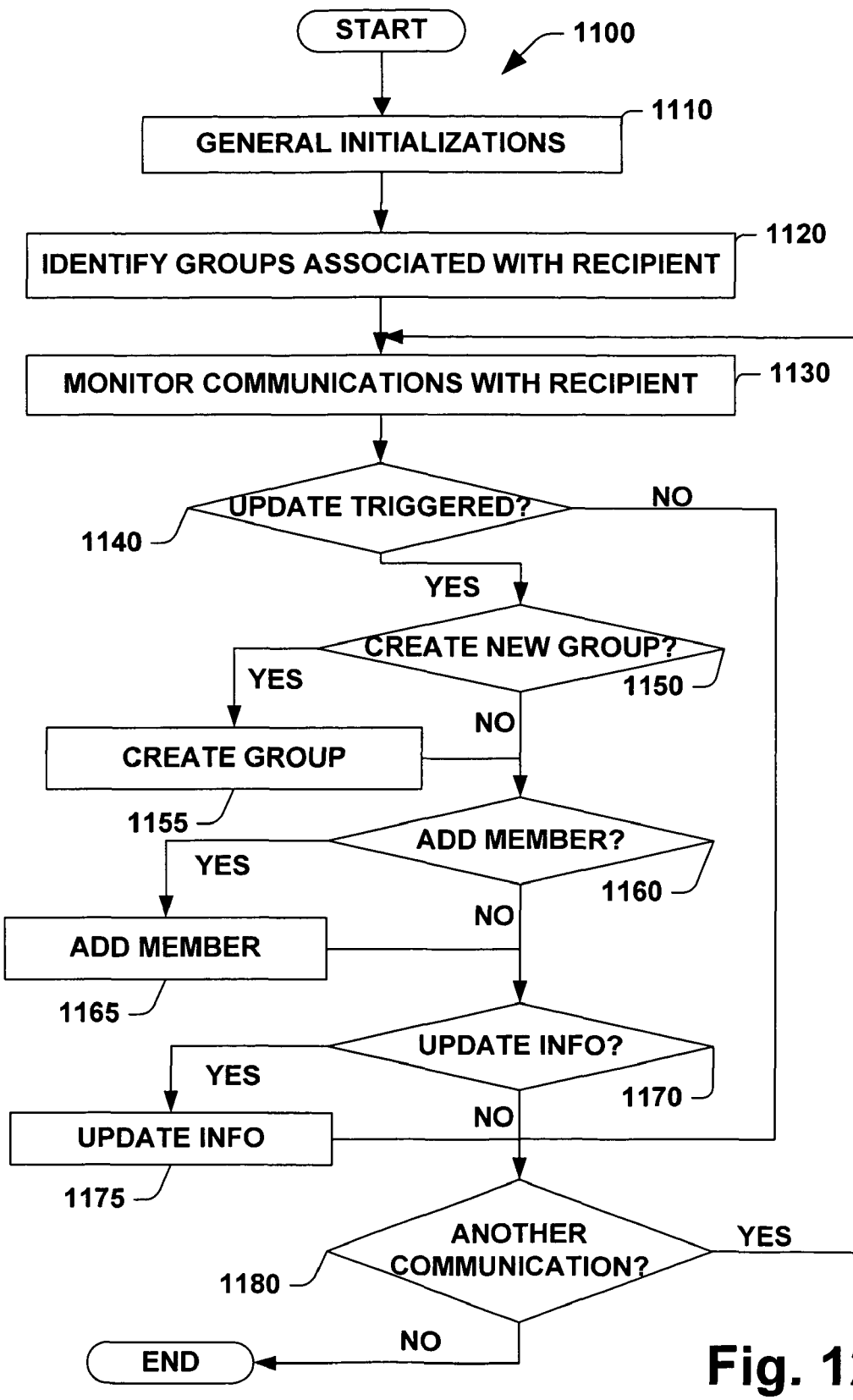
FIG. 12 is a flow chart illustrating a method associated with machine learning and management of groups, in accordance with an aspect of the present invention.

In view of the exemplary systems shown and described above, methodologies that are implemented in accordance with the present invention will be better appreciated with reference to the flow diagrams of FIGS. 10 through 12. While for purposes of simplicity of explanation, the illustrated methodologies are shown and described as a series of blocks, it is to be understood and appreciated that the present invention is not limited by the order of the blocks, as some blocks can, in accordance with the present invention, occur in different orders and/or concurrently with other blocks from that shown and described herein. Moreover, not all illustrated blocks may be required to implement a methodology in accordance with the present invention. Furthermore, additional and/or alternative methodologies can employ additional blocks, not illustrated herein. In one example of the present invention, such methodologies can be implemented as computer executable instructions and/or operations, which instructions and/or operations can be stored on computer readable media including, but not limited to an ASIC, a CD, a DVD, a RAM, a ROM, a PROM, an EEPROM, a disk, a carrier wave, and a memory stick.

FIG. 10 is a flow chart illustrating a method 900 for facilitating optimizing the utility of a group communication. The optimization involves establishing communication groups, identifying communication channels, predicting expected utilities for groups of communicating parties by analyzing deterministic and/or uncertain data concerning the communication groups, the communicating parties, and the communication channels and selecting a communication group and channel that maximizes the utility of the group communication.

At 910, general initializations occur. Such initializations can include, but are not limited to, allocating memory, establishing pointers, establishing data communications, acquiring resources, setting variables and displaying process activity. At 920, potential communication group members are identified. For example, humans, apparatus, computers and/or computer components that may be placed in communication groups can be identified. Identifying a communicating party that is eligible for membership in a communication group can include, but is not limited to, identifying the name of the communicating party, identifying a communication group member with which the communicating party desires to communicate, identifying a subject matter for the communication, identifying a communication group to which the communicating party belongs, identifying communication group members with which the communicating party has communicated and determining senders who have communicated with the communicating party.

At 930, potential communication channels that can be employed for communications between communication group members are identified. Such channels can include, but are not limited to, telephone channels, computer channels, personal channels and the like.

At 940, data associated with the potential channels is analyzed to facilitate predicting an expected utility associated with the channel. Such data can include, but is not limited to, status data and context data. Such status and/or context data may be deterministic and/or uncertain. Thus, the analysis performed at 940 may include reasoning under uncertainty that can be performed, in one example of the present invention, via decision theoretic formulae.

At 950, data associated with the potential groups is analyzed to facilitate predicting an expected utility for a group communication between and/or with the group. Such data can include, but is not limited to, group inclusion criteria and group preference data. Again, such data may be deterministic and/or uncertain and thus the processing performed in association with 950 may include reasoning under uncertainty. At 960, data associated with the potential group communication is analyzed to further facilitate predicting an expected utility for a group communication between and/or with the group. For example, data including, but not limited to, the communication subject matter, the communication length, the communication urgency and the communication initiator may be analyzed. Some such data may be known, and other such data may be unknown. For example, the subject matter of the communication may be known (e.g., fire alarm for burning house) but the communication length may not be known. However, given evidence E about the subject matter, the length may be inferred according to $l=p(length|E)$. Thus, an inference may be made, which facilitates completing data associated with the communication. Further inference processing and reasoning under uncertainty is described in association with FIG. 15.

At 970, a potential group of communicating parties, chosen from the potential group members identified at 920, can be formed. Since the group captures abstractions about the policies, preferences, context and so on of a communicating party, utility maximizing processing can be based on such abstractions, thus simplifying assessment of utilities of outcomes and the computation of utility maximizing actions (e.g., communication channel selection, possible communication channel listings, communication time scheduling). Given the group formed at 970, the expected utility of the communication between the potential group can be computed at 980. The utility computation can consider factors including, but not limited to, the preferences of the communicating parties, the context of the communicating parties, the status of communication channels, group membership, and the like. Since there may be more than one potential group that can be assembled for a meaningful group communication, at 990 a determination is made concerning whether there is another potential group to examine. If the determination at 990 is YES, processing returns to 970, otherwise processing progresses to 995. At 995, the utilities computed at 980 for the various groups identified at 970 are ranked. At 997, a channel and group that will maximize the utility of the communication is selected. In one example of the present invention, the group communication can then be scheduled, calendared and/or initiated by a groupwise communication scheduler, while in another example of the present invention, the groupwise communication scheduler can present options to communicating parties allowing them to select from the choices. Based on the choices and the communicating party responses, machine learning can be undertaken that will modify the way in which the potential groups are formed and/or the expected utilities are predicted.

FIG. 11 is a flow chart illustrating a method 1000 for managing group membership. The management includes creating and updating groups based on deterministic and/or uncertain data. At 1010, general initializations occur. The initializations can include, but are not limited to, allocating memory, establishing pointers, establishing data communications, acquiring resources, setting variables and displaying process activity.

At 1020, potential communication group members are identified. The potential members can include, but are not limited to humans, apparatus, computers, processes and computer components. For example, a programmer, the programmer's proxy (e.g., assistant, secretary), the programmer's email monitor and the programmer's universal messaging system can be identified as potential group members. By way of illustration, the programmer and/or the programmer's proxy can communicate with other entities. Similarly, the programmer's email can initiate communications with the programmer (e.g., page indicating that programmer has urgent email) and/or individuals that desire to communicate with the programmer (e.g., programmer sets up automatic email reply when on vacation). Thus, the communication group members can be human, machine and computer components.

At 1030, the method 1000 identifies potential groups that can be established. For example, potential groups including, but not limited to, organizational chart groups, most frequently communicated with groups, family groups, ad hoc groups, random groups, work flow groups, and special interest groups can be identified. Such groups can initially be statically defined (e.g., membership in an organizational chart). However, such groups can also be dynamically defined based on activities in which members are engaging. For example, a group of people with whom a user is going to meet on a certain day can be identified as potential group members where the membership is predicated solely on calendar data indicating that they have a meeting with the user. In one example of the present invention, the method 1000 can provide a potential group(s) and/or the user of the present invention can additionally and/or alternatively provide a potential group(s). At 1040, the potential group members identified at 1020 are initially placed in zero or more of the potential groups identified at 1030. By way of illustration, a first programmer may be placed in an organizational chart group, a most frequently communicated with group and a special interest group, while a second programmer may not be placed in any of the potential groups.

After the initial identification and placement performed from 1020 through 1040, modifications to the groups can be performed from 1050 through 1075. Thus, at 1050, a determination is made concerning whether a new member has been identified. For example, an organization may hire a new programmer and add the programmer to the organizational chart. Similarly, a member already in a group may acquire a computer program that is designed to remind the member of important events, and thus the computer program will be initiating communications and is therefore identified as a new member. Furthermore, a person may update their calendar with meeting information, which leads to that person being added to the group of people with whom the user will meet. If the determination at 1050 is YES, then at 1055, the newly identified member is added to one or more groups. By way of illustration, the recently hired programmer may be added to both an organizational chart group and a work flow group.

At 1060, a determination is made concerning whether a member should be deleted. For example, if an employee leaves the organization, then the employee may be identified as a group member that is to be deleted from the organizational chart group. Similarly, if communications with a group member with whom communications had occurred very frequently (e.g., ten times per day) for the past year drop off to the point where they are no longer considered a frequent communicator (e.g., at least once per day), then the group member can be identified as a group member that is to be deleted from the frequently communicated with group. Furthermore, if a person updates their calendar to indicate that they will not be attending a meeting with the user, then the person can be dynamically removed from the group of people with whom the user will meet. If the determination at 1060 is YES, then at 1065 the identified group member will be deleted from one or more groups.

At 1070, a determination is made concerning whether the status of a group member should be updated. For example, a member of the organizational chart group may be promoted, and thus the status of such a member should be updated. Such updates can include changing the preferences applied to such a group member (e.g., encrypted vs. unencrypted email). If the determination at 1070 is YES, then at 1075, the status of the group member can be updated. At 1080, a determination is made concerning whether there is another update. If the determination is YES, then processing returns to 1050, otherwise processing concludes.

FIG. 12 is a flow chart illustrating a method 1100 for recipient-oriented communication monitoring based group management. While method 1100 concerns recipient-oriented communication monitoring, it is to be appreciated that communication monitoring from other perspectives (e.g., sender oriented, organization oriented, group oriented) can be employed in accordance with the present invention. At 1110, general initializations occur. Such initializations can include, but are not limited to, allocating memory, establishing pointers, establishing data communications, acquiring resources, setting variables and displaying process activity.

At 1120, groups associated with the recipient are identified. For example, the recipient may have established one or more initial groups (e.g., close family, family, trusted friends, friends, acquaintances, others) to which the recipient assigned group preferences. Identifying a group associated with the recipient, where that group will then be managed by the method 1100, can include, but is not limited to, analyzing the number of members in a communication group (e.g., more than a pre-determined, configurable upper bound, less than a pre-determined configurable lower bound), analyzing the frequency of communications with group members, analyzing the length of a communication, analyzing the subject matter of a communication, analyzing the urgency of a communication, analyzing the similarity of communication types with group members (e.g., similar subject matter, length, urgency), analyzing an organizational chart and analyzing membership in a trusted set of communicators. By way of illustration, a communication group can include a group member who is considered a trusted communicator by one or more group members. However, other group members may have no information concerning the trust level to accord to the group member, and thus, other group members can analyze the trust level accorded to the group member by other group members.

Over time, monitoring communications occurring with members of such groups can reveal patterns, trends and/or information that can be employed to facilitate improving the performance of the communication system which in turn facilitates maximizing the utility of recipient communications with the group members. Thus, at 1130, communications with the recipient are monitored. Such monitoring can include, but is not limited to, identifying an initiator of a communication, identifying a recipient of the communication, tracking the length of a communication, identifying a subject matter of the communication, identifying a communication channel along which the communication will travel, identifying a related communication and identifying an urgency of the communication. Monitor data associated with such monitoring can be stored, for example, in a monitor data store. Furthermore, category data associated with one or more communicating party categories can be updated, based on the monitor data.

Monitoring the recipient communication can lead to a decision concerning whether a group should be managed, where such managing includes, but is not limited to, creating a group, deleting a group, merging groups together, partitioning a group, adding a group member, removing a group member, migrating a group member between groups, updating the status of a group member and replicating a group member between groups. Such monitoring can be activity-based, therefore, the activities in which a person is engaged, as revealed by their communications, can be employed to dynamically assign a person to a communication group.

Thus, at 1140, a determination is made concerning whether an update has been triggered. The determination can be based on the category and/or monitor data, for example. By way of illustration, if the number, type and/or quality of communications with the recipient indicate that a new group should be formed (e.g., dissimilarly quotient exceeds pre-determined, configurable threshold), an update can be triggered. By way of further illustration, if the presence of a number of communications from an entity that is not a group member exceeds a pre-determined, configurable threshold (e.g., one percent of all communications), then an update to add the member to a group can be triggered. By way of further illustration, a paucity of communications (e.g., less than one communication per month) from an entity that is a group member can trigger an update to delete the group member. If the determination at 1140 is NO, then processing proceeds to 1180.

But if the determination at 1140 is YES, then a determination is made at 1150 concerning whether a group should be created. If the determination at 1150 is YES, then at 1155 a new group is created. Similarly, at 1160, a determination is made concerning whether a member should be added to a group. If the determination at 1160 is YES, then at 1165, the group member is added. By way of illustration of an interaction between 1155 and 1165, at 1150 a determination is made to create a new group (e.g., people who have called on a new satellite telephone), at 1155 such a group is created and at 1160 a determination is made that the monitored communication involved a satellite call, and thus at 1165 the communicating party is added to the new satellite communication group.

At 1170, a determination is made concerning whether group information and/or group member information should be updated. If the determination at 1170 is YES, then at 1175 the update occurs. While FIG. 12 illustrates three management decisions (e.g., create new group, add member to group, update information), it is to be appreciated that the present invention can perform a greater and/or lesser number of group management functions that include, but are not limited to, creating a group, deleting a group, merging groups, partitioning groups, replicating groups, adding a member, removing a member, updating a member, migrating a member and replicating a member and that such management functions can be based on activities in which people are engaged.

At 1180, a determination is made concerning whether there is another communication to monitor. If the determination at 1180 is YES, then processing returns to 1130, otherwise processing concludes.

Figure 13:
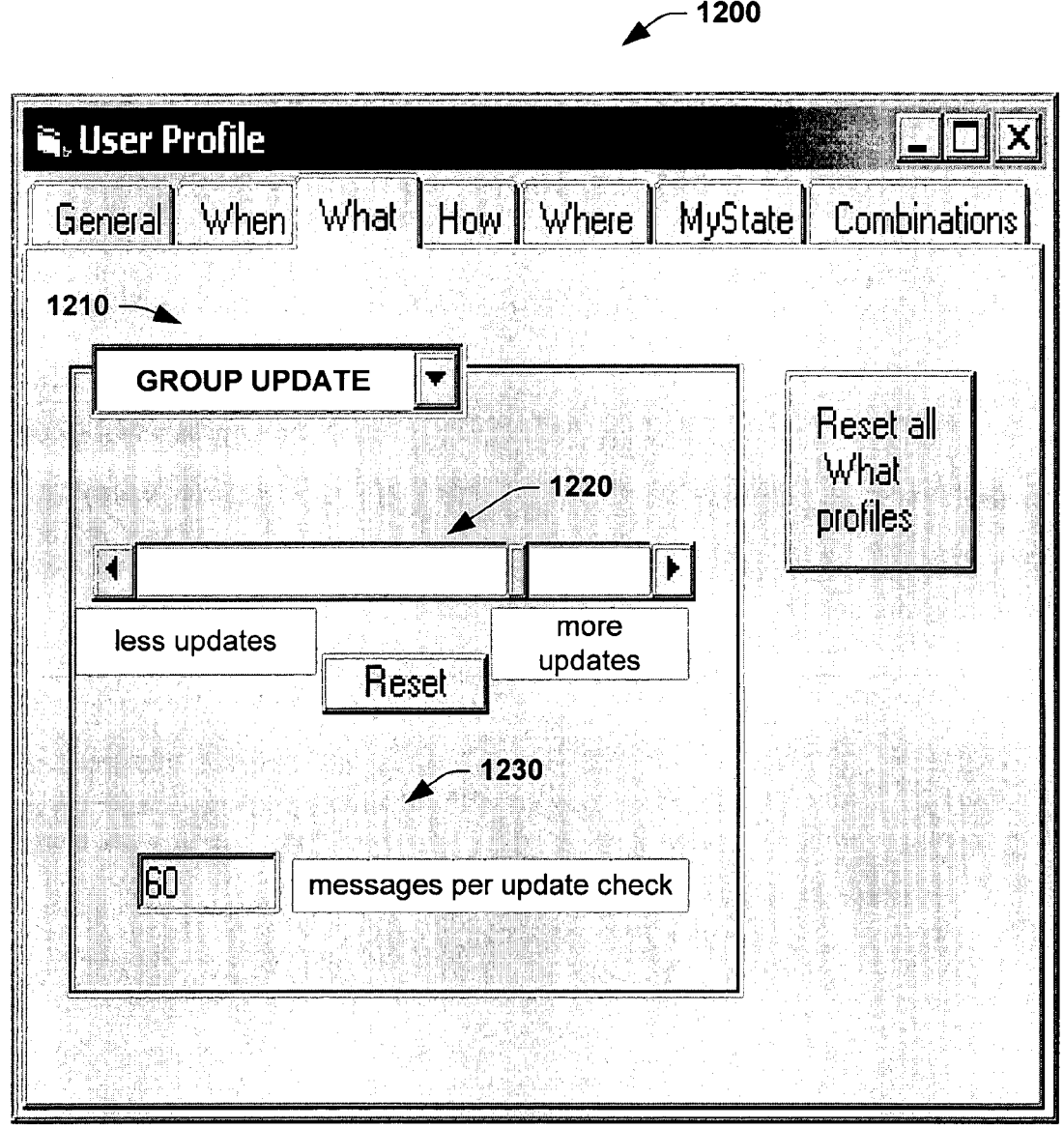
FIG. 13 is a simulated screen shot of a user interface employed in configuring an aspect of the present invention.

FIG. 13 is a simulated screen shot of a user interface 1200 employed in configuring a threshold associated with the frequency of updates made during group management. While FIG. 13 illustrates one configurable option, it is to be appreciated that configurable options including, but not limited to, frequency of group creation/deletion/merging/partitioning/updating, upper bounds for member addition/deletion/replication/migration, lower bounds for member addition/deletion/replication/migration and similarity quotients for message analysis can be configured in the present invention. On the user interface 1200, a drop down box 1210 identifies the configurable option, which in this case is group updates. While a drop down box 1210 is illustrated, it is to be appreciated that other user interface elements including, but not limited to, text boxes, buttons, selection boxes, lists, scrollable lists, sliders, and the like can be employed by the user interface 1200 and other user interfaces associated with the present invention. On the user interface 1200, a slider 1220 can be positioned by a user of the user interface 1200 to configure whether relatively more or relatively fewer group updates should occur. Also, a text display area 1230 displays a number of messages that will be analyzed before a group update will be considered. Thus, as the slider 1220 is moved to the right to indicate that the user of the interface 1200 desires relatively more group updates, the number in the text display area 1230 may decrease indicating that fewer messages will be required before an update consideration will occur.

In one example of the present invention, a graphical user interface (GUI) is employed to select the group that will participate in the group communication with the greatest expected utility. Thus, the example includes a computer system having a GUI that comprises a display and a selection device. The GUI is employed in a method of providing and selecting from a menu on the display, where the method includes retrieving a set of menu entries for the menu where each of the menu entries represents a group selected for a group communication and where the group communication has a calculated expected utility. The method also includes displaying the set of menu entries on the display, receiving a menu entry selection signal indicating which menu entry was selected from the set of menu entries and initiating a communication represented by the menu entry.

Figure 14:
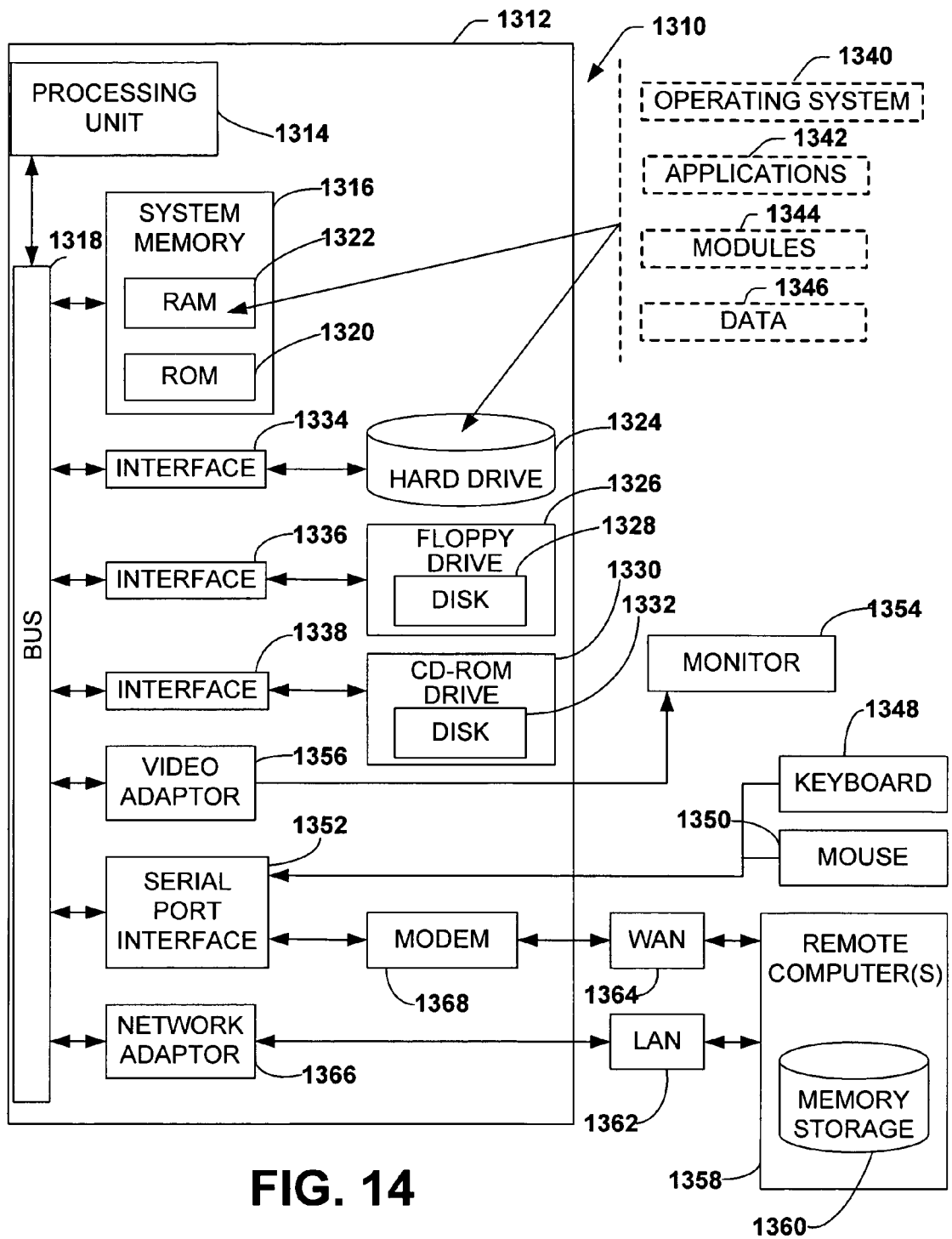
FIG. 14 is a schematic block diagram of an example computing environment in which the present invention may operate, in accordance with an aspect of the present invention.

In order to provide additional context for various aspects of the present invention, FIG. 14 and the following discussion are intended to provide a brief, general description of a suitable computing environment 1310 in which the various aspects of the present invention may be implemented. While the invention has been described above in the general context of computer-executable components, instructions and/or operations that may run on one or more computers, those skilled in the art will recognize that the invention also may be implemented in combination with other program modules and/or as a combination of hardware and software. Generally, program modules include routines, programs, components, data structures, etc. that perform particular tasks or implement particular abstract data types. Moreover, those skilled in the art will appreciate that the inventive methods may be practiced with computer system configurations, including single-processor or multiprocessor computer systems, minicomputers, mainframe computers, personal computers, handheld computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

With reference to FIG. 14, an exemplary environment 1310 for implementing various aspects of the invention includes a computer 1312, the computer 1312 including a processing unit 1314, a system memory 1316 and a system bus 1318. The system bus 1318 couples system components including, but not limited to the system memory 1316 to the processing unit 1314. The processing unit 1314 may be any of various processors. Dual microprocessors and other multi-processor architectures also can be employed as the processing unit 1314.

The system bus 1318 can be any of several types of bus structure including a memory bus or memory controller, a peripheral bus and a local bus using any of a variety of bus architectures. The system memory 1322 includes read only memory (ROM) 1320 and random access memory (RAM) 1322. A basic input/output system (BIOS), containing the basic routines that help to transfer information between elements within the computer 1312, such as during start-up, is stored in ROM 1320.

The computer 1312 further includes a hard disk drive 1324, a magnetic disk drive 1326, (e.g., to read from or write to a removable disk 1328) and an optical disk drive 1330, (e.g., for reading a CD-ROM disk 1332 or to read from or write to other optical media). The hard disk drive 1324, magnetic disk drive 1326 and optical disk drive 1330 can be connected to the system bus 1318 by a hard disk drive interface 1334, a magnetic disk drive interface 1336 and an optical drive interface 1338, respectively. The drives and their associated computer-readable media provide nonvolatile storage of data, data structures, computer components, computer-executable instructions, etc. for the computer 1312. Although the description of computer-readable media above refers to a hard disk, a removable magnetic disk and a CD, it should be appreciated that other types of media that are readable by a computer, such as zip drives, magnetic cassettes, flash memory cards, digital video disks, cartridges, ASICs, and the like, may also be used in the exemplary operating environment, and further that any such media may contain computer-executable instructions for performing the methods of the present invention.

A number of program modules can be stored in the drives and RAM 1322, including an operating system 1340, one or more application programs 1342, other program modules 1344 and program data 1346. It is to be appreciated that the present invention can be implemented with various operating systems or combinations of operating systems.

A user can enter commands and information into the computer 1312 through a keyboard 1348 and a pointing device, such as a mouse 1350. Other input devices (not shown) may include a microphone, an IR remote control, a joystick, a game pad, a satellite dish, a scanner, or the like. These and other input devices are often connected to the processing unit 1314 through a serial port interface 1352 that is coupled to the system bus 1318, but may be connected by other interfaces, such as a parallel port, a game port, a universal serial bus ("USB"), an IR (infrared) interface, etc. A monitor 1354 or other type of display device is also connected to the system bus 1318 via an interface, such as a video adapter 1356. In addition to the monitor, a computer typically includes other peripheral output devices (not shown), such as speakers, printers etc.

The computer 1312 may operate in a networked environment using logical connections to one or more remote computers, such as a remote computer(s) 1358. The remote computer(s) 1358 may be a workstation, a server computer, a router, a personal computer, microprocessor based entertainment appliance, a peer device or other common network node, and typically includes many or all of the elements described relative to the computer 1312, although, for purposes of brevity, only a memory storage device 1360 is illustrated. The logical connections depicted include a local area network (LAN) 1362 and a wide area network (WAN) 1364. Such networking environments are commonplace in offices, enterprise-wide computer networks, intranets and the Internet.

When used in a LAN environment, the computer 1312 is connected to the local network 1362 through a network interface or adapter 1366. When used in a WAN environment, the computer 1312 typically includes a modem 1368, or is connected to a communications server on the LAN, or has other means for establishing communications over the WAN 1364, such as the Internet. The modem 1368, which may be internal or external, is connected to the system bus 1318 via the serial port interface 1352. In a networked environment, program modules depicted relative to the computer 1312, or portions thereof, may be stored in the remote memory storage device 1360. It will be appreciated that the network connections shown are exemplary and other means of establishing a communications link between the computers may be used.

Figure 15:
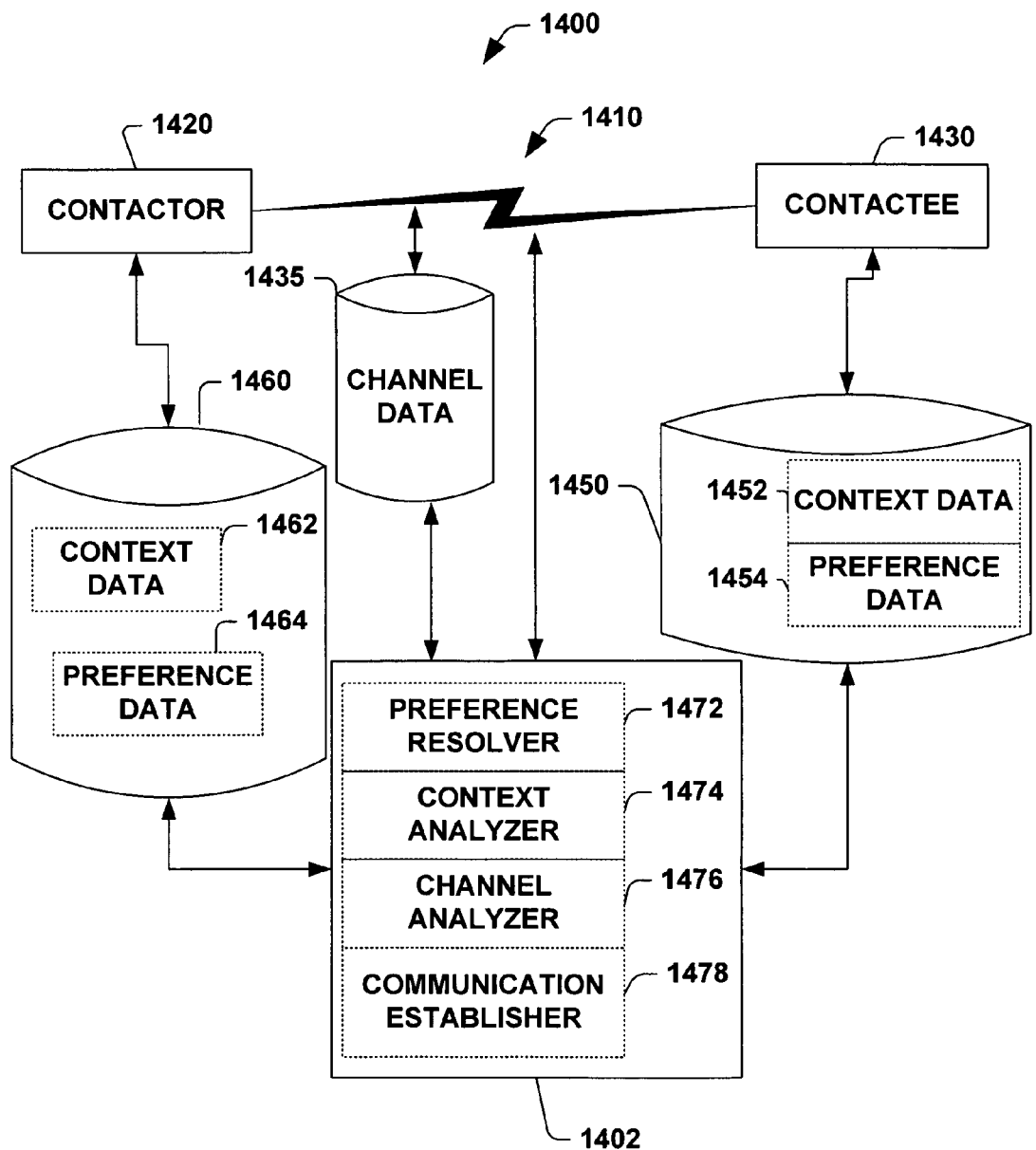
FIG. 15 is a schematic block diagram of a channel manager, in accordance with an aspect of the present invention.

Referring now to FIG. 15, a system 1400 that includes a channel manager 1402 is illustrated. The channel manager 1402 identifies communication channels that facilitate optimizing the utility of a communication 1410 between a contactor 1420 and a contactee 1430. While one contactor 1420 and one contactee 1430 are illustrated, it is to be appreciated that the system 1400 facilitates identifying optimal communication channels between two or more communicating parties (e.g., communication groups). It is to be further appreciated that the parties to the communication 1410 may include human parties, apparatus and/or electronic processes. Thus, as employed herein, the terms contactee and contactor include groups of contactors and groups of contactees.

The communication 1410 may be carried over a variety of channels including, but not limited to, telephone channels, computer channels, fax channels, paging channels and personal channels. The telephone channels include, but are not limited to POTS telephony, cellular telephony, satellite telephony and Internet telephony. The computer channels can include, but are not limited to email, collaborative editing, instant messaging, network meetings, calendaring and devices employed in home processing and/or networking. The personal channels include, but are not limited to videoconferencing, messengering and face-to-face meeting. Data concerning a current channel (e.g., a phone that is busy) can be analyzed, as can data concerning the likelihood that the channel may become available (e.g., phone will no longer be busy).

Identifying the optimal communication channel can include considering the benefits of establishing the communication 1410 at a first point in time, with the communication channels available at that point in time, and considering the costs of delaying establishing the communication 1410 to a second point in time when other communication channels may be available.

The channel manager 1402 has access to a channel data store 1435, a contactor data store 1460 and a contactee data store 1450. The contactor data store 1460, the channel data store 1435 and the contactee data store 1450 can store data in data structures including, but not limited to one or more lists, arrays, tables, databases, stacks, heaps, linked lists and data cubes and can reside on one physical device and/or can be distributed between two or more physical devices (e.g., disk drives, tape drives, memory units). Furthermore, the contactor data store 1460, the channel data store 1435 and the contactee data store 1450 can reside in one logical device and/or data structure.

The channel manager 1402 can be a computer component, as that term is defined herein, and thus the channel manager 1402 can be distributed between two or more cooperating processes and/or reside in one physical or logical device (e.g., computer, process).

In a general formulation of the problem addressed by the channel manager 1402, the present invention considers a "communications value function", f, that returns a value for each communication channel or subset of channels under consideration or an ordering over communication channels in terms of acceptability of the channel or subset of channels.

$$\text{Value(Channel)}=f(\text{preferences(contactee,contactor, organization),context(contactee,contactor)})$$

where the context of contactee and contactor include group membership, group context, the devices that are available, the time of day, tasks and situation at hand for the contactor and contactee, and the like. It is to be appreciated that the context of the contactee and contactor may be stored in one or more formats, including, but not limited to, an XML schema. In one example of the present invention, the channel manager 1402 initially orders the channels by assigned value and attempts to create a connection or to advise the contactor 1420 and/or contactee 1430 concerning the best possible connection.

In general, there may be uncertainty concerning preferences and one or more parameters employed to model a context. In this situation, a probability distribution over the different states of variables can be inferred and expected values for channels can be computed. For example, if there is uncertainty concerning aspects of the context of the contactee, the probability distribution (here represented abstractly), given evidence E observed about the context, and sum over the uncertainties can be represented:

$$\text{Expected value(Channel)}=\Sigma_i f(\text{preferences(contactee, contactor,organization)}, p(\text{context } i \text{ of contactee}|E), \text{context of contactor})$$

While this expected value can be employed to initially identify the channel that is predicted to maximize the utility of the communication 1410, in one example of the present invention the contactee 1430 will be presented with options concerning the communication. The contactee 1430 reaction to the options will then determine the channel that is selected for the communication 1410. The reactions to the options can be employed in machine learning that facilitates adapting the channel manager 1402.

Considering now more specific examples of the use of expected utility, a particular basic formulation of decision-making under uncertainty in the context of the preferences of the contactee 1430 is captured by Equation 1.

$$A^* = \underset{j}{\operatorname{argmax}} \sum_i p(context^R i | E) \times u(A_j, A_k^C, C, context^R i, context^C) \quad \text{(Equation 1)}$$

where A* is the ideal communication actions, which include the channels employed by the contactor ($A^{C*}$) and contactee (Recipient) ($A^{R*}$) computed by optimizing Equation 1.

In equation 1, $A_j$ is the communication channel being considered, $A^C_k$ is the communication channel employed by the contactor, $context^R_i$ is the context of the contactee (Recipient) of the intended communication, context is the context of the contactor, and C is the identity of the contactor, typically linked to a class of person (e.g., critical associate, previously replied to, family, unknown).

Thus, in an example aspect of the present invention, the conditional probability $p(context^R_i|E)$ that the contactee 1430 has a certain context given the evidence E is employed in conjunction with the utility function u to determine the ideal communication actions that can be taken to maximize the utility of the communication 1410 between the contactor 1420 and the contactee 1430.

The basic formulation for identifying optimal communication channels can be extended by introducing uncertainty about the context of the contactor 1420, which adds the summing noted in equation 2 to the uncertainty calculations of equation 1. The particular communication action and/or channel selected for the initial contact by the contactor 1420 is represented as $A^C_{init}$.

$$A^* = \underset{j}{\operatorname{argmax}} \sum_i \sum_k p(context^R i|E) p(context^C k|E) \times u(A_j, A^C_{init}, C, context^R i, context^C k) \quad \text{(Equation 2)}$$

The contactor 1420 and contactee 1430 contexts represent rich sets of deterministic or uncertain variables. Data associated with automated assessments and/or directly marked indications of urgency or importance in the communications can also be evaluated in identifying optimal communication channels. The contextual variables can be treated as explicit deterministic or probabilistic factors in the optimization. For example, $m^c_k$ can represent the channels available to the contactor 1420 and thus equation 3 considers combinations of channels available to the contactor 1420.

$$A^* = \underset{l,n}{\operatorname{argmax}} \sum_i \sum_k p(context^R i \mid E) p(context^C k \mid E) \times \\ u(A(m_l^R, m_n^C), A_{init}^C, C, context^R i, context^C k) \quad \text{(Equation 3)}$$

The present invention can also compare the best communication option available now with the best communication option that will be available later, and update the value of the communication for the losses based in delays in communication, and potential gains or losses based on changes in disruptiveness if the communication should come at the later time t when the contactee is in a different state (e.g., more available or less available). Such comparison can be captured by equation four:

$$Value\ A^{*'}(t_+) - Value A^*(t_0) = \qquad (4)\\
\underset{l,n}{\max} \sum_i \sum_k p(context^R i \mid E, t_+) p(context^C k \mid E, t_+) \times \\
u(A(m_l^R(t_+), m_n^C(t_+)), A_{init}^C, C, context^R i(t_+), context^C k(t_+)) \\
\max_{l,n} \sum_i \sum_k p(context^R i \mid E, t_0) p(context^C k \mid E, t_0) \times \\
u(A(m_l^R(t_0), m_n^C(t_0)), A_{init}^C, C, context^R i(t_0), context^C k(t_0))$$

Thus, decision-theoretic formulae like those described in equations 1 through 4 are employed to produce one or more expected utilities for one or more sets of contactors and/or contactees that are established into one or more groups that are subsequently managed. In one example aspect of the present invention, a communication is automatically initiated, scheduled and/or calendared based on such information. But in another aspect of the present invention, information concerning those expected utilities is presented to one or more parties. By way of illustration, a contactor 1420 is presented with a list of communications with high utilities determined in accordance with the preferences of the contactee. The contactor 1420 then selects from the list.

While one communication 1410 between one contactor 1420 and one contactee 1430 is illustrated, it is to be appreciated that a greater number of communications between a similar or greater number of contactors 1410 and/or contactees 1420 can be identified by the present invention. By way of illustration, communications 1410 to facilitate group meetings can be identified by the system 1400, as can multiple communications 1410 between two communicating parties (e.g., duplicate messages sent simultaneously by email and pager).

The communication 1410 that is identified by the channel manager 1402 may depend, at least in part, on one or more sets of data concerning communication channels, contactors and/or contactees, for example. One possible data set, the communication channel data set 1435 concerns the available communication channels. The available communication channels can include, but are not limited to email (of various priorities), telephone (POTS, cellular, satellite, Internet), paging, runners/couriers, video conferencing, face-to-face meeting, instantaneous collaborative editing, delayed posting collaborative editing, picture in picture television, home device activation (e.g., turning on lights in the study, ringing the telephone with a distinctive pattern) and so on. A communication channel may not be a static entity, and thus information concerning the state, capacity, availability, cost etc., of the communication channels can change. Thus, the communication channel data set 1435 can contain current state information and/or data to facilitate making predictions concerning future state, capacity, availability, cost etc. associated with one or more communication channels.

The channel manager 1402 can also have available the contactee data 1450 that includes information related to hardware, software, contactee task being performed, contactee attention status, contactee context data 1452 and contactee preference data 1454, for example. By way of illustration, the hardware data can include information related to what hardware is available to the contactee, what hardware is being employed by the contactee (e.g., desktop, laptop, PDA), the capabilities of that hardware (e.g., enough memory and communication bandwidth for videoconferencing), the cost of employing that hardware and the state(s) in which that hardware is currently functioning (e.g., online, offline). The hardware data can also include information concerning usage patterns that facilitate determining the likelihood that an unavailable piece of hardware will become available. The software data can include information related to what software is available to the contactee, what software is currently being employed by the contactee (e.g., word processor in use), the capabilities of that software (e.g., allows collaborative editing) and the state(s) in which that software is currently functioning (e.g., running and active, running but inactive). The software data can also include information concerning usage patterns that facilitate determining the likelihood that an unavailable piece of software will become available.

The contactee data 1450 can also contain preference data 1454 concerning the preferences of the contactee 1430. The preference data 1454 can include data concerning how the contactee 1450 prefers to be contacted, with those preferences varying over time with respect to, for example, various contactors 1420, various times, various channels and various topics of communication. The contactee preference data 1454 can include data concerning, but not limited to, preferences concerning the time of day for communicating (e.g., early morning, business hours, evening, late night, sleeping hours), the time of the week for communicating (e.g., Monday through Friday, Weekend, Holiday, Vacation), identity of contactors (e.g., employer, employees, critical colleague, colleague, peers, nuclear family, extended family, close friends, friends, acquaintances, others), hardware currently available or available within a time horizon of a communication attempt (e.g., desktop, laptop, home computer), preferred software (e.g., email, word processing, calendaring) and preferred interruptability (e.g., do not interrupt while focused on work, only interrupt while not focused), for example. While six preferences are identified in the preceding sentence, it is to be appreciated that a greater or lesser number of preferences can be employed in accordance with the present invention.

The contactee data 1450 can also include a context data 1452. The context data 1452 is generally related to observations about the contactee 1430. For example, observations concerning the type of activity in which the contactee 1430 is involved (e.g., on task, not on task), location of the contactee 1430 (e.g., office, home, car, shower), calendar (e.g., appointment status, appointment availability), history of communications with other party (e.g., have replied to email in the past, have spoken to on the telephone recently, the utility of the interaction, the duration of the interaction), background ambient noise at current location, number of hours at work that day and attentional status (e.g., high focus, focus, light focus, conversation with another person, light activity) can be stored in the context data 1452.

On some occasions the context data 1452 may be incomplete (e.g., video analysis data unavailable because video camera broken). Thus, the channel manager 1402 reasons concerning the optimal communication while relying on such incomplete data. Thus, the contactee data 1450 can also include information to facilitate producing one or more probabilities associated with a missing data element. By way of illustration, the contactee data 1450 can contain information operable to predict the likelihood that the contactee 1430 is in a high attentional state even though gaze tracking information is unavailable.

The contactee data 1450 can further include information concerning the long-term and/or acute, dynamically changing communication needs of the contactee 1450. By way of illustration, the contactee 1450 may need to have no interruptions for the next hour (e.g., "hold everything unless high critical on this task or an hour from now"). By way of further illustration, to prevent a contactor 1420 from "ducking" the contactee 1430 by leaving an email or a voice mail when the contactee 1430 desires to speak with the contactor 1420, the contactee 1430 can require that contacts from the contactor 1420 be made in a certain way within X units of time of notification that the contactor 1420 desires communication.

Thus, returning to equation 1, $$A^* = \underset{j}{\operatorname{argmax}} \sum_i p(context^R i | E) \times u(A_j, A_k^C, C, context^R i, context^C)$$ (Equation 1)

the contactee data 1450 is seen to contribute to the utility function u through the $context^R_i$ component, which can include the contactee context data 1452 discussed above.

In addition to the contactee data 1450 employed in determining the optimal communication, data concerning the contactor 1420 may also be employed. The contactor data 1460 can include hardware, software, context, preference and communication needs data substantially similar to that available for the contactee 1430, but different in that it is prepared from the point of view of the contactor 1420.

Thus, returning again to equation 1, $$A^* = \underset{j}{\operatorname{argmax}} \sum_i p(context^R i | E) \times u(A_j, A_k^C, C, context^R i, context^C)$$ (Equation 1)

the contactor data 1460 is seen to contribute to the utility function u through the $context^C$ component.

The present invention is not limited to communications between two parties or to a single communication channel between two parties. It is to be appreciated that multiple channels and/or multiple communicating parties can be treated as increased sets of alternatives that complicate utility maximizing computations without changing the fundamental process of identifying and establishing one or more communication channels based on the preferences, contexts and capabilities of the communicating parties.

The channel manager 1402 can include several computer components responsible for implementing portions of the functionality of the channel manager 1402. For example, the channel manager 1402 can include a preference resolver 1472. The preference resolver 1472 examines the contactee preference data 1454 and the contactor preference data 1464 to find correlations between the two sets of data. In one example of the present invention, information concerning the correlations is stored in a resolved preference data. For group communications, the preference resolver 1472 examines multiple sets of preference data to find correlations between the preferences. By way of illustration, for a communication between two parties, the preference resolver 1472 can determine that both parties would prefer to communicate by high priority email for communications associated with a first task. Similarly, the preference resolver 1472 can determine that the contactee 1430 would prefer to communicate by collaborative editing and phone for communications concerning a particular document, while the contactor 1420 would prefer to communicate only by telephone. Thus, the preference resolver 1472 produces data (e.g., resolved preference data) or initiates processing that assigns values to the correlations between the contactee 1430 preferences and the contactor preferences 1420. In one example aspect of the present invention, the preferences of the contactee 1430 are given more weight, and thus, if the contactor 1420 attempted a phone conversation concerning the document for which the contactee 1430 preferred both phone and collaborative editing, then the preference resolver 1472 produces data or initiates processing that makes it more likely that the contactor 1420 communicates by both phone and collaborative editing. In another example aspect of the present invention, the preferences of the contactor 1420 are given priority over the preferences of the contactee. By way of illustration, when a human contactor 1420 is attempting to communicate with an electronic contactee 1430, the preferences of the contactor 1420 are considered more important, and thus the preference resolver 1472 produces values or initiates processing that makes it more likely that the preferences of the contactor 1420 are observed. In another example aspect of the present invention, the preference resolver 1472 produces a list of potential communication channels ranked on their responsiveness to the preferences.

The channel manager 1402 can also include a context analyzer 1474. The context analyzer 1474 examines the contactee context data 1452 and the contactor context data 1462 to find correlations between the two sets of data. In one example of the present invention, information concerning the correlations is stored in an analyzed context data. For group communications, the context analyzer 1474 may examine multiple sets of context data to extract information concerning the contexts. By way of illustration, for a communication between two parties, the context analyzer 1474 may determine that the contactee context is such that real-time communications are not immediately available but there is an $X_1$% likelihood that such communications will be available at a point of time $T_1$ in the future, and an $X_2$% likelihood that such communications will be available at a point of time $T_2$ in the future. Further, the context analyzer 1474 may determine that although the contactor 1420 has requested real-time telephony that the context of the contactor 1420 is such that email communication may optimize utility. For example, the context of the contactor 1420 may include information concerning the ambient noise at the location of the contactor 1420.

The context analyzer 1474 may determine that the noise level is not conducive to optimizing utility by real-time telephony and thus may produce values and/or initiate processing that will make it more likely that the contactor 1420 will communicate with the contactee 1430 via email. Similar to processing performed by the preference resolver 1472, the context analyzer 1474 may, in different examples of the system 1400, weight the context of the contactee 1430 more than the context of the contactor 1420 or vice versa.

Returning again to equation 1, $$A^* = \operatorname*{argmax}_j \sum_i p(context^R i | E) \times \qquad \text{(Equation 1)}$$

$$u(A_j, A_k^C, C, context^R i, context^C)$$

the context analyzer 1474 performs processing associated with the utility function u and its analysis of the $context^R_i$ and the $context^C$.

The channel manager 1402 can also include a channel analyzer 1476. The channel analyzer 1476 analyzes the communication channel data set 1435. The channel analyzer 1476 produces data concerning the current availability of a communication channel and/or the likelihood of the channel becoming available. In one example of the present invention, such data is stored in a communication channel data. The channel analyzer 1476 also examines one or more channels that the contactor 1420 specified for the communication, and/or one or more channels that the contactee 1430 listed as preferences in the contactee preference data 1454, for example. The channel analyzer 1476 also examines currently available channels as determined by location information associated with the contactee 1430 and channels that may become available based on the activity of the contactee 1430. For example, if the contactee 1430 is currently driving home (as determined by GPS and schedule, for example), then the channel analyzer 1476 examines current cellular channels and additionally examines the channels available at the home of the contactee 1430. Thus, the channel analyzer 1476 facilitates producing data and/or initiating processing that makes it more likely that a desired channel is employed when determining the optimal communication channel(s) for the communication 1410 between the contactor 1420 and the contactee 1430. Thus, examining equation 1, $$A^* = \operatorname*{argmax}_j \sum_i p(context^R i | E) \times \qquad \text{(Equation 1)}$$

$$u(A_j, A_k^C, C, context^R i, context^C)$$

the channel analyzer 1476 performs processing associated with the utility function u and its analysis of the contactor channels $A_j$ and the contactee channels $A^C_k$.

The channel manager 1402 can also include a communication establisher 1478. Once the ideal communication actions A* have been identified, the communication establisher 1478 undertakes processing to connect the contactor 1420 and the contactee 1430 through the identified optimal communication channel. Such connection can be based, at least in part, on the resolved preference data, the analyzed context data and the communication channel data. For example, if the optimal communication 1410 is identified as being email, then the communication establisher can initiate an email composing process for the contactor 1420 (e.g., email screen on computer, voice to email converter on cell phone, email composer on two-way digital pager), and forward the composed email to the most appropriate email application for the contactee 1430 based on the identified optimal communication 1410. For example, the communication establisher 1478 can forward the email to the pager of the contactee 1430 based on GPS data associated with the location of the contactee 1430. In an alternative example of the present invention, the system 1400 does not include a communication establisher 1478, relying instead on contactor 1420 and/or contactee 1430 actions, for example, to establish the communication.

It is to be appreciated that the preference resolver 1472, the context analyzer 1474, the channel analyzer 1476 and the communication establisher 1478 are computer components as that term is defined herein.

Figure 16:
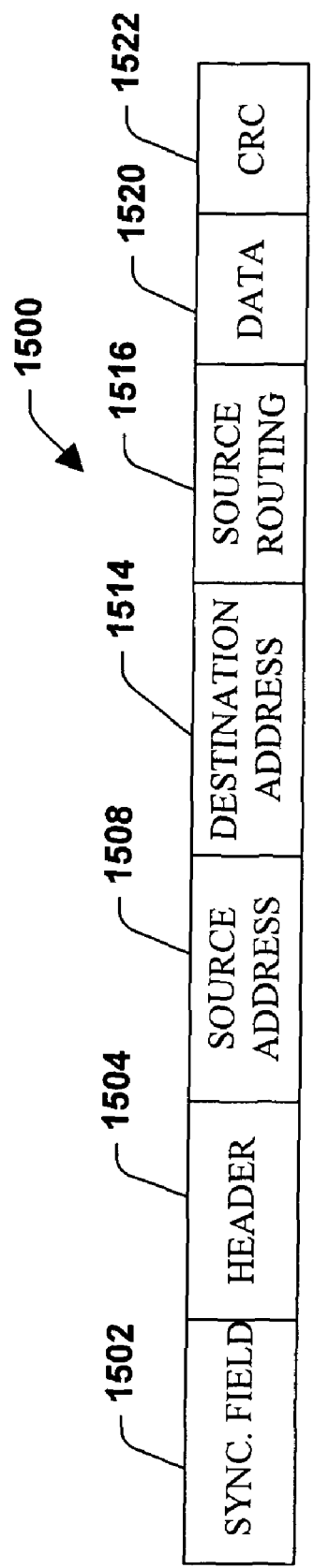
FIG. 16 is a schematic illustration of a data packet that may be transmitted between computer components in accordance with an aspect of the present invention.

Referring now to FIG. 16, information can be transmitted between various computer components associated with the group managing and group communication functions described herein via a data packet 1500. An exemplary data packet 1500 is shown. The data packet 1500 includes a synchronization field 1502 that includes synchronizing bits that allow a device receiving the packet 1500 an opportunity to "lock on" to the packet 1500. A header field 1504 follows the synchronization field 1502 and includes information such as the length and type of packet. For example, the header field 1504 can indicate whether the packet 1500 is a packet type that requires a response from the receiving device. A source address field 1508 follows the header field 1504 and includes the address of the device from which the packet 1500 originated. Following the source address field 1508, the packet 1500 includes a destination address field 1514 that holds the address of the device to which the packet 1500 is ultimately destined. A data field 1520 in the packet 1500 includes various information intended for the receiving device. The data packet 1500 ends with a cyclical redundancy check (CRC) field 1522 that serves as an error detecting field whereby a receiving device can determine if it has properly received a packet 1500. While seven fields are illustrated in data packet 1500, it is to be appreciated that a greater and/or lesser number of fields may be present in data packets employed by the present invention.

Figure 17:
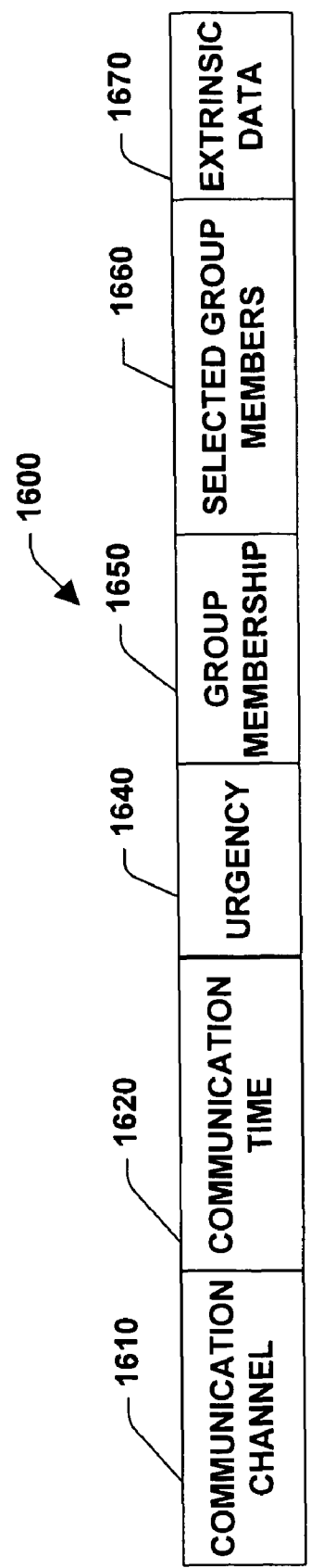
FIG. 17 is a schematic illustration of sub-fields of a data field from a data packet that may be transmitted between computer components in accordance with the present invention.

FIG. 17 is a schematic illustration of sub-fields 1600 within the data field 1520. The sub-fields 1600 discussed are merely exemplary and it is to be appreciated that a greater or lesser number of fields could be employed with various types of data germane to facilitating group management and maximizing the utility of communications based, at least in part, on group membership, in accordance with the present invention. The sub-fields 1600 include a communication channel field 1610 that can include communication channel identifying data. A communication time field 1620 can include information relating to the planned and/or initiated communication time. An urgency filed 1640 can hold information related to determining the urgency of a communication and thus, for example, priority through routers, etc. The data packet 1600 can also include a group membership field 1650 and a selected group members field 1660, where the group membership field 1650 identifies groups to which the selected group members 1660 belong, which can be employed to facilitate, for example, identifying useful communication groups. Other sub-fields that could be included are an extrinsic data field 1670, and a variety of other sub-fields as discussed. Thus, one example data packet 1600 may include a first field that stores an expected utility data associated with a communication based, at least in part, on group membership information, a second field that stores information for identifying group members who will participate in the communication and a third field that stores group membership information for the group members identified in the second field.

FIG. 18 schematically illustrates a representative data structure 1700 in connection with the subject invention. The data structure 1700 is merely exemplary and it is to be appreciated that numerous other structures are contemplated that provide for organizing and/or storing a plurality of data types conducive to carrying out group management and communication utility analysis in connection with the subject invention. Any such data structure suitable for use with the present invention is intended to fall within the scope of the hereto appended claims.

The data structure 1700 includes communication channel information, communication time information, communication subject matter information, group membership information, selected group membership identification information, extrinsic information, and a variety of other data fields. Thus, in one example of the present invention, a memory that stores data that can be accessed by a computer component can store a data structure that holds a first field that stores communication expected utility information associated with a communication based on group membership information, a second field that stores information for identifying group members who will participate in the communication and a third field that stores group membership information for the group members identified in the second field.

Figure 19:
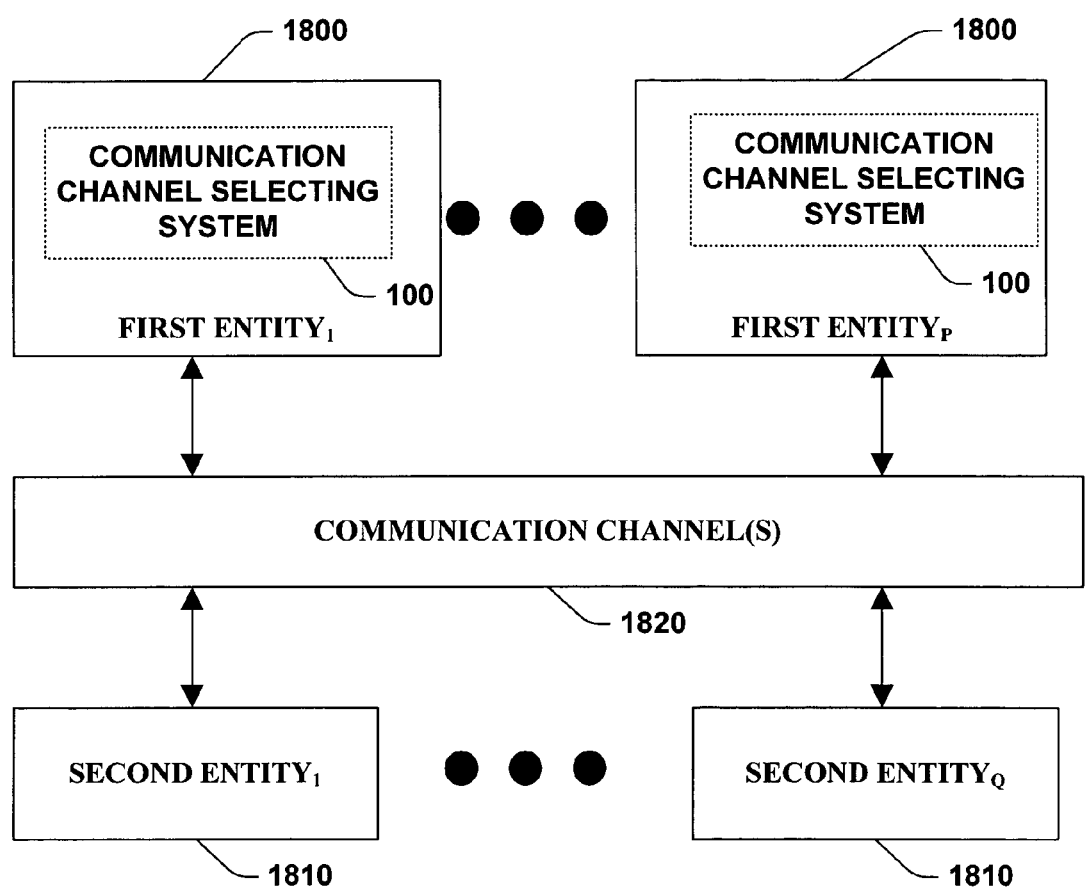
FIG. 19 schematically illustrates an architectural application of the present invention with respect to a plurality of communicating entities.

FIG. 19 is an illustration of P number of first entities 1800 (e.g., individual(s) and/or device(s) and/or cluster(s) and/or system(s)) (P being an integer) that include communication channel selecting systems 100 and Q number of second entities 1810 (e.g., individual(s) and/or device(s) and/or cluster(s) and/or system(s)) (Q being an integer) that do not include a communication channel selecting system 100. The first entity(s) 1800 may desire to communicate amongst themselves via any of a plurality of communication channels 1820, and a subset of the first entities may desire to communicate with a subset of the second entities 1810 via one or more of a plurality of communication channels 1820. The respective communication channel selecting systems 100 facilitate maximizing communication utility by establishing/managing groups and selecting communication channels and groups based, at least in part, on group membership as discussed herein. In the event two or more communication channel selecting systems 100 are concurrently involved with channel selection, the respective systems 100 can coordinate, address conflicts and select channel(s) that maximize overall utility. However, it is to be appreciated that certain systems 100 can have higher authority than other systems 100 and thus the hierarchical ranking of the systems 100 can be part of the utility analysis. Additionally, a single system 100 can be selected to perform channel selection like a network manager while the others sit idle.

Figure 20:
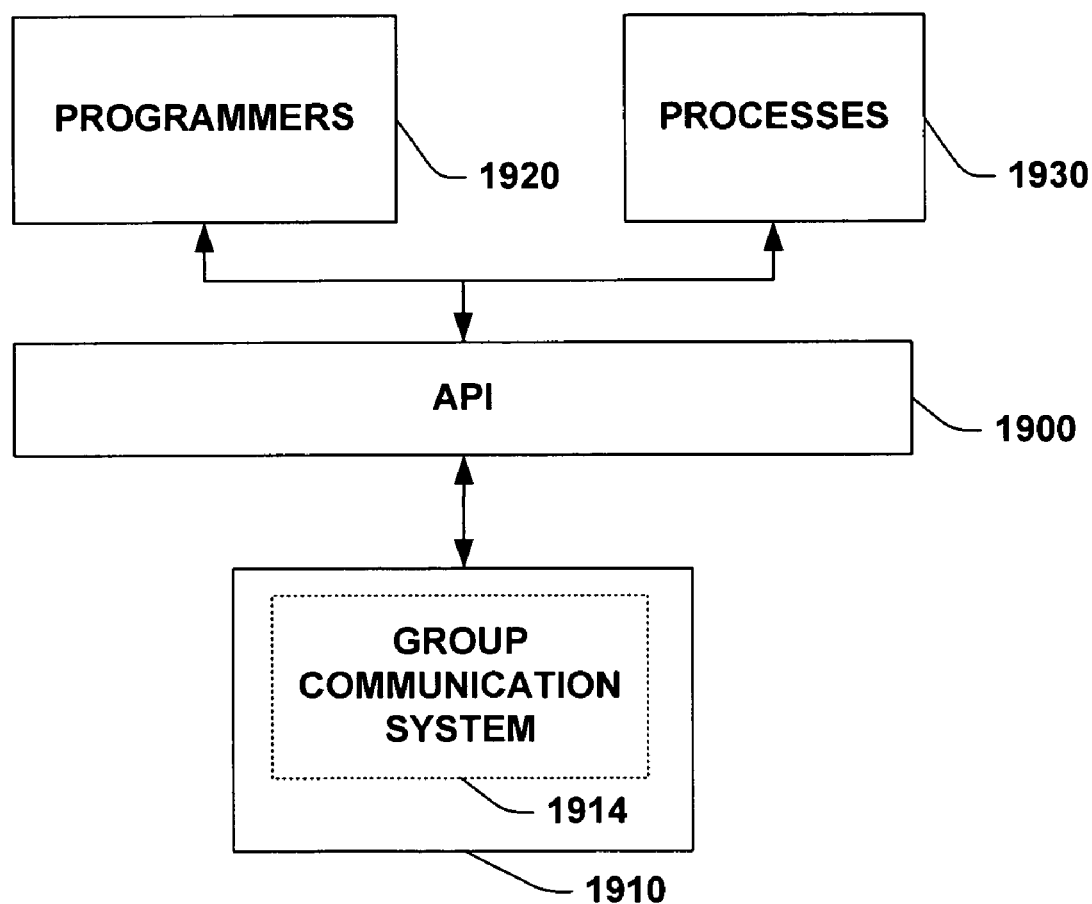
FIG. 20 schematically illustrates an application programming interface employed in accordance with an aspect of the present invention.

Referring now to FIG. 20, an application programming interface (API) 1900 is illustrated providing access to a system 1910 that includes a channel manager 1912 and a group communication system 1914. The API 1900 may be employed, for example, by programmers 1920 and/or processes 1930 to gain access to processing performed by the system 1910. Similarly, the API 1900 can be employed to provide data values to the system 1910 and/or retrieve data values from the system 1910. Thus, in one example of the present invention, a set of application program interfaces can be stored on a computer-readable medium. The interfaces can be executed by a computer component to gain access to a group management program. Such interfaces can include, but are not limited to, a first interface that receives group membership information, a second interface that receives communication channel information, a third interface that receives communication information and a fourth interface that provides communication channel information and communication group membership information employed in maximizing the utility of a group communication.

Figure 21:
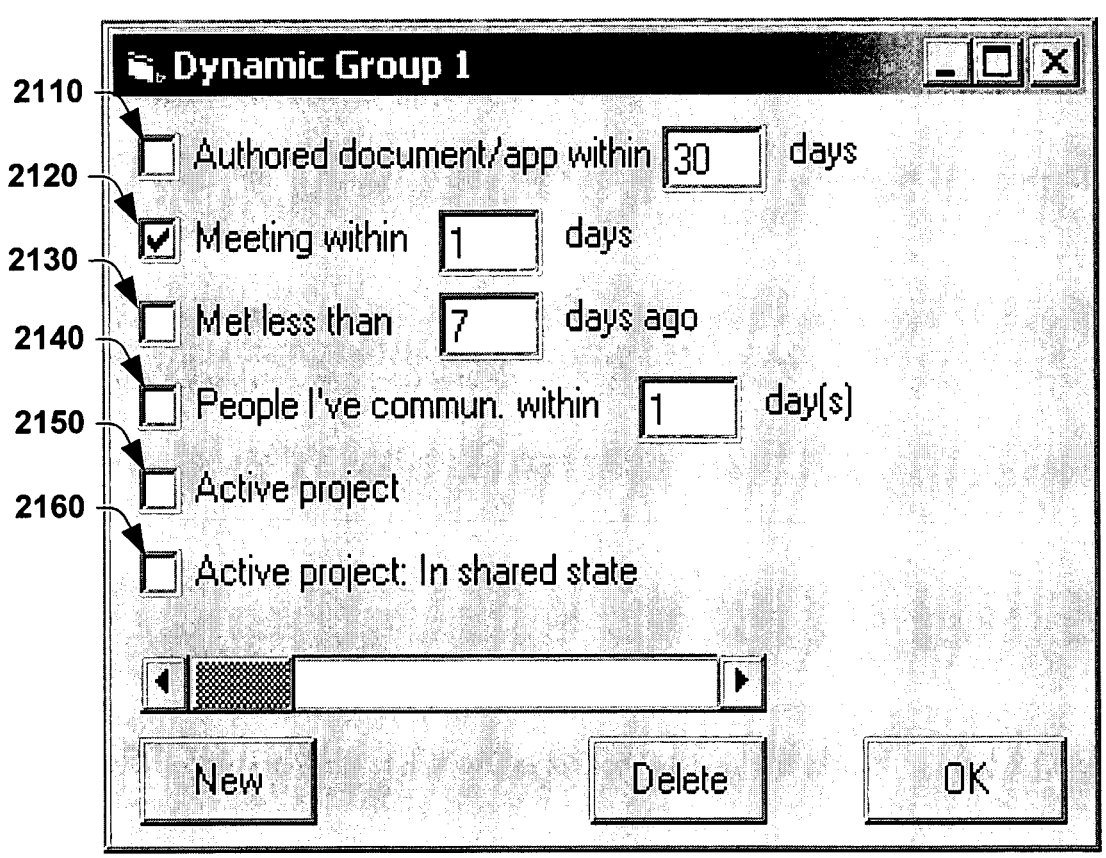
FIG. 21 is a simulation of a user interface screen employed in defining groups, in accordance with an aspect of the present invention.

FIG. 21 illustrates a sample screen shot of a user interface that can be employed to control how groups are formed dynamically. Thus, the simulated screen shot includes a check box 2110 that controls whether people who author documents and/or applications within a pre-determined, configurable (e.g., 30 days) time period are to be dynamically assigned to a group. In the sample screen shot in FIG. 21, the check box 2110 is not checked, thus the dynamic group whose creation is being controlled does not depend on document or application authorship.

FIG. 21 also includes a check box 2120 that is checked. This check box determines whether people with whom the user of the interface has a meeting within a pre-determined, configurable period of time (e.g., 1 day) are to be dynamically assigned to a group. Thus, a group (e.g., Dynamic Group 1) can be defined, and people who attempt to communicate with the user who have a meeting scheduled with the user within the period of time will be dynamically assigned to Dynamic Group 1. The group can have one or more communication policies associated with it, which facilitates maximizing the utility of communications to the user. For example, the user may be very interested in hearing from people with whom she is scheduled to meet within the next day. Therefore, members of Dynamic Group 1 can have their communications routed to real time communication devices (e.g., cellular phone) with a high priority while members of other groups that do not similarly have pressing engagements with the user may not be assigned to such real time devices. The meeting information can be gathered, for example, from calendar information available to the present invention.

Other dynamic assignments of people to groups can be performed based on factors like, whether the user has met with the person within a pre-determined, configurable period of time (e.g., check box 2130), whether the user has communicated with the person within a pre-determined, configurable period of time (e.g., check box 2140), whether the person is on an active project in which the user is interested (e.g., check box 2150), and whether the person is on an active project that is in a shared state (e.g., check box 2160). While six dynamic assignment criteria are illustrated in FIG. 21, it is to be appreciated that a greater and/or lesser number of such criteria can be employed with the present invention. Furthermore, while check boxes are illustrated in FIG. 21, it is to be appreciated that other user interface elements can be employed with the present invention.

Figure 22:
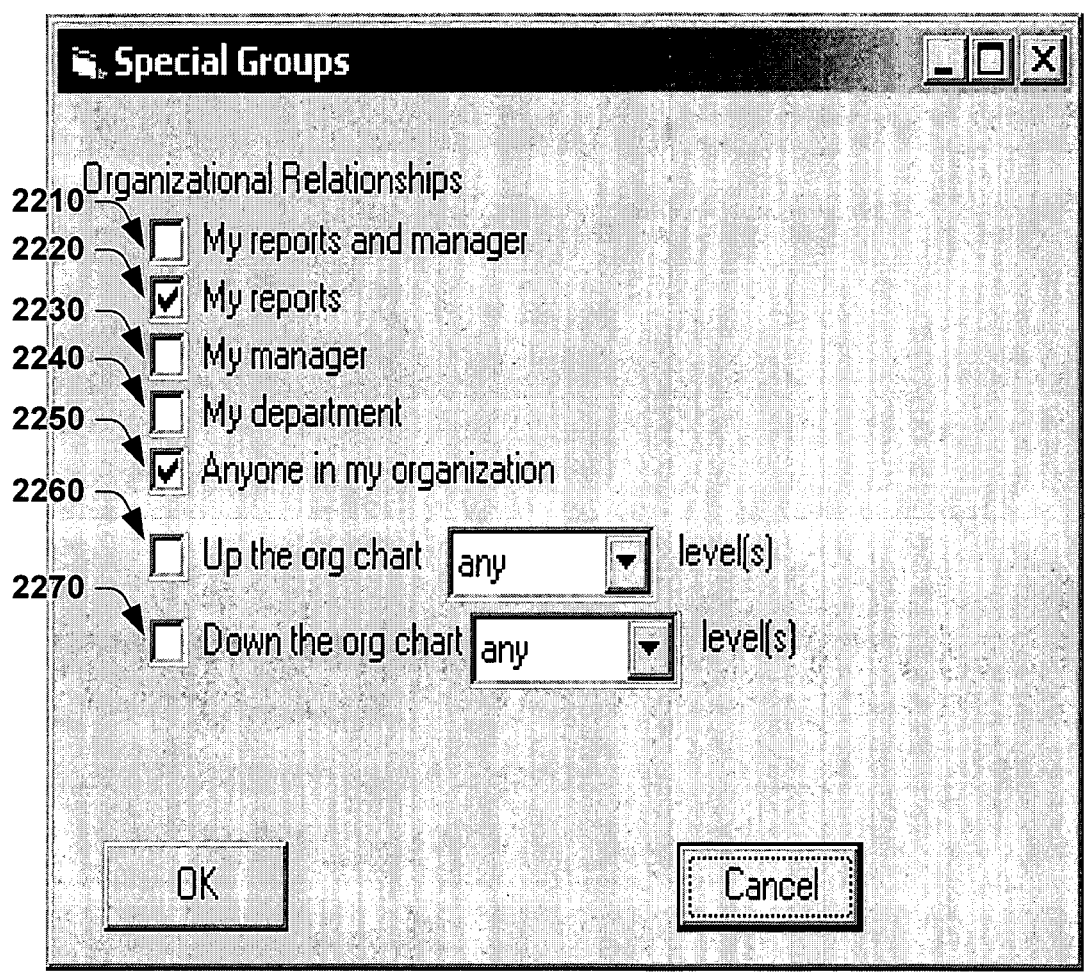
FIG. 22 is a simulation of a user interface screen employed in defining groups, in accordance with an aspect of the present invention.

FIG. 22 illustrates a simulated screen shot of a user interface that can be employed to facilitate establishing groups based on relationships between communicating parties. In FIG. 22, organizational relationships are examined, but it is to be appreciated that other relationships (e.g., familial) can be employed in relationship analysis.

FIG. 22 includes a number of check boxes that can be employed to control whether a person at a certain location in an organizational chart will be assigned to one or more special groups being defined by the user interface tool. Thus, check box 2210 controls whether the user wants to create a special group for her reports and her manager. If this box were checked, then a group could be formed that included such people. However, this box is not checked, so the user is not employing the interface in FIG. 22 to create such a group.

FIG. 22 also includes a check box 2220 that controls whether the people who report to the user of the interface tool will be assigned to a group. Since this box is checked, such people will be assigned to the group being described by the user through the interface illustrated in FIG. 22. Furthermore, check box 2250 is also checked. Thus, anyone in the organization chart to which the user belongs will also be included in the group being defined by the user interface tool illustrated in FIG. 22. Other groupings can also be considered. For example, a user can determine whether to include their manager (e.g., check box 2240), whether to include their department (e.g., check box 2240), whether to include people based on their relative position in the organizational chart (e.g., check box 2260 for people above the user in the organization, check box 2270 for people below the user in the organization). While seven choices are presented in FIG. 22, it is to be appreciated that a greater and/or lesser number of choices could be presented by a user interface element employed by the present invention. Furthermore, while check boxes and drop down dialogs are presented, it is to be appreciated that other graphical user interface elements can be employed by the present invention.

Figure 23:
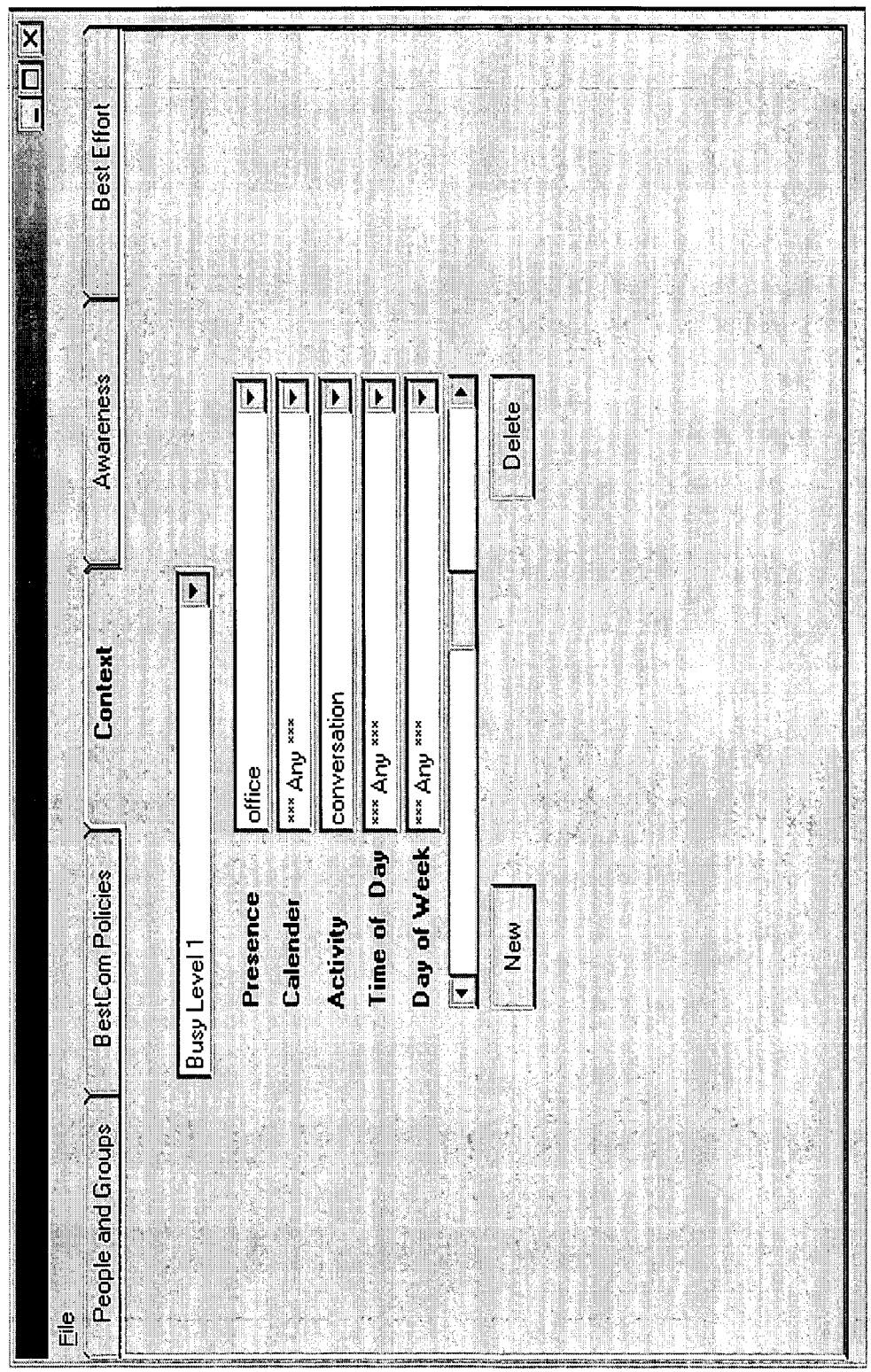
FIG. 23 is a simulation of a user interface screen employed in establishing a definition for a context, in accordance with an aspect of the present invention.

FIG. 23 is a simulated screen shot of a user interface that can be employed to provide the definition for a context. For example, a context titled "Busy Level 1" is being defined through the user interface element illustrated in FIG. 23. The user interface facilitates aggregating contextual factors (e.g., location/presence, activity, time of day, day of week) into sets of variables that can be processed via, for example, logical AND, OR, XOR and other operations so that context can be applied to channel selection processing. For example, when a communication arrives from a member of a first group of people AND the user has the Busy Level 1 context, then such communications may be routed through a first set of communication channels.

What has been described above includes examples of the present invention. It is of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising", as comprising is interpreted as a transitional word in a claim.

What is claimed is:

1. A system for dynamically assigning people to activity-centric communication groups, comprising:
 a memory; and
 a processor, operatively coupled to the memory, the processor executing computer executable instructions to effect the following:
  a communication group manager that routes communications to members of groups and that receives context data associated with a communicating party, the context data indicating one or more activities with which the communicating party is associated; and
  a communication group establisher that dynamically establishes a group of communicating parties based, at least in part, on the context data when the context data indicates that a set of communicating parties meeting dynamic assignment criteria exceeds a configurable threshold, the group relating to an activity and comprising communicating parties, each of which is indicated by the context data to be associated with the activity, wherein the communication group manager routes communications to communicating parties of the dynamically established group, and wherein the dynamic assignment criteria comprises at least communication with the communicating party occurring within a specified period of time.

2. The system of claim 1, further comprising:
 a communication group modifier that dynamically modifies the group of communicating parties, the dynamic modification of the group is triggered by satisfying dynamic assignment criteria.

3. The system of claim 1, further comprising a communication group modifier that dynamically modifies the group of communicating parties based, at least in part, on the context data, wherein the dynamic modification of the group is the result of satisfying dynamic assignment criteria.

4. The system of claim 3, the context data comprising:
 hardware data comprising at least one of: hardware capacity data, hardware bandwidth data, hardware availability data, hardware status data, hardware cost data, hardware revision data, or hardware metadata.

5. The system of claim 3, the communication group establisher further deletes a group of communicating parties, merges two or more groups of communicating parties, or partitions a group of communicating parties into two or more new groups of communicating parties.

6. The system of claim 3, the context data comprising:
 software data comprising at least one of: software capacity data, software version data, software cost data, or software capability data.

7. The system of claim 3, the context data comprising:
 observed data comprising at least one of: time of day data, current activity data, current task data, calendar data, location data, communication history data, environment data, or communication needs data.

8. The system of claim 1, the dynamic assignment criteria further comprising:
 meeting with the communicating party within a pre-determined amount of time.

9. The system of claim 1, the dynamic assignment criteria further comprising:
 activity of the communicating party in a project.

10. The system of claim 1, the dynamic assignment criteria further comprising:
 authoring a document within a pre-determined amount of time.

11. A method for dynamically assigning people to activity-centric communication groups, the method comprising:
 receiving context data associated with a communicating party, the context data indicating one or more activities with which the communicating party is associated;
 dynamically establishing a group of communicating parties based, at least in part, on the context data when the context data indicates that a set of communicating parties meeting dynamic assignment criteria exceeds a configurable threshold, wherein the dynamic assignment criteria comprises at least processing or viewing one or more related documents within a predetermined period of time, the group relating to an activity and comprising communicating parties, each of which is indicated by the context data to be associated with the activity; and
 routing communications to communicating parties based on membership in the dynamically established group.

12. The method of claim 11, further comprising:
dynamically modifies the group of communicating parties, wherein the dynamic modification of the group is triggered by satisfying dynamic assignment criteria.

13. The method of claim 11, further comprising:
dynamically modifying the group of communicating parties based, at least in part, on the context data, wherein the dynamic modification of the group is the result of satisfying dynamic assignment criteria.

14. A computer-readable storage medium comprising computer-executable instructions that, when executed, perform a method of operating a communication system including assigning people to activity-centric communication groups, the method comprising:
receiving context data associated with a communicating party, the context data indicating one or more activities with which the communicating party is associated;
dynamically establishing a group of communicating parties based, at least in part, on the context data when the context data indicates that a set of communicating parties meeting dynamic assignment criteria exceeds a configurable threshold, the group relating to an activity and comprising communicating parties, each of which is indicated by the context data to be associated with the activity; and
routing communications to communicating parties based on membership in the dynamically established group,
wherein the computer-readable storage medium is not a transitory signal, and
wherein the dynamic assignment criteria comprises at least meeting with the communicating party within a predetermined period of time.

15. The computer-readable storage medium of claim 14, wherein the method further comprises:
dynamically modifies the group of communicating parties, wherein the dynamic modification of the group is triggered by satisfying dynamic assignment criteria.

16. The computer-readable storage medium of claim 14, wherein the method further comprises:
dynamically modifying the group of communicating parties based, at least in part, on the context data, wherein the dynamic modification of the group is the result of satisfying dynamic assignment criteria.

* * * * *